(12) United States Patent
Ohwada

(10) Patent No.: US 6,721,905 B2
(45) Date of Patent: Apr. 13, 2004

(54) PROCESSOR

(75) Inventor: Akihiko Ohwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 579 days.

(21) Appl. No.: 09/814,856

(22) Filed: Mar. 23, 2001

(65) Prior Publication Data

US 2002/0062462 A1 May 23, 2002

(30) Foreign Application Priority Data

Sep. 22, 2000 (JP) .......................................... 2000-287950

(51) Int. Cl.⁷ ................................................ G06F 11/00
(52) U.S. Cl. ........................................... 714/30; 714/37
(58) Field of Search .............................. 714/30, 33, 37, 714/40, 733, 739

(56) References Cited

U.S. PATENT DOCUMENTS

| | | | | |
|---|---|---|---|---|
| 4,991,175 A | * | 2/1991 | Easingwood-Wilson | 714/732 |
| 5,485,471 A | * | 1/1996 | Bershteyn | 714/739 |
| 5,668,817 A | * | 9/1997 | Adham | 714/732 |
| 5,668,947 A | * | 9/1997 | Batcher | 714/30 |
| 6,108,798 A | * | 8/2000 | Heidel et al. | 714/30 |
| 6,154,857 A | * | 11/2000 | Mann | 714/30 |
| 6,249,892 B1 | * | 6/2001 | Rajsuman et al. | 714/741 |
| 6,249,893 B1 | * | 6/2001 | Rajsuman et al. | 714/741 |
| 6,421,794 B1 | * | 7/2002 | Chen et al. | 714/42 |
| 6,510,531 B1 | * | 1/2003 | Gibbons | 714/37 |

FOREIGN PATENT DOCUMENTS

JP  6-103101  4/1994

OTHER PUBLICATIONS

Lo, Concurrent Error Detection in Arithmetic and Logical Operations Using Berger Codes, unknown date.*
Joshi, Bharat et al. Efficient Alogorithms for Microprocesor Testing, 1998 IEEE.*
Cerny, E et al. Built–in Self–test of CMOS ALU, 1988 IEEE Designand Test of Computers.*
Lo, Jien–Chung An SFS Berger Check Prediction ALU and Its Application to Self–Checking Processor Designs, 1992 IEEE.*

* cited by examiner

Primary Examiner—Robert Beausoliel
Assistant Examiner—Bryce P. Bonzo
(74) Attorney, Agent, or Firm—Arent Fox PLLC

(57) ABSTRACT

The present invention provides a processor including a self-diagnostic function. The processor comprises: an arithmetic circuit including an adder-subtracter, which is a diagnostic object; a data storing unit which stores a self-diagnostic data; and a self-diagnostic processing unit. The self-diagnostic processing unit inputs the self-diagnostic data, and then, carries out diagnostic processing so that every bit of the operation result becomes all zero "0" (or all "1") by the arithmetic circuit.

14 Claims, 40 Drawing Sheets

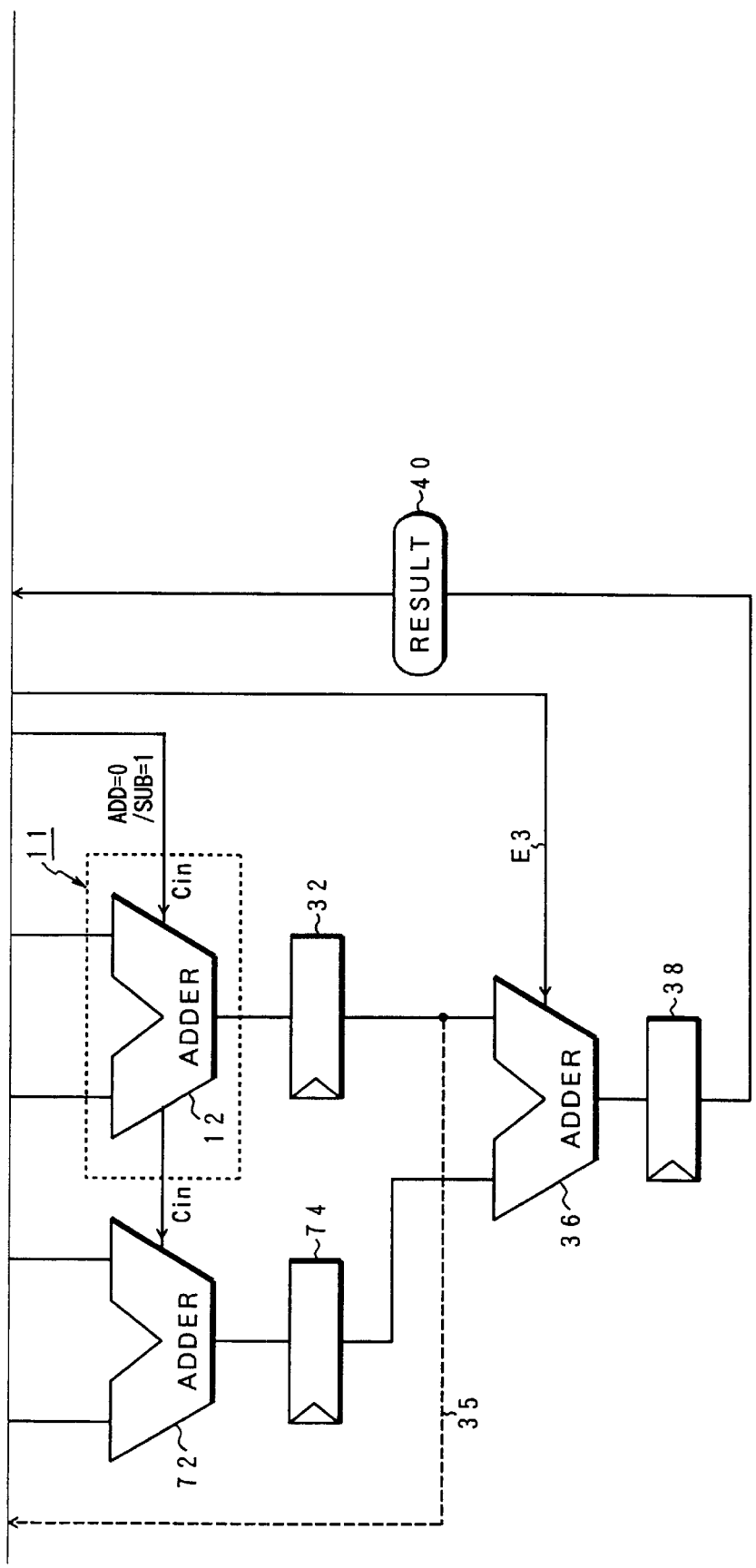

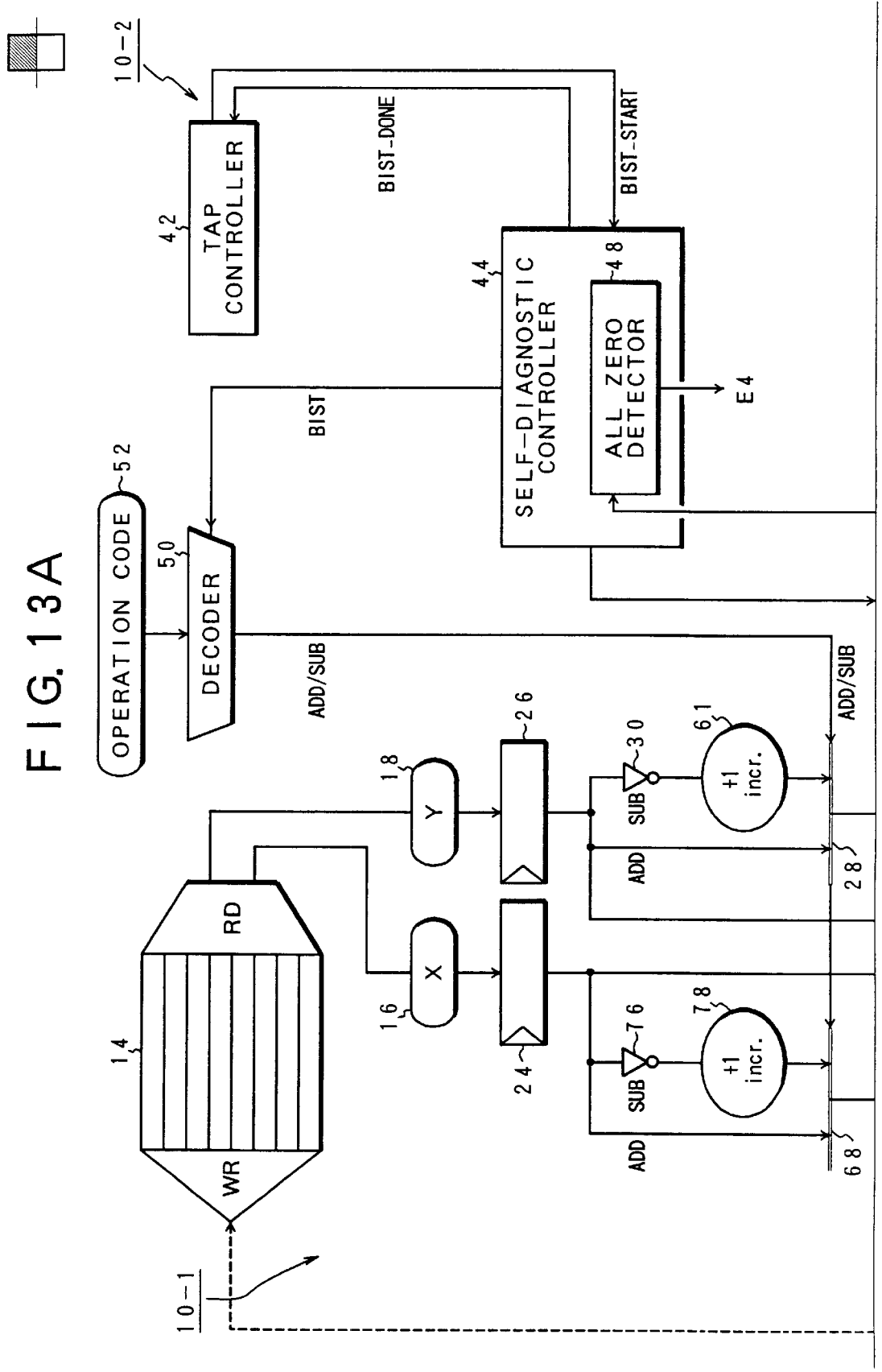

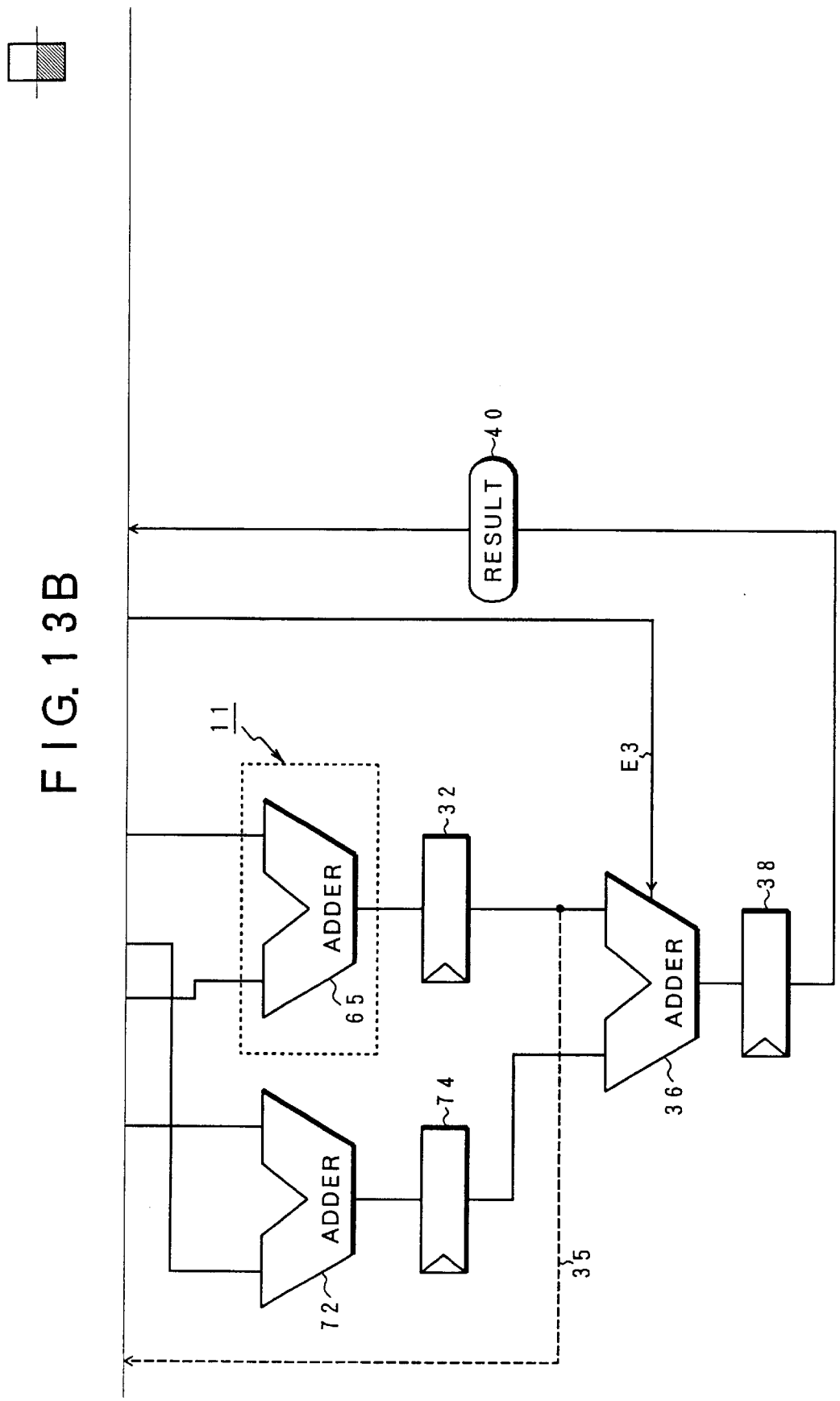

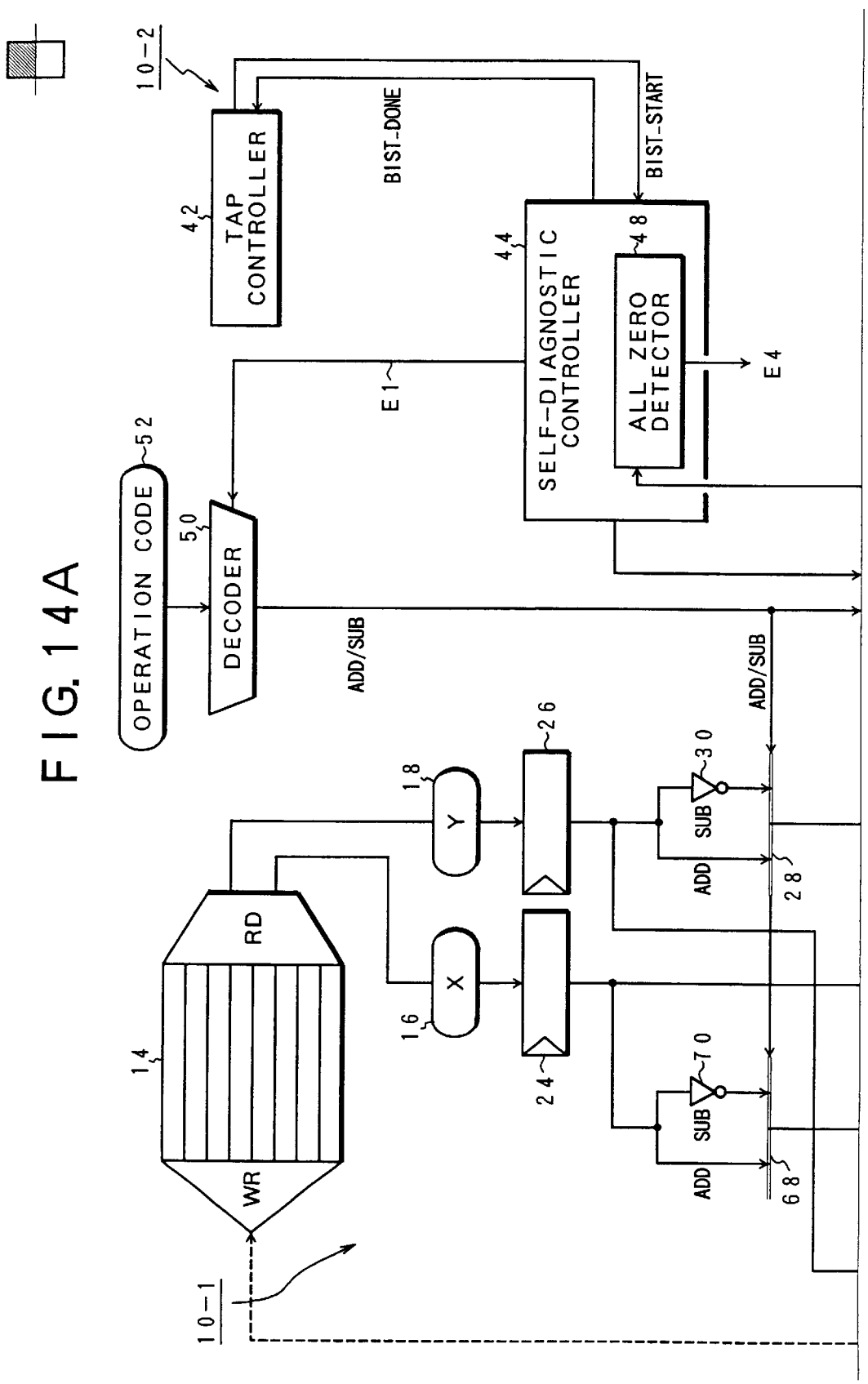

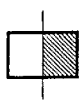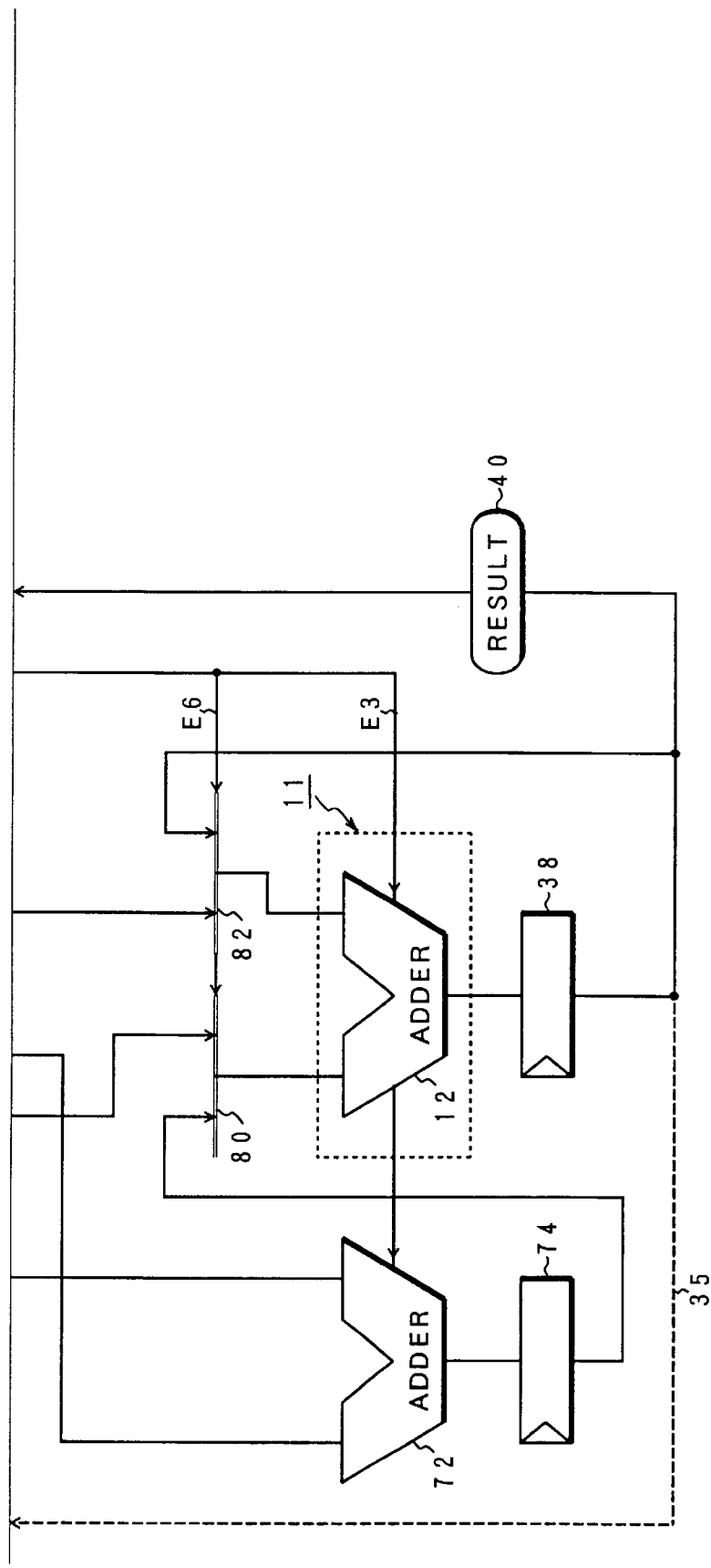
FIG. 15B

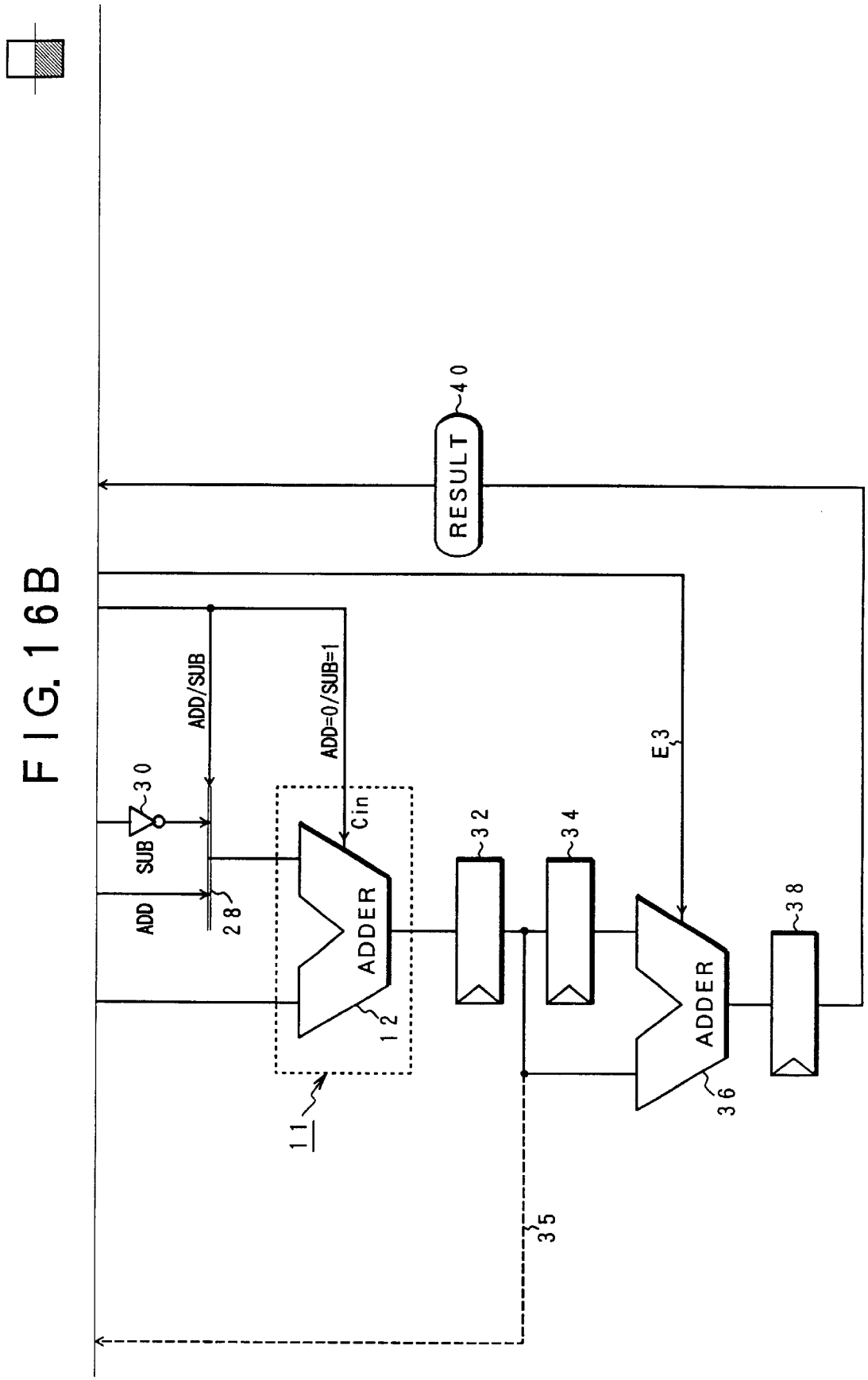

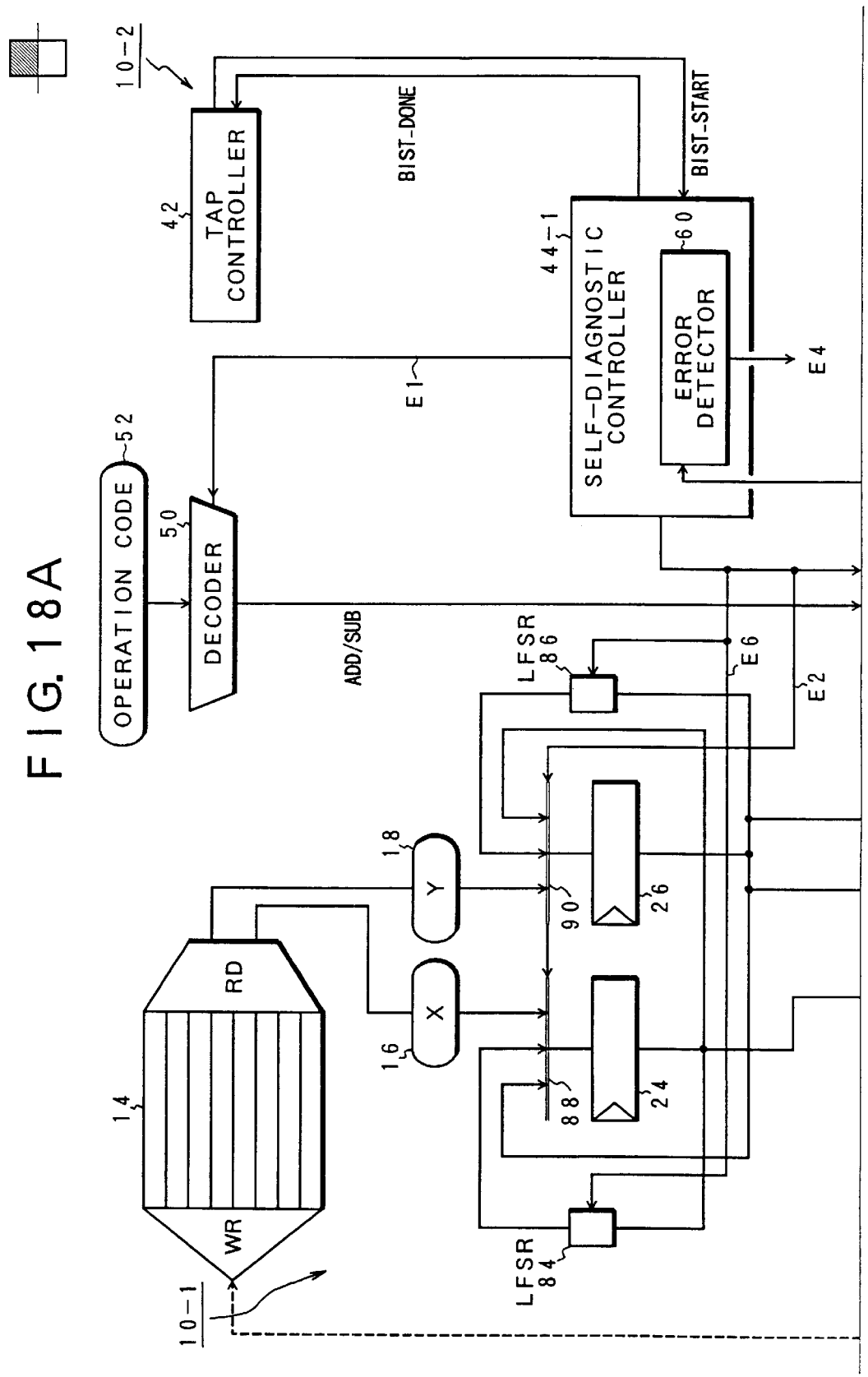

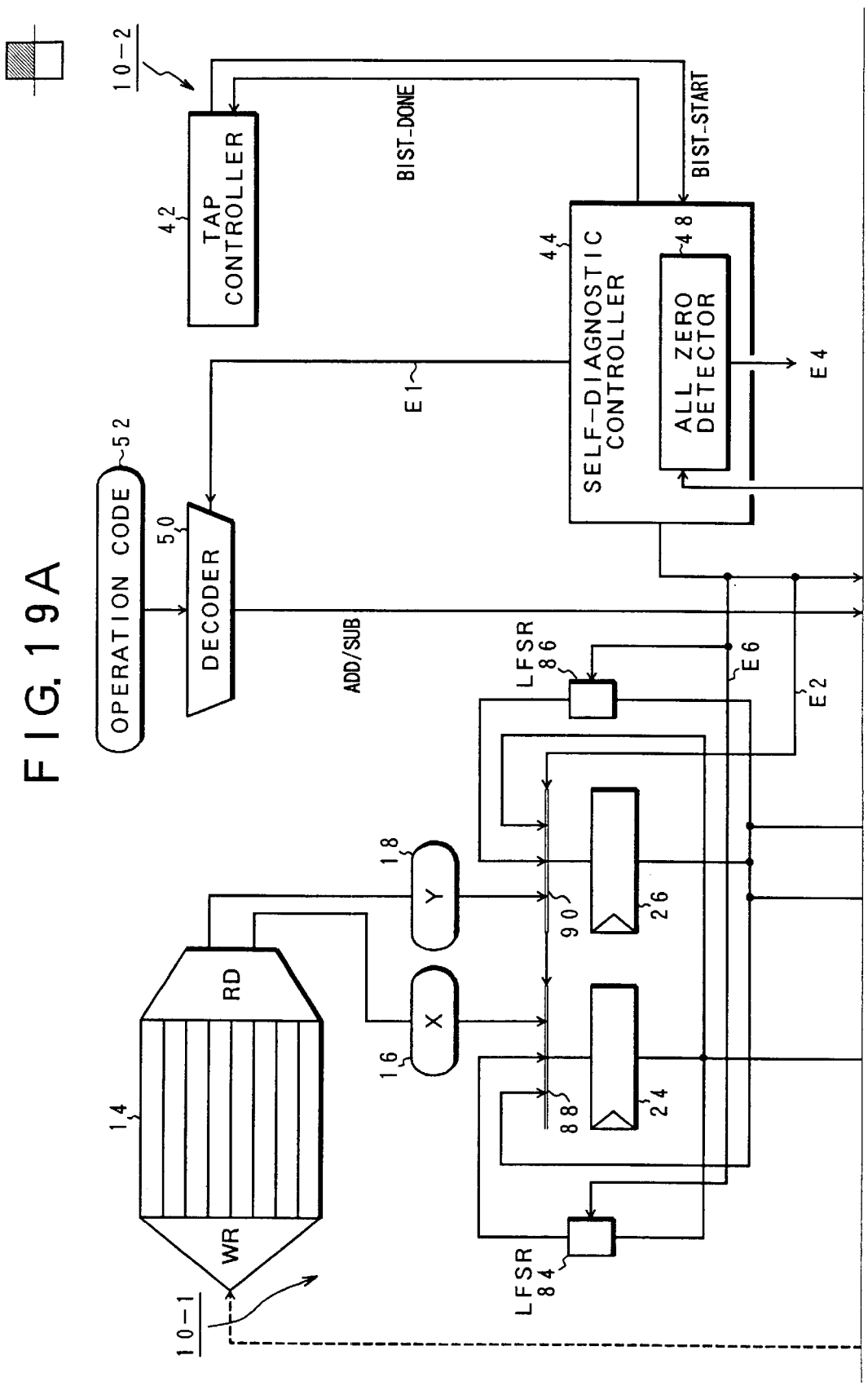

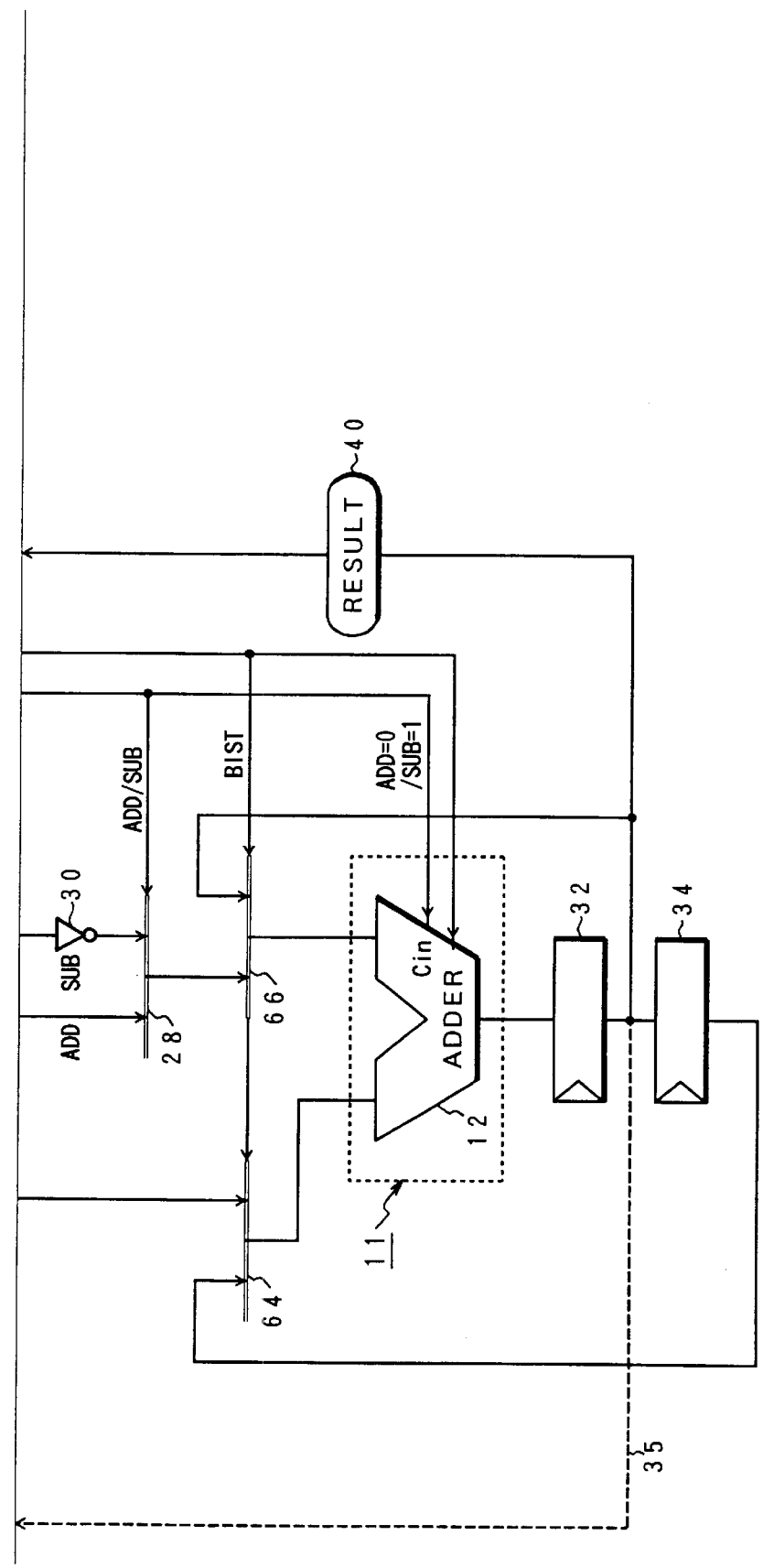

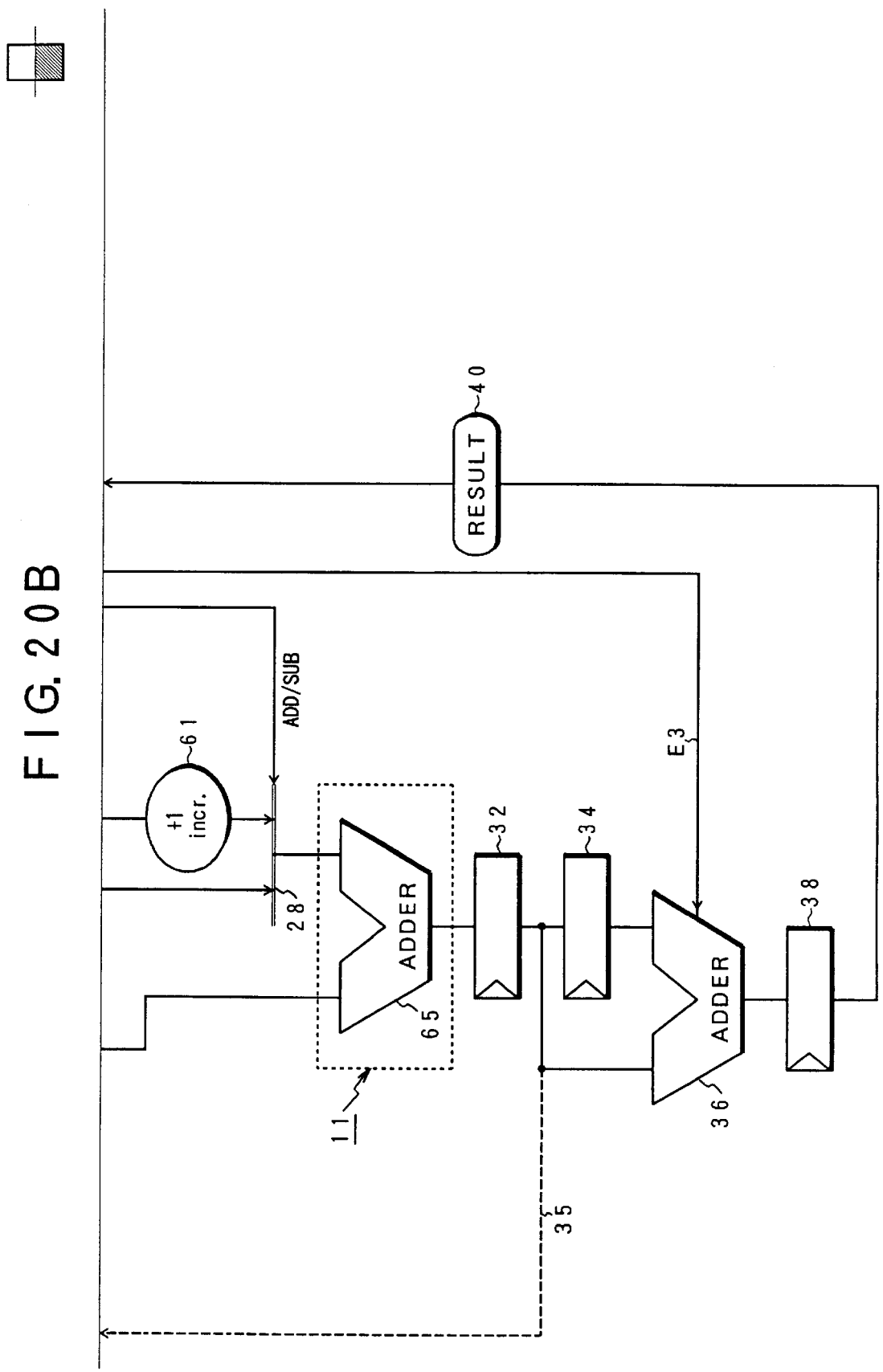

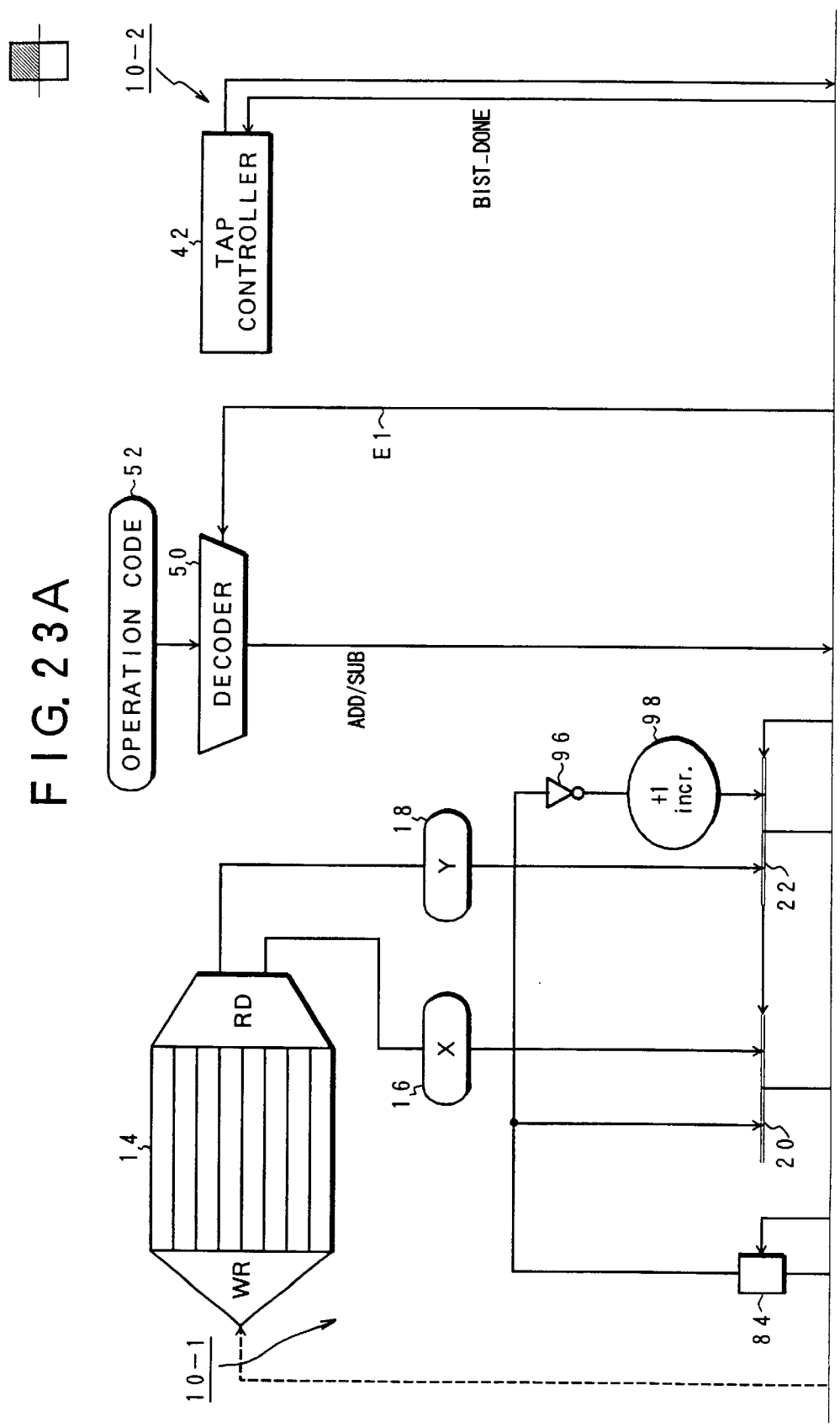

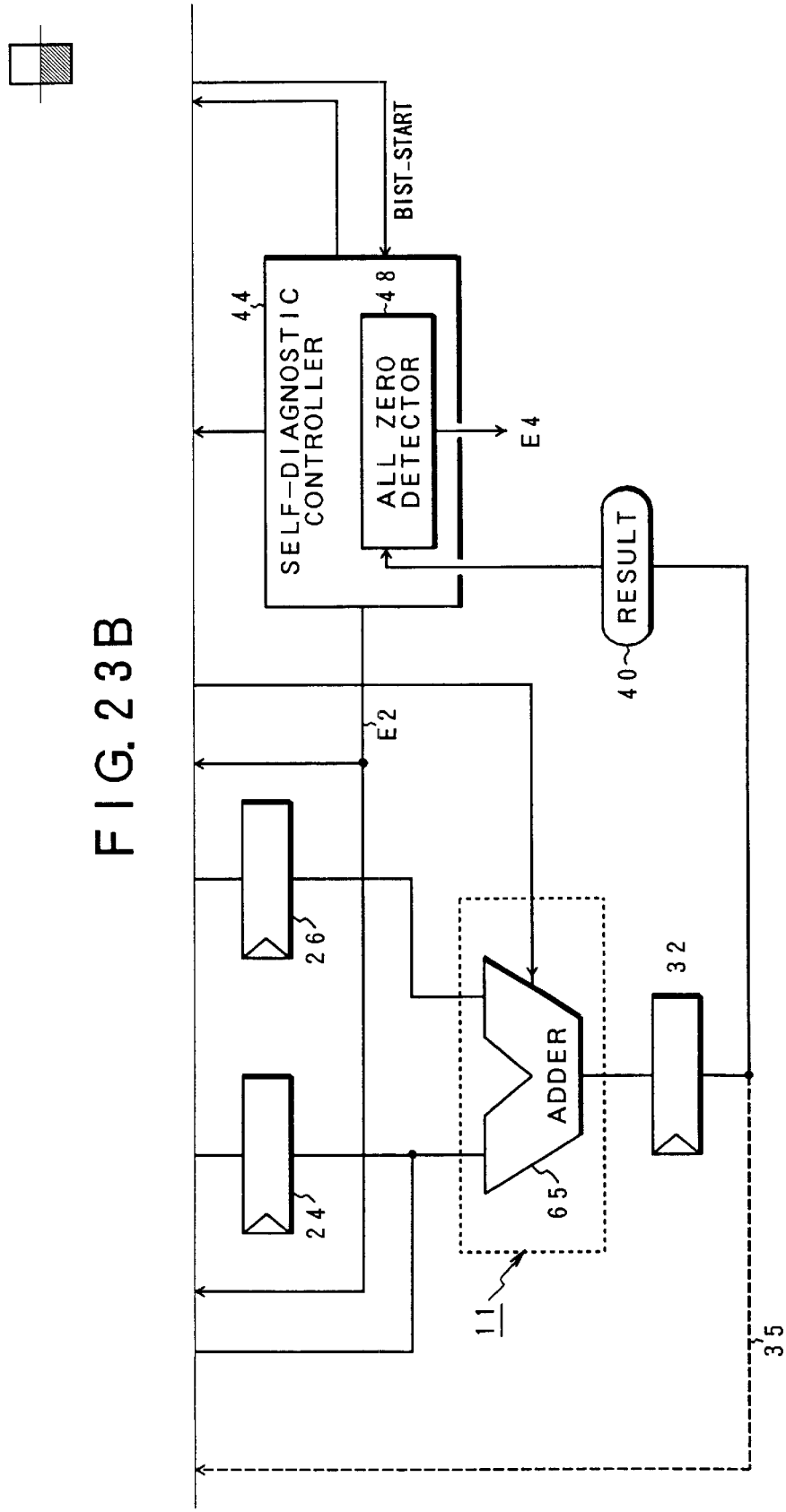

PROCESSOR

BACKGROUND OF THE INVENTION

1. Field of the Invention

The present invention relates to a processor including a self-diagnostic function, and in particular, to a processor, which can carry out a self-diagnosis with respect to an adder-subtracter without requiring an expected value data which evaluates a diagnostic result.

2. Description of the Related Arts

Conventionally, in a manufacture process of an integrated circuit such as a processor including a self-diagnostic function, a TAP (Test Access Port) controller is built in the integrated circuit as a self-diagnostic circuit. Further, in a wafer manufacture step and a package manufacture step, a self-diagnostic test is carried out with respect to a built-in RAM and a built-in arithmetic unit. In this manner, an integrated circuit having a manufacturing defect is found and removed, and thereafter, an integrated circuit passing the self-diagnostic test is used. By doing so, it is possible to prevent a wasteful build-up of LSI package and processor module, and thus, to improve a yield in a process after wafer manufacture.

FIG. 1 is a view showing a basic hardware configuration of a conventional processor. An instruction memory management unit (IMMU) 100 makes an exchange between a logical address and a physical address using an instruction TLB (Translation Look-aside Buffer) 102, and then, a pre-fetch unit 104 pre-fetches an instruction from an instruction cache 110 to an instruction field 106 via a branch prediction 108. Further, a secondary cache 112 is interposed between the instruction cache 110 and a processor local inter-connector 114, and is connected to an external unit via the processor local inter-connector 114. An instruction fetched from the instruction cache 110 is pre-decoded by a pre-decode unit 116, and thereafter, is stored in an instruction buffer 118. Further, a dispatch unit 120 distributes the instruction thus fetched to each of a branch unit 122, an integer arithmetic unit register file (IEU register file) 124 and a floating-point unit register file (FPU register file) 128. Following the IEU register file 124, integer arithmetic units (IE ALU) 130-1 and 130-2 are provided, and then, execute an integer operation instruction. Thereafter, these integer arithmetic units 130-1 and 130-2 output the operation result to a completion unit 134, and then, the operation result is loaded or stored according to an instruction from a load-store unit 126. Moreover, following the floating-point unit register file 128, floating-point arithmetic units (FP ALU) 132-1 and 132-2 are provided, and then, execute a floating-point operation instruction. Thereafter, these floating-point arithmetic units 132-1 and 132-2 output the operation result to the completion unit 136, and then, the operation result is loaded or stored according to an instruction from a load-store unit 126.

FIG. 2 is a view showing a basic configuration of the integer arithmetic unit including an instruction decoder in the processor shown in FIG. 1. An integer operation instruction from the dispatch unit 138 is latched by a staging latch 144, and then, is decoded by a decoder 150. A source register 140 stores a first operand of instruction; on the other hand, a source register 142 stores a second operand of instruction. The first and second operands are latched by staging latches 146 and 148, respectively, and thereafter, are inputted to an arithmetic unit (ALU) 152. Then, according to an operation instruction of addition instruction ADD or subtraction instruction SUB decoded by the decoder 150, the arithmetic unit 152 executes addition or subtraction of two input data so that the operation result is latched by a staging latch 156. The operation result of the staging latch 156 is stored in a destination register 168 via a staging latch 166 from a multiplexer 164. Operation instructions other than addition instruction ADD or subtraction instruction SUB decoded by the decoder 150 are latched by the staging latch 154, and thereafter, are given to a logical instruction unit 162. At that time, logic operations of AND, OR, NAND, NPR, XOR or XNOR are executed with respect to two data inputted from the staging latches 158 and 160. The operation result is stored in the destination register 168 via the multiplexer 164 and the staging latch 166.

The processor including the arithmetic unit as described above is mounted with a self-diagnostic circuit, which is used for an adder-subtracter as shown in FIGS. 3A and 3B provided in the arithmetic unit 152. In a wafer manufacture process and a package manufacture process, the self-diagnostic circuit carries out a self-diagnostic test with respect to a built-in arithmetic unit. FIG. 24 is a view showing a configuration of a conventional adder-subtracter circuit mounted with a self-diagnostic circuit. For example, a two-input adder-subtracter 202 with carry input Cin is mounted as a test object 200. An input side of the adder-subtracter 202 is provided with a general register file 204, selectors 210 and 212 and source registers 214 and 215. An output of the source register 215 is inputted directly to one of the selector 218 branched into two while being inverted by an inverter 216 so as to be inputted to the other of the selector 218. The selector 218 makes a changeover of addition input and subtraction input with respect to the adder-subtracter 202. The operation result of the adder-subtracter 202 is stored in the destination register 220. The addition and subtraction by the adder-subtracter 202 are carried out on the basis of the addition instruction ADD or subtraction instruction SUB of a decoder 230 decoding an operation code 232. Now, if each data of the source registers 214 and 216 are set as A and B, in the case where the addition instruction ADD is given from the decoder 230, the selector 218 selects a value B of the source register 215. Then, the selector 218 inputs the value to the adder-subtracter 202 while setting the carry input of the adder-subtracter 202 as Cin=0. Therefore, the adder-subtracter 202 executes an addition of C=A+B. Moreover, in the case where the subtraction instruction SUB is given from the decoder 230, the selector 218 selects an output of the inverter 216 inverting the value B of the source register 215. Then, the selector 218 inputs the inverted output to the adder-subtracter 202 while setting the carry input of the adder-subtracter 202 as Cin=1. Therefore, the adder-subtracter 202 executes a subtraction of C=A−B. In this case, the subtraction of C=A−B executed by the adder-subtracter 202 is carried out in the following manner. More specifically, an inverted value of B by the inverter 216 is one's complement B1's, and then, the carry input Cin=1 is added to the one's complement B1's in the adder-subtracter 202, and thereby, two's complement B2's is found. Further, the two's complement B2's is added to A, and thereby, the following subtraction C=A−B=A+B1's+1=A+B2's is carried out. A self-diagnostic controller 228 is provided as a self-diagnostic circuit with respect to the add-subtract circuit as described above. The self-diagnostic controller 228 includes a TAP (Test Access Port) controller 226 and a comparator 234.

In a processor mounted with the aforesaid self-diagnostic circuit, prior to the start of self-diagnosis, the TAP controller 226 executes the following preparation. More specifically, the TAP controller 226 reads a great many of self-diagnostic input data from the external RAM or the like, and a great many of expected value data obtained when an arithmetic unit is normally operated according to the self-diagnosis using the input data in the general register file 240. Next, the TAP controller 226 starts the self-diagnostic controller 228, and in the first cycle, reads a source data 206 used as a first operand a source data 208 used as a first operand, and an expected value 225 from the general register file 204. These source data 206 and 208 are stored in the source registers 214 and 215 via selectors 210 and 212, respectively. Moreover, the expected value 225 is set to one input of the comparator 234 of the self-diagnostic controller 228. In the next cycle, for example, two source data are added according the addition instruction ADD, and then, the addition result is stored in the destination register 220. The addition result 224 is compared with the expected value 225 already read by the comparator 234 of the self-diagnostic controller 228. In the case where the addition result and the expected value 224 correspond by the comparator 234, the arithmetic unit 202 is normal. On the other hand, in the case where the above two have no correspondence, a judgment is made such that the arithmetic unit 202 has a failure, and then, the self-diagnostic controller 228 outputs an error to the external unit so as to remove a processor causing the error from a manufacture process. The above self-diagnostic processing is carried out with respect to all input data and expected values prepared in the general register file 204. Thereafter, if a processor has no failure, the processor passes the test, and then, is transferred to the next process.

Moreover, the arithmetic circuit of FIGS. 3A and 3B is provided with linear feedback shift registers (LFSR) 236 and 238, which are operated as a pseudo-random number generator. These linear feedback shift registers set data X and Y read from the general register file 204 as initial value via the source registers 214 and 215, and thereafter, generate a pseudo-random number according to the control from the self-diagnostic controller 228, and thus, can perform a self-diagnosis. In such a self-diagnosis of generating the pseudo-random number, there is a need of preparing an expected value corresponding to a pseudo-random number generated in diagnosis, and reading the prepared expected value in the general register file 204. In this case, although preparation and read of the input data are unnecessary, an expected value is required.

However, in an integrated circuit such as the processor including the arithmetic unit as described above, in the case where the integrated circuit is mounted with a self-diagnostic function for an arithmetic unit, a large-scale and complicate self-diagnostic circuit is required resulting from the following reason. Namely, in the case of carrying out a self-diagnostic test, the following processings must be carried out. More specifically, first, there is a need of reading a great number of self-diagnostic input data and a great number of expected value data obtained when an arithmetic unit is normally operated by a self-diagnosis using the input data from the external RAM or the like. Further, there is a need of repeating processing which compares a signature register value storing the arithmetic result based on the input data with the expected value. For this reason, in the case where the integrated circuit is mounted with a self-diagnostic function for an arithmetic unit, a silicon semiconductor used as a main body of the integrated circuit is made into a small size, and the number of chips capable of being manufactured from a wafer is increased so as to improve a yield. In this case, however, the large-scale and complicate self-diagnostic circuit is mounted on the integrated circuit; for this reason, it is impossible to make small a die size. As a result, the yield is reduced. Moreover, the die size is made small so as to realize a low power consumption of processor. In this case, however, the self-diagnostic circuit is a large scale and complicate; for this reason, a problem has arisen such that it is impossible to make small the die size, and therefore, to sufficiently realize a low power consumption. In addition, in a manufacture of integrated circuit such as processor or the like, a time allocating to a self-diagnostic test per processor is determined depending upon the number of products month by month. In accordance with the allocated time, an input data and an expected value data used for self-diagnosis are remade; for this reason, a problem has arise such that much labor and time are spent for the preparation.

SUMMARY OF THE INVENTION

It is, therefore, an object of the present invention to provide a processor, which can carry out a self-diagnosis with respect to arithmetic unit using only input data without requiring an expected value data.

In order to achieve the above object, the present invention relates to a processor including a self-diagnostic function. The processor comprises: an arithmetic circuit including an adder-subtracter, which is a diagnostic object; a data store unit which stores a self-diagnostic data; and a self-diagnostic processing unit which inputs the self-diagnostic data, and carrying out diagnostic processing so that every bit of operation result become all zero "0" or all "1" by the arithmetic circuit.

According to the present invention, the arithmetic circuit and the self-diagnostic processing unit are constructed in a manner that in order to easily make a check, every bit of the operation result is all zero "0" (or all "1") with respect to an arbitrary self-diagnostic input data. By doing so, there is no need of providing an expected value required for a conventional self-diagnosis and a comparator circuit for the expected value. Therefore, it is possible to make small a circuit scale required for realizing a self-diagnosis; as a result, a die side processor can be made small. Further, it is possible to realize an integrated circuit such as a processor mounted with a self-diagnostic function contributing to an improvement of yield of processor and low power consumption.

In this case, the self-diagnostic processing unit carries out a self-diagnosis such that the operation result by the following addition and subtraction becomes all zero "0" when two input data are set as X and Y.

(i) subtraction Z=X−Y (X: minuend, Y: subtrahend)

(i) subtraction Z'=Y−X (Y: minuend, X: subtrahend)

(ii) addition of two subtraction results Z"=Z'+Z (iii) If the addition result is all zero "0", the adder-subtracter is normal, and if not so, the adder-subtracter has a failure.

More specifically, the arithmetic circuit includes: a first source register which stores a first operand A; a second source register which stores a second operand B; a complement circuit (inverter) which inverts the second operand B so as to output one's (1's) complement B1's; a first adder-subtracter with carry input of being as a diagnostic object, which inputs the first operand A as a minuend and inputting the output value B1's of the complement circuit as a subtrahend together with carry input Cin, and adds "1" to one's (1's) complement B1's so as to generate two's (2's)

complement B2's, and further, adds the generated complement B2's to the first operand A so as to carry out a subtraction C=(A−B); and a second adder-subtracter provided on the next stage of the first adder-subtracter.

The self-diagnostic processing unit carries out the following diagnostic processing with respect to the aforesaid arithmetic circuit using arbitrary self-diagnostic data X and Y having a predetermined bit length stored in the first and second source registers.

(i) The self-diagnostic processing unit carries out a subtraction Z=(X−Y) as Z=(X+Y2's)=(X+Y1's+1) using the complement circuit 30 and the first adder-subtracter 12 in a first cycle.

(ii) The self-diagnostic processing unit replaces the minuend X with the subtrahend Y each other, and carries out a subtraction Z'=(Y−X) as Z=(Y+X2's)=(Y+X1's+1) using the complement circuit 30 and the first adder-subtracter 12 in a second cycle.

(iii) The self-diagnostic processing unit carries out an addition Z" of the subtraction results Z and Z' in the first and second cycles, that is, Z"=(Z+Z')=(X+X1's+1+Y+Y1's +1) using the second adder-subtracter 36 in a third cycle.

(iv) The self-diagnostic processing unit makes a judgment such that the first adder-subtracter is normal in the case where every bit of the addition result is all zero "0" while making a judgment such that the first adder-subtracter has a failure in the case where every bit of the addition result is other than zero "0".

Moreover, according to another embodiment, the self-diagnostic processing unit carries out a self-diagnosis based on the following subtraction, conversion and comparative judgment when two input data are set as X and Y.

(i) subtraction Z=X−Y (X: minuend, Y: subtrahend)

(ii) subtraction Z'=Y−X (Y: minuend, X: subtrahend)

(iii) calculation of two's (2's) Z2's with respect to the subtraction result Z' Z'2's=Z1's+1

(iv) comparison of the subtraction result Z with Z' Z=Z'2's.

(v) If the comparative result is correspondent, the adder-subtracter is normal, and if not so, the adder-subtracter has a failure.

More specifically, the arithmetic circuit includes: a first source register which stores a first operand A; a second source register which stores a second operand B; a first complement circuit which inverts the second operand B so as to output one's (1's) complement B1's; an adder-subtracter with carry input of being as a diagnostic object, which inputs the first operand A as a minuend and inputting the output value B1's of the complement circuit as a subtrahend together with carry input Cin=1, and adds "1" to one's (1's) complement B1's so as to generate two's (2's) complement B2's, and further, adds the generated complement B2's to the first operand A so as to carry out a subtraction C=(A−B); and a second complement circuit which inverts the subtraction value C of the adder-subtracter and adding "1" thereto so as to output two's (2's) complement C2's; a second adder-subtracter provided on the next stage of the first adder-subtracter; and a comparator which compares an output of the adder-subtracter with an output of the second complement circuit. The self-diagnostic processing unit carries out the following diagnostic processing with respect to the aforesaid arithmetic circuit using arbitrary self-diagnostic data X and Y having a predetermined bit length stored in the first and second source registers.

(i) The self-diagnostic processing unit carries out a subtraction Z=(X−Y) as Z=(X+Y2's)=(X+Y1's+1) using the first complement circuit and the adder-subtracter in a first cycle.

(ii) The self-diagnostic processing unit replaces the minuend X with the subtrahend Y each other, and carries out a subtraction Z'=(Y−X) as Z=(Y+X2's)=(Y+X1's+1) using the first complement circuit and the adder-subtracter in a second cycle, and outputs a complement Z'2s=(Z1's+1) of the subtraction result Z' from the second complement circuit so as to compare it with the subtraction result Z of the first cycle, and makes a judgment such that the first adder-subtracter is normal in the case where the subtraction results Z' and Z are correspondent (Z'2's=Y2's−X2's=X+Y2's=Z) while making a judgment such that the first adder-subtracter has a failure in the case where the subtraction results Z' and Z are not correspondent.

The comparator makes a judgment in the following manner. More specifically, $$Z'2's = Y2's - X2's = X + Y2's = Z \tag{1}$$

The above formation is certified in the following manner.

$$Z = X - Y = X + Y1's + 1 = X + Y2's \tag{2}$$

$$Z' = Y - X = Y + X1's + 1 = Y + X2's \tag{3}$$

So, from the above equation (2), $$Y2's = -Y \tag{4}$$

From the above equation (3), $$X2's = -X \tag{5}$$

Accordingly, when the above equations (4) and (5) are substituted for the above equation (1) and is transformed, the following equation is obtained.

$$\begin{aligned} Z'2's &= Y2's - X2's \\ &= -Y - (-X) \\ &= -Y + X \\ &= X - Y \end{aligned}$$

Then, when substituting the above equation (2) for the second term "−Y" of the right side, $$\begin{aligned} Z'2's &= X + Y2's \\ &= Z \end{aligned}$$

Therefore, the relation Z'2's=Z shown in the above equation (1) is formed.

Various modifications may be possible with respect to the configuration of arithmetic circuit and self-diagnostic processing such that the operation result of the self-diagnosis becomes all zero "0" or is made correspondent.

BRIEF DESCRIPTION OF THE DRAWINGS

FIGS. 11A and 11B are circuit block diagrams showing a processor according to a sixth embodiment of the present invention;

FIGS. 13A and 13B are circuit block diagrams showing a processor according to an eighth embodiment of the present invention;

FIGS. 14A and 14B are circuit block diagrams showing a processor according to a ninth embodiment of the present invention;

FIGS. 15A and 15B are circuit block diagrams showing a processor according to a tenth embodiment of the present invention;

FIGS. 16A and 16B are a circuit block diagrams showing a processor according to an eleventh embodiment of the present invention using a pseudo-random number generation;

FIGS. 18A and 18B are a circuit block diagrams showing a processor according to a twelfth embodiment of the present invention using a pseudo-random number generation;

FIGS. 19A and 19B are a circuit block diagrams showing a processor according to a thirteenth embodiment of the present invention using a pseudo-random number generation;

FIGS. 20A and 20B are a circuit block diagrams showing a processor according to a fourteenth embodiment of the present invention using a pseudo-random number generation;

FIGS. 23A and 23B are a circuit block diagrams showing a processor according to a seventeenth embodiment of the present invention using a pseudo-random number generation.

DETAILED DESCRIPTION OF THE PREFERRED EMBODIMENTS

Figure 1:
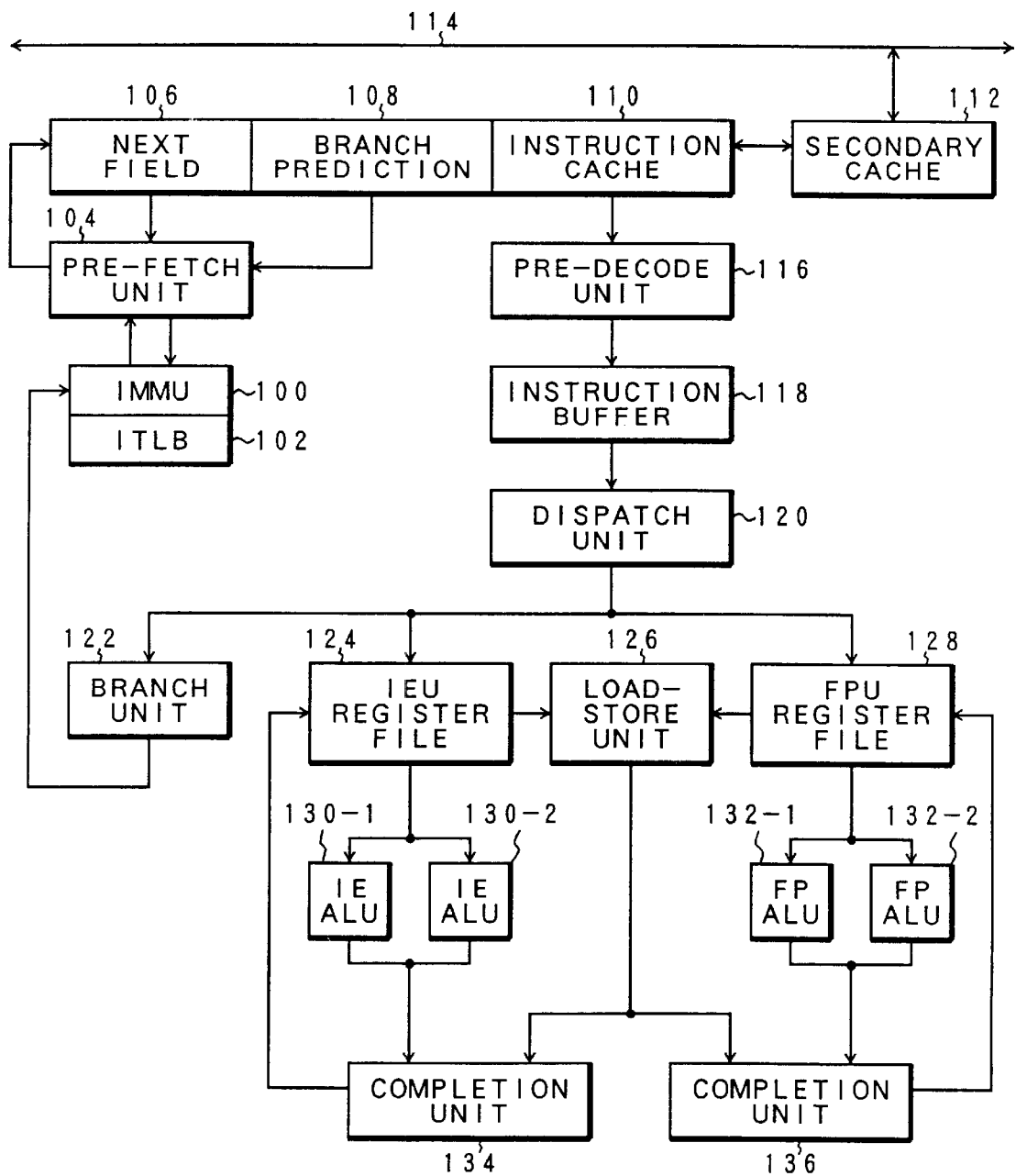
FIG. 1 is a block diagram showing a basic hardware configuration of a conventional processor.
Figure 2:
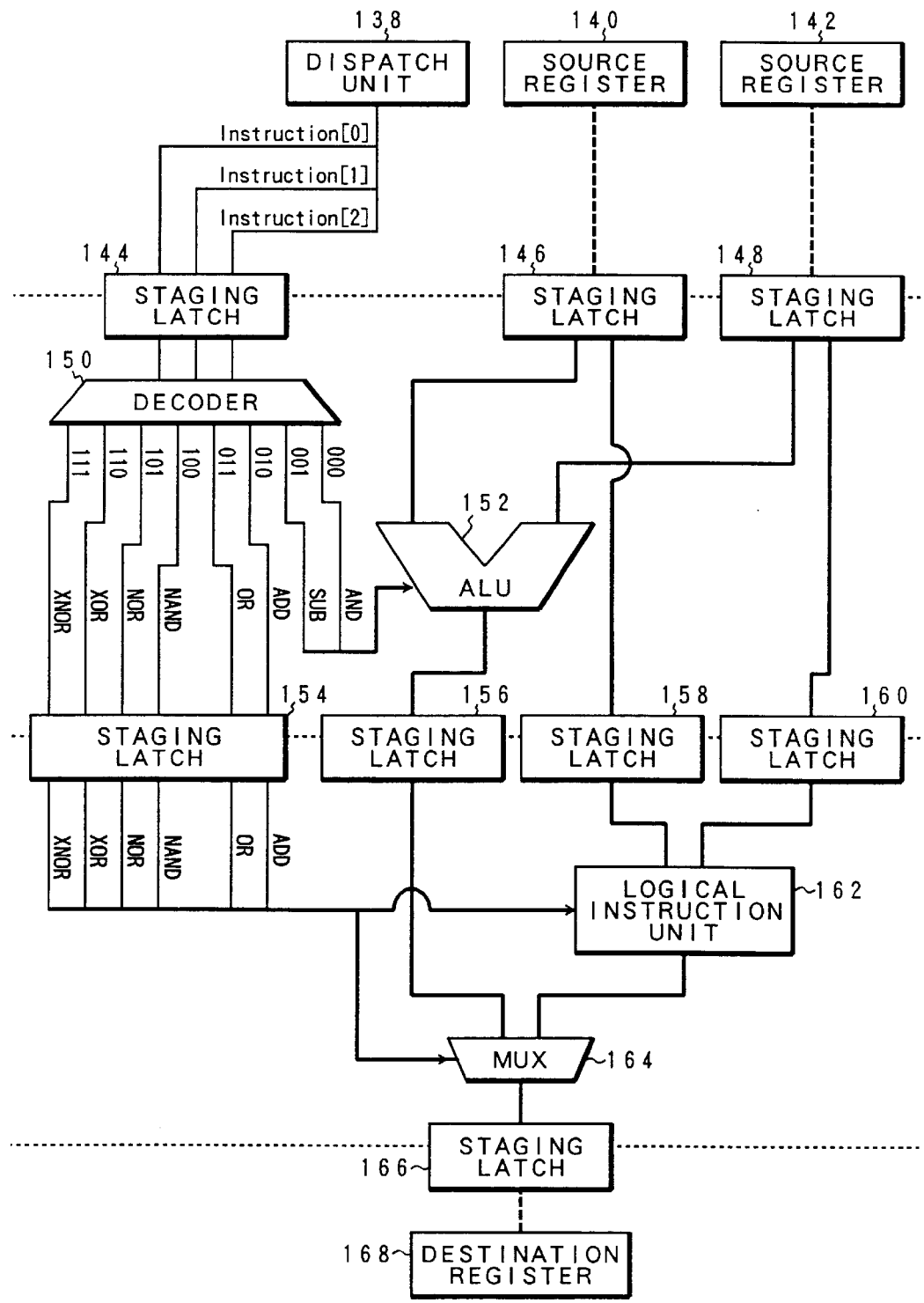
FIG. 2 is a block diagram showing a basic configuration of an integer arithmetic unit including an instruction decoder in the processor shown in FIG. 1.
Figure 3A:
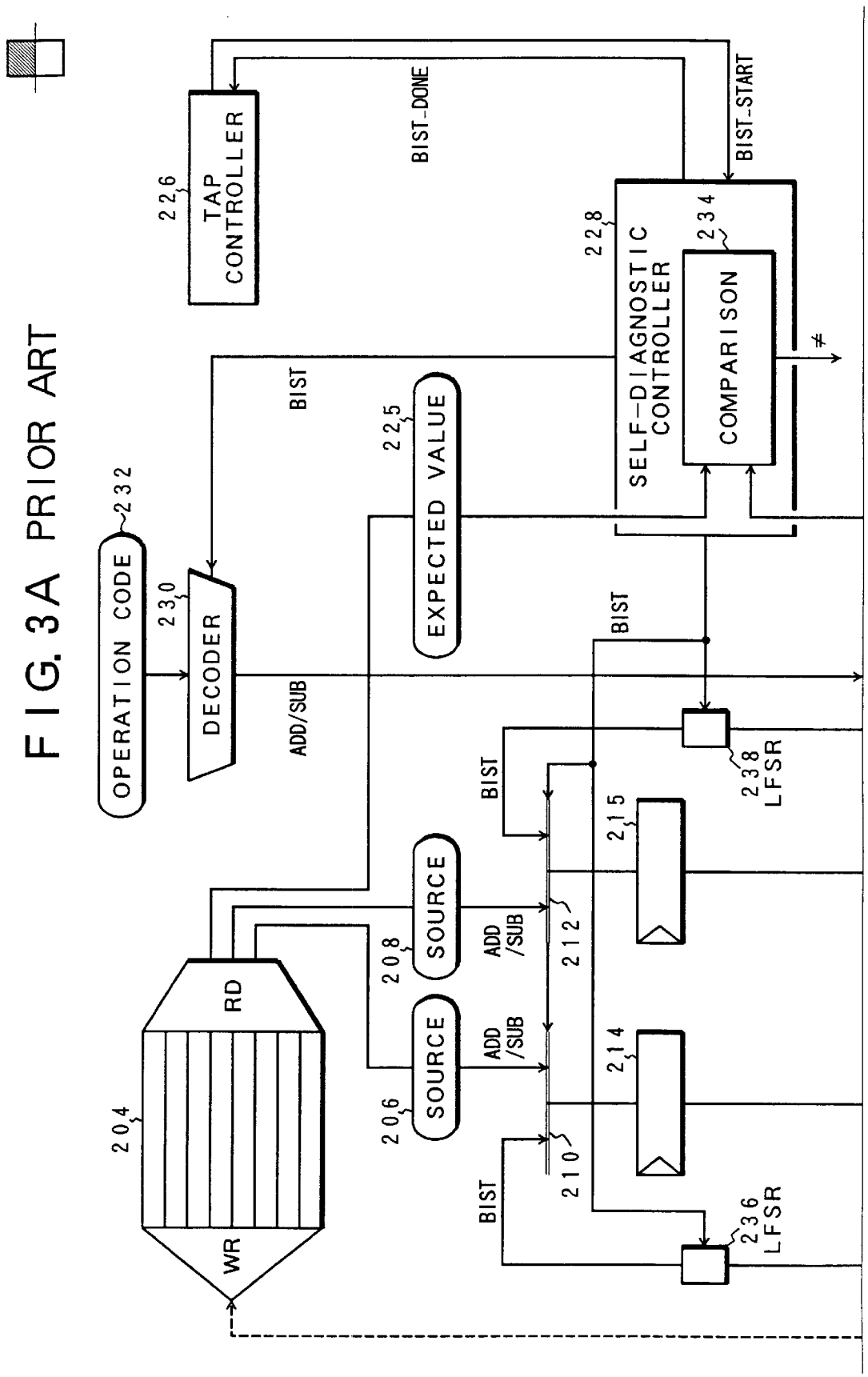
FIGS. 3A and 3B are block diagrams showings a configuration of a conventional adder-subtracter circuit including a self-diagnostic circuit.
Figure 3B:
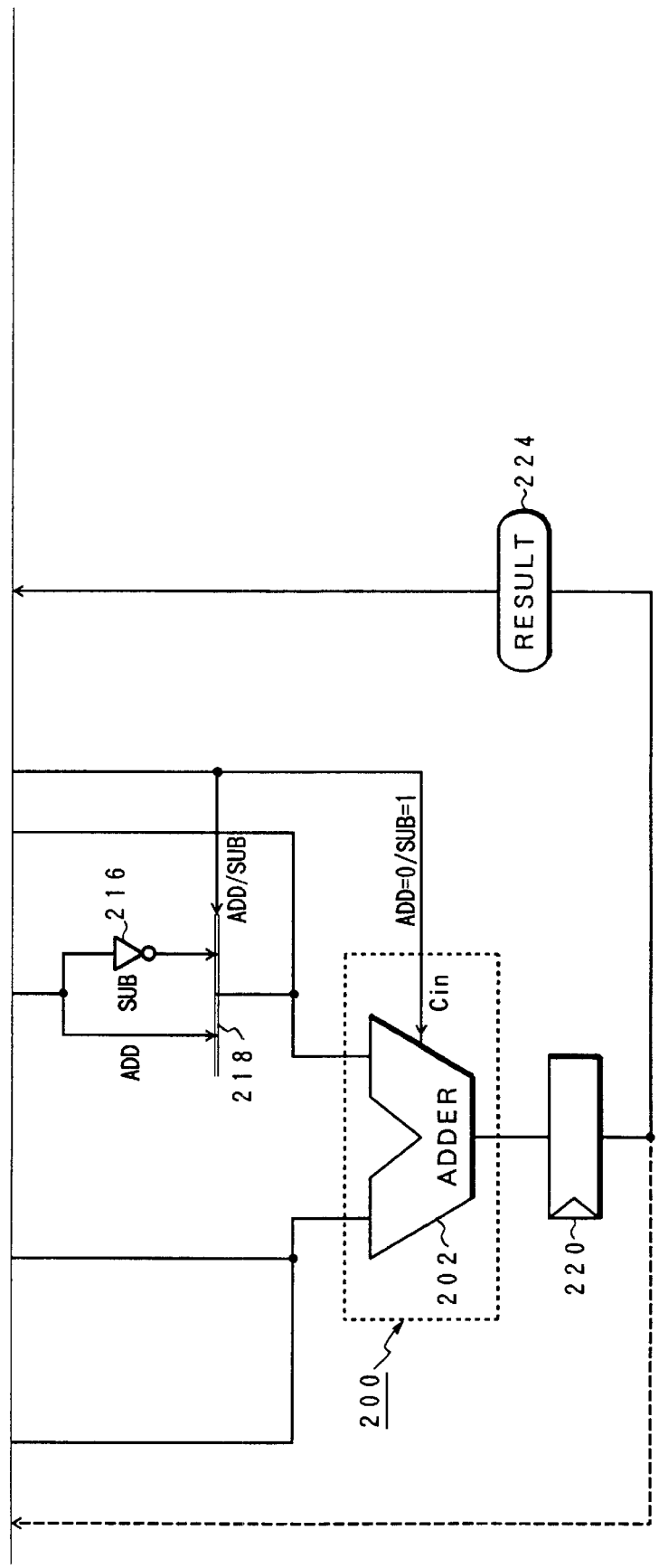
Figure 4:
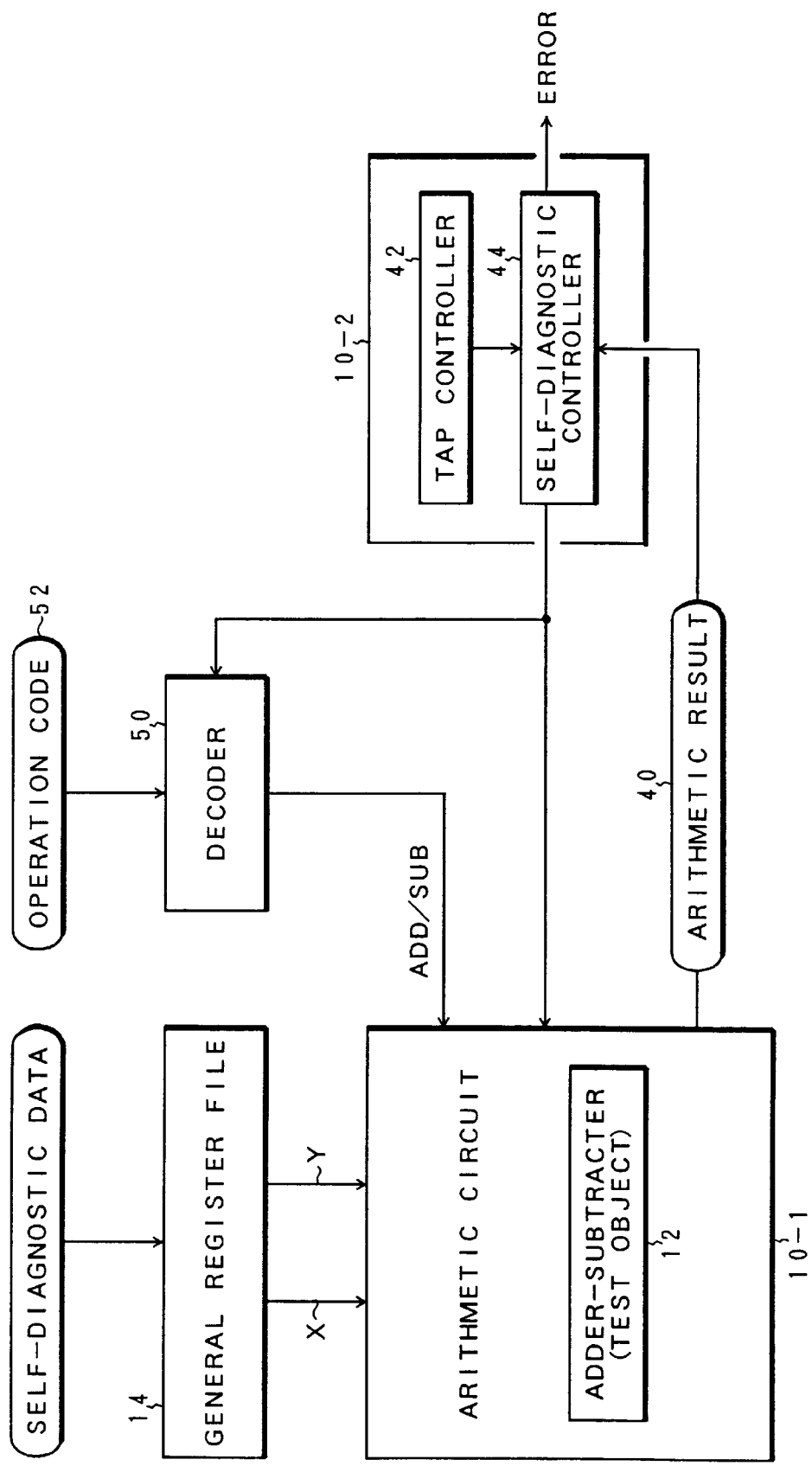
FIG. 4 is a block diagram showing a basic configuration of a processor according to the present invention.

FIG. 4 is a circuit block diagram showing a basic configuration of a processor according to the present invention.

The processor with a self-diagnostic function according to the present invention includes an arithmetic circuit 10-1, a general register file 14, and a decoder 50. More specifically, the arithmetic circuit 10-1 includes an adder-subtracter 12 which is a diagnostic object, and the general register file 14 is used as a data store section which stores a self-diagnostic data, and further, the decoder 50 inputs and decodes an operation code, and thereby, outputs an addition instruction ADD or a subtraction instruction SUB. A self-diagnostic processing unit 10-2 is provided with respect to the arithmetic circuit 10-1 including the adder-subtracter 12 regarded as a test object. The self-diagnostic processing unit 10-2 is provided with a TAP (Test Access Port) controller 42 and a self-diagnostic controller 44. In a wafer manufacture step and a package manufacture step of an LSI manufacture process, the TAP controller 42 makes a self-diagnostic test with respect to a RAM built in the LSI and a built-in arithmetic unit according to the control of the self-diagnostic controller 44. More specifically, the arithmetic circuit 10-1 including the adder-subtracter 12 regarded as a self-diagnostic object is constructed in a manner of generating two's complement with respect to input test data X and Y. In the case of carrying out self-diagnostic processing, the following operations are carried out with respect to two input test data X and Y.

(i) subtraction Z=X−Y (X: minuend, Y: subtrahend)

(ii) subtraction Z'=Y−X (Y: minuend, X: subtrahend)

(iii) addition of two subtraction results Z"=Z+Z'=0

Then, when a confirmation is made such that every bit of the final operation result ZZ becomes zero "0", the TAP controller 42 carries out self-diagnostic processing with respect to the arithmetic circuit 10-1 requiring no comparison of an operation result with an expected value.

According to another embodiment of the self-diagnostic processing of the present invention, the following subtraction, conversion and comparative judgment are carried out with respect to the above two input test data X and Y.

(i) subtraction Z=X−Y (X: minuend, Y: subtrahend)

(ii) subtraction Z'=Y−X (Y: minuend, X: subtrahend)

(iii) calculate two's complement Z2's with respect to the subtraction result Z' Z2's=Z1's+1

(iv) comparison of subtraction result with convention result Z=Z2's

Then, when a confirmation is such that the above comparative result is correspondent, the TAP controller 42 carries out a self-diagnosis requiring no comparison of an operation result with an expected value.

First Embodiment

Figure 5A:
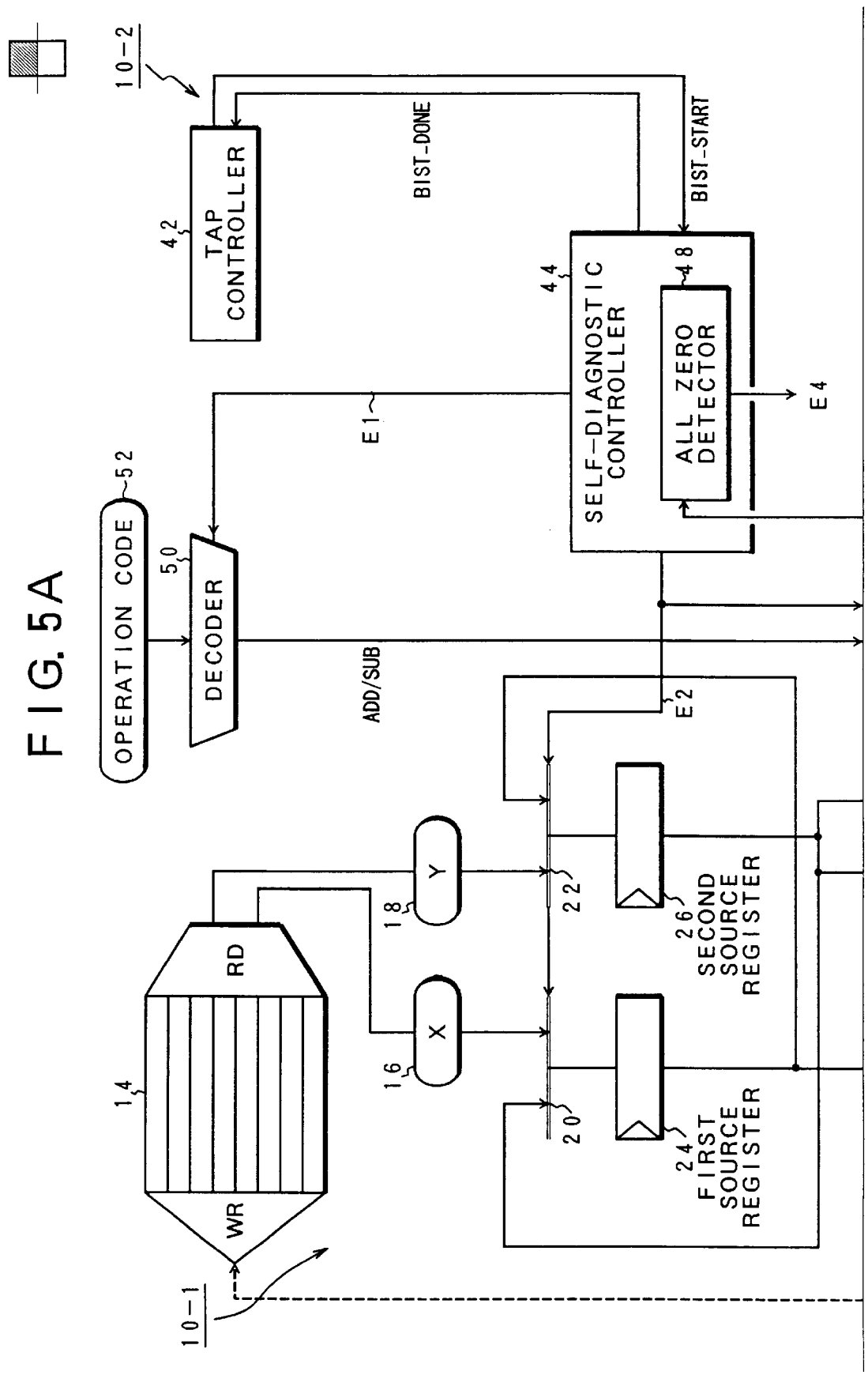
FIGS. 5A and 5B are circuit block diagrams showing a processor according to a first embodiment of the present invention.
Figure 5B:
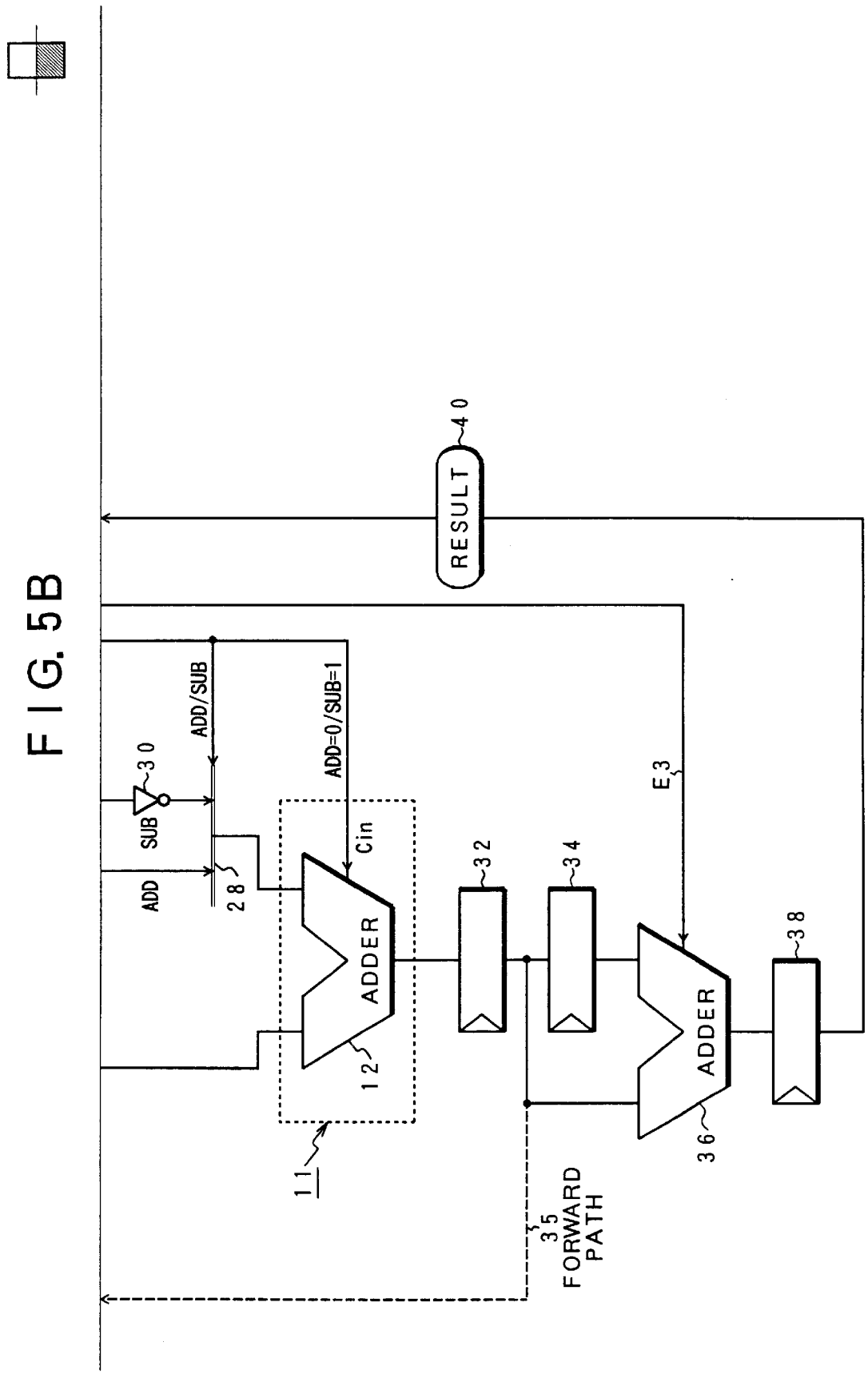

FIGS. 5A and 5B are circuit block diagrams showing a processor including a self-diagnostic function according to a first embodiment of the present invention. This first embodiment has the following constituent features; more specifically, the arithmetic circuit makes an operation so that every bit of its operation result becomes all zero "0", and thereafter, the operation result is confirmed. The processor of the first embodiment is composed of an arithmetic circuit unit 10-1 and a self-diagnostic processing unit 10-2. The self-diagnostic processing unit 10-2 is provided with a TAP controller 42 and a self-diagnostic controller 44. In a wafer manufacture step and a package manufacture step of an LSI manufacture process, the TAP controller 42 controls a self-diagnostic test with respect to the adder-subtracter 12 as a test object 11, built-in the arithmetic circuit 10-1. More specifically, the TAP controller 42 starts the self-diagnostic controller 44 by a BIST START signal, and receives a diagnosis completion by a BIST DONE signal. The self-diagnostic controller 44 operates by the BIST START signal from the TAP controller 42, and controls the arithmetic circuit 10-1 side so as to carry out a self-diagnostic test. Further, the self-diagnostic controller 44 is provided with an all-zero detector 48. The all-zero detector 48 inputs an operation result 40 by the self-diagnostic test from the arithmetic circuit 10-1, and makes a judgment such that the adder-subtracter 12 as a test object 11 is normal in the case where every bit of the operation result 40 is all zero "0". On the other hand, in the case where every bit of the operation result 40 is not all zero "0", the all-zero detector 48 makes a judgment such that the adder-subtracter 12 as a test object 11 is abnormal, and then, outputs an error signal E4 to an external unit so as to make an error detection message. Next, the following is a description on the arithmetic circuit 10-1 side, which is a self-diagnostic test object. The arithmetic circuit 10-1 is provided with a general register file 14, multiplexers 20 and 22, a first source register 24, a second source register 26, an inverter 30 used as a complement circuit which generates one's complement, and a multiplexer 28. Further, the arithmetic circuit 10-1 is provided with a two-input adder-subtracter 12 with a carry input Cin, which is a test object 11, destination registers 32, 34 and 38, a two-input adder-subtracter 36 having no carry input, and a decoder 50. The decoder 50 inputs an operation code 52 of program, and decodes an addition instruction ADD or a subtraction instruction SUB as an instruction to an arithmetic unit. The general register file 14 is a set of registers holding data such as integer data and address used in the processor. In a self-diagnostic test of the present invention, a prepared test data used for self-diagnosis is read from an external RAM or the like via a write port WR. A stored data of the general register file 14 is read from a read port RD as a first source data 16 and a second source data 18, and then, is stored in a first source register 24 and a second source register 26 via multiplexers 20 and 22. In the case of carrying out the self-diagnostic test, a first test data X and a second test data Y are read from the general register file 14, and then, are stored in the first source register 24 and the second source register 26, respectively. In this case, the data handled in this first embodiment is a 32-bit string data, for example. The multiplexer 20 selects a value of the first source data 16 and a value of the first source register 24 according to a control signal E2 from the self-diagnostic controller 44, and then, outputs the selected value. Likewise, the multiplexer 22 selects a value of the second source data 18 and a value of the second source register 26 according to a control signal E2 from the self-diagnostic controller 44, and then, outputs the selected value. In this case, the first source register 24 holds a value of the first operand of the adder-subtracter; on the other hand, the second source register 26 holds a value of the second operand of the adder-subtracter. The inverter 30 inverts a value held in the second source register 26, and functions as a complement circuit which generates one's complement. The multiplexer 28 selects and outputs a value of the second source register 26 and a value of the inverter 30 according to an operation instruction from the decoder 50. In the self-diagnostic test of the present invention, a subtraction instruction SUB from the decoder 50 is outputted, and the multiplexer 28 selects an output from the inverter 30, and thereafter, outputs one's (1's) complement inverting the value of the second source register 26. The adder-subtracter 12, which is a test object 11 in this first embodiment, is a two-input adder-subtracter with carry input having a carry input Cin for an output of the decoder 50. In the case of the addition instruction ADD, the carry input is Cin=0; on the other hand, in the case of the subtraction instruction SUB, the carry input is Cin=1. Thus, in the case of a normal addition instruction ADD, when the first operand of the adder-subtracter 12 is set to A, the second operand thereof is set to B, and the addition output is C, the adder-subtracter 12 makes an addition of C=A+B. Moreover, in the case of the self-diagnostic test, the adder-subtracter 12 receives the subtraction instruction SUB from the decoder 50. When the value of the first source register 24 is set to a first operand A and the value of the second source register 26 is set to a second operand B, the multiplexer 28 generates one's complement B1's inverting the second operand B. Further, the multiplexer 28 generates two's complement B2's (=B1's+1) of the second operand B by the carry input Cin=1 to the adder-subtracter 12. By doing so, the multiplexer 28 executes the following subtraction instruction.

$$C'=A+B2's=A-B$$

Figure 6:
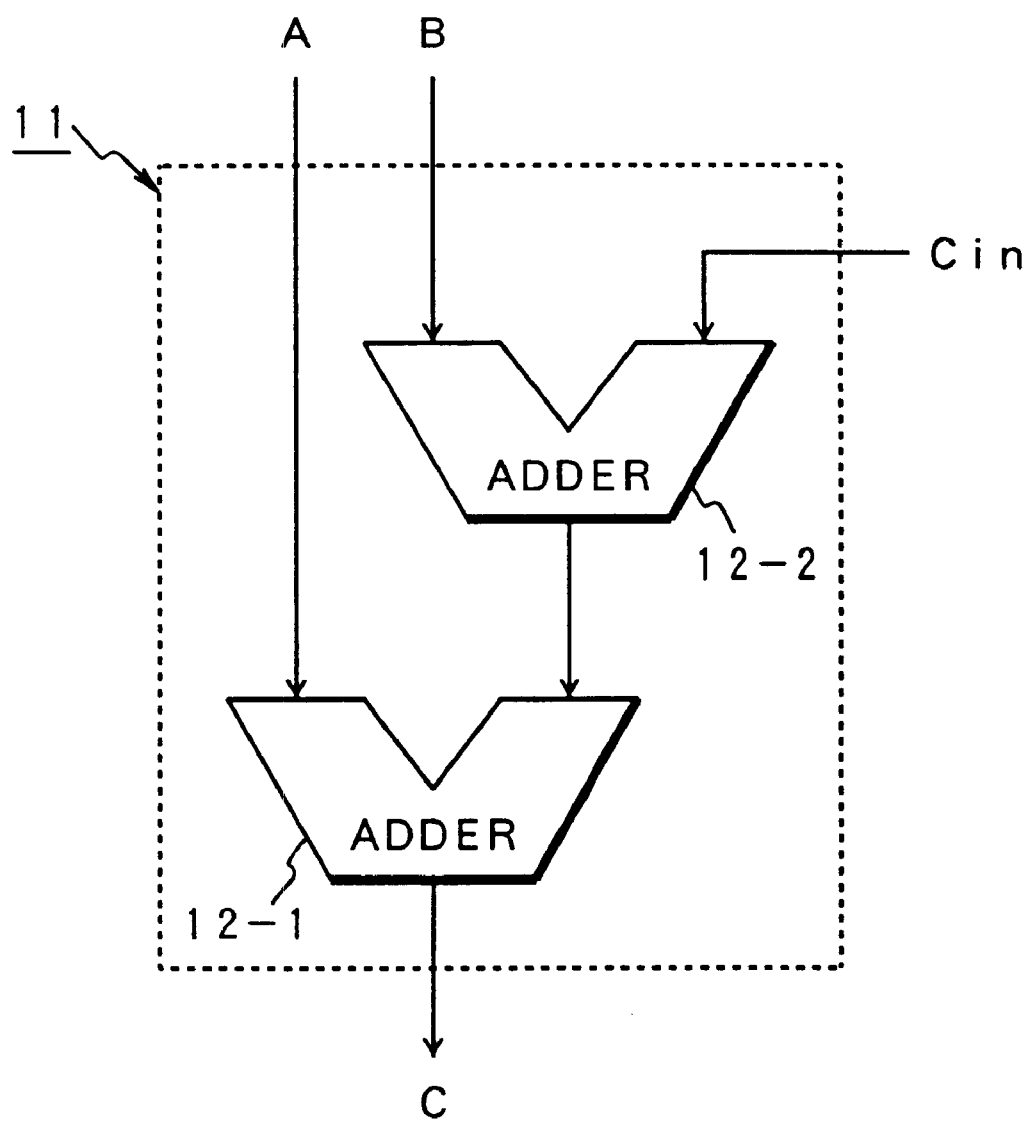
FIG. 6 is a circuit diagram showing a two-input adder-subtracter with carry input, shown in FIGS. 5A and 5B.

The two-input adder-subtracter 12 with carry input Cin has a circuit configuration as shown in FIG. 6. An arithmetic unit 10 is composed of an adder-subtracter 12-1 and an adder-subtracter 12-2. One of the adder-subtracter 12-1 inputs the first operand A of instruction, and the other of the thereof inputs an addition result of the adder-subtracter 12-2. The adder-subtracter 12-2 adds the second operand B of instruction and the carry input Cin, and outputs the addition result. Therefore, an addition output C of the adder-subtracter 12 is C=A+B+Cin, and in this case, the carry input Cin is Cin=0 in the case of the addition instruction ADD from the decoder 50, and is Cin=1 in the case of the subtraction instruction SUB from the decoder 50.

Now, referring again to FIGS. 5A and 5B, a destination register 32 provided on the output side of the adder-subtracter 12 holes an operation result of the adder-subtracter 12 in normal operation processing, and then, outputs a value of the operation result thus held to a data forward path 35, and finally, reflects the operation result in the general register file 14. Moreover, in the case of the self-diagnostic test of the present invention, the destination register 32 holds the second cycle operation result, that is, a value of the subtraction result Z=Y−X (=Y+X2's=Y+X1's+1). On the other hand, the next destination register 34 holds a value of the first cycle subtraction result, that is, Z=X−Y (=X+Y2's=X+Y1's+1) in the case of the self-diagnostic test of the present invention. A two-input adder-subtracter 36 is effective only in the case of self-diagnostic test, and then, receives a control signal E3 from the self-diagnostic controller 44. Further, the two-input subtracter 36 adds the subtraction result Z of the destination register 34 obtained from two time subtractions by the adder-subtracter 12 and the subtraction result Z' of the destination register 32, and thereby, makes an operation of Z"=Z+Z'=(X−Y)+(Y−X)=X+Y2's+Y+X2's. A destination register 38, which is an output stage of the adder-subtracter 36, holds the final operation result Z"=Z+Z' of the self-diagnostic test. The operation result 40 is given to the all-zero detector 48 of the self-diagnostic controller 44 so as to make a confirmation of all zero.

Next, the following is a description on an operation with respect to C=A+B by the addition instruction ADD of a normal operation instruction in the first embodiment of FIGS. 5A and 5B and C'=A−B by the subtraction instruction SUB. First, the first operand A and the second operand B of the operation instruction are read from the read port of the general register file 14 as the first source data 16 and the second source data 18, and thereafter, stored in the first source register 24 and the second source register 26 via the multiplexers 20 and 22, respectively. On the other hand, an operation code 52 of the operation instruction is decoded by the decoder 50, and then, if the operation instruction is an addition instruction ADD, the multiplexer 28 intactly selects the second operand B of the first source register 26. Therefore, the first operand A, the second operand B and the carry input Cin=0 are inputted to the adder-subtracter 12, and then, an operation of C=A+B is made. Moreover, if the operation instruction is an subtraction instruction SUB, the multiplexer 28 selects an output of the inverter 30. Therefore, the first operand A, one's (1's) complement B1's inverting the second operand B and the carry input Cin=1 are inputted to the adder-subtracter 12, and then, an operation of C'=A−B=A+B2's=A+B1's+1 is made.

The operation result of the adder-subtracter 12, that is, each value of C and C' is held in the destination register 32, and then, is outputted to the data forward path 35, and finally, is reflected in the general register file 14 from the write port.

Next, the following is a description on an operation of the self-diagnostic test of the present invention. In the case of the self-diagnostic test, the TAP controller 42 asserts a BIST START signal to the self-diagnostic controller 44, and thereafter, the operation of self-diagnostic test is started. By the start of the self-diagnostic test, the test data already stored in the general register file 14, that is, the first operand X and the second operand Y of the operation are read from the read port. Then, these first operand X and the second operand Y are selected by the multiplexers 20 and 22, and thus, are held in the first and second source registers 24 and 26, respectively. On the other hand, the self-diagnostic controller 44 controls the decoder 50 according to a control signal E1, and then, the decoder 50 decodes the operation code 52, and then, outputs a subtraction instruction SUB. According to the subtraction instruction SUB from the decoder 50, the multiplexer 28 selects an output of the inverter 30, and thereby, the first operand X, one's (1's) complement Y1's inverting the second operand Y and the carry input Cin=1 are inputted to the adder-subtracter 12.

As a result, in the first cycle of self-diagnostic processing, the adder-subtracter 12 makes the following operation as the subtraction result Z.

$$Z=X-Y=X+Y2's=X+Y1's+1$$

Then, the adder-subtracter 12 holds the operation result Z in the destination register 32. Subsequently, in the second cycle of self-diagnostic test after one clock, the self-diagnostic controller 44 controls the multiplexers 20 and 22, and then, selects an input such that the values X and Y of the first and second source registers 24 and 26 are replaced with each other. By doing so, the value of the first cycle is changed; more specifically, the first operand Y is held in the first source register 24, and the second operand X is held in the second source register 26.

Moreover, the multiplexer 28 continuously selects an output of the inverter 30 according to the subtraction instruction SUB from the decoder 50. Therefore, the first operand Y, the second operand X and the carry input Cin=1 are inputted to the adder-subtracter 12, and then, the following operation is made.

$$Z'=Y-X=Y+X2's=Y+X1's+1$$

In this case, the previous operation result, that is, the value of Z=X−Y is held in the destination register 34 because one clock elapsed. Thus, the present subtraction result, that is, the value of Z'=Y−X is held in the destination register 32. As described above, the subtraction results Z' and Z held in the destination registers 32 and 34 are inputted to the two-input adder-subtracter 36 as a first operand Z' and a second operand Z, and thus, an operation of Z''=Z+Z' is made. The operation result Z'' is held in the destination register 38, and thereafter, is outputted as the operation result 40 to the all-zero detector 48 of the self-diagnostic controller 44. At that time, in the case where the adder-subtracter 12 regarded as a test object 11 is normal, the subtraction result Z'' has the following relation.

$$\begin{aligned} Z'' = Z + Z' &= (X-Y) + (Y-X) \\ &= X + Y2's + Y + X2's \\ &= (X + X2's) + (Y + Y2's) \\ &= 0 + 0 \\ &= 0 \end{aligned}$$

Thus, the all-zero detector 48 of the self-diagnostic controller 44 only makes a check whether or not every bit of the operation result 40 is all zero. Therefore, unlike the conventional case, there is no need of preparing an expected value as the operation result of the test data X and Y, and comparing the prepared expected value with the actual operation result. Thus, the all-zero detector 48 may be constructed in a manner of having a circuit configuration taking an OR logic of every bit. According to an OR output of the every-bit OR input logic circuit as described above, if every bit is not all zero, an error signal E4 is outputted so that the failure of the arithmetic 12 unit can be notified to an external unit. The above self-diagnostic test is repeated plural times with respect to a couple of remaining two input data previously stored in the general register file 14, and thereby, the self-diagnosis is completed.

Second Embodiment

Figure 7A:
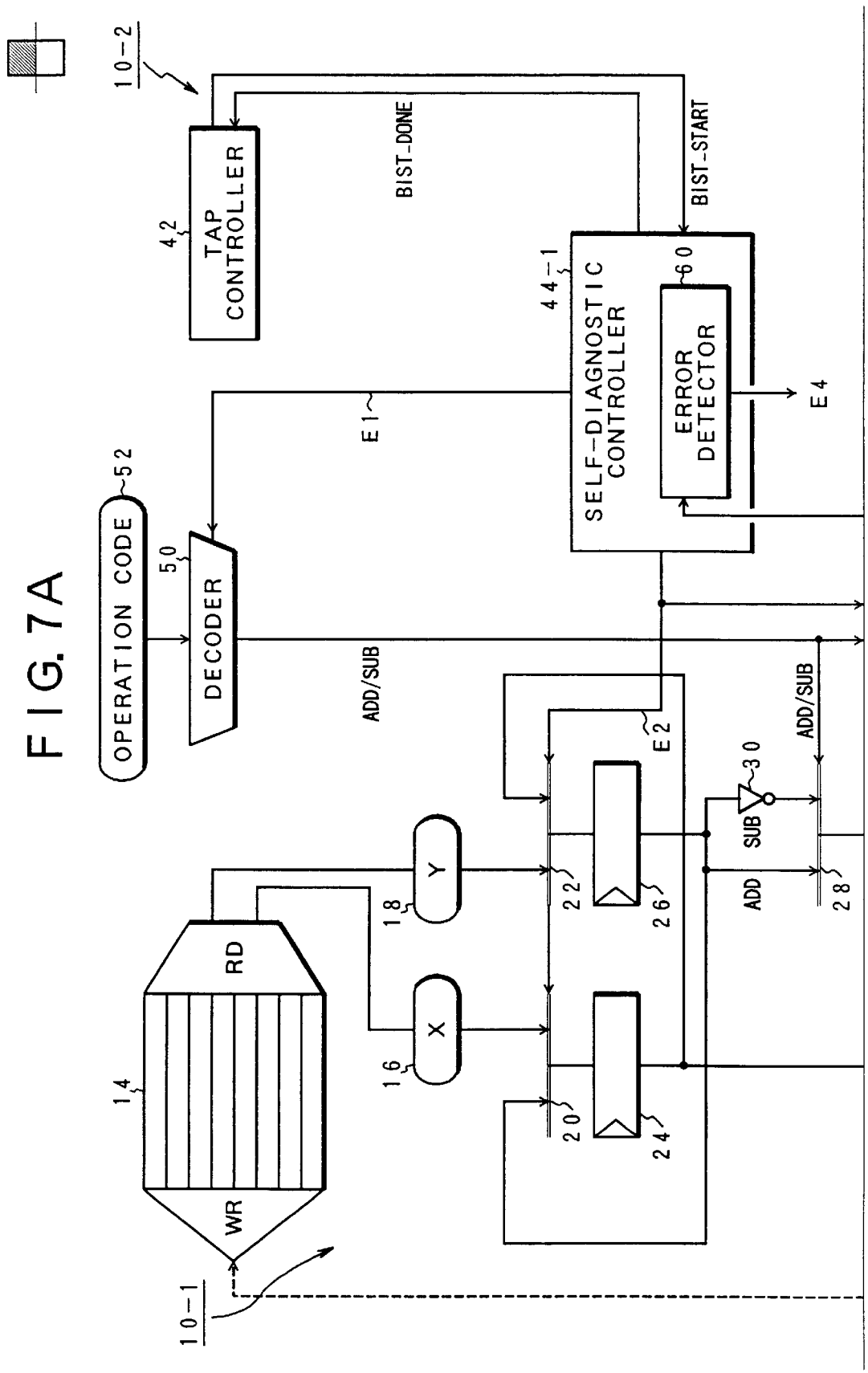
FIGS. 7A and 7B are circuit block diagrams showing a processor according to a second embodiment of the present invention.
Figure 7B:
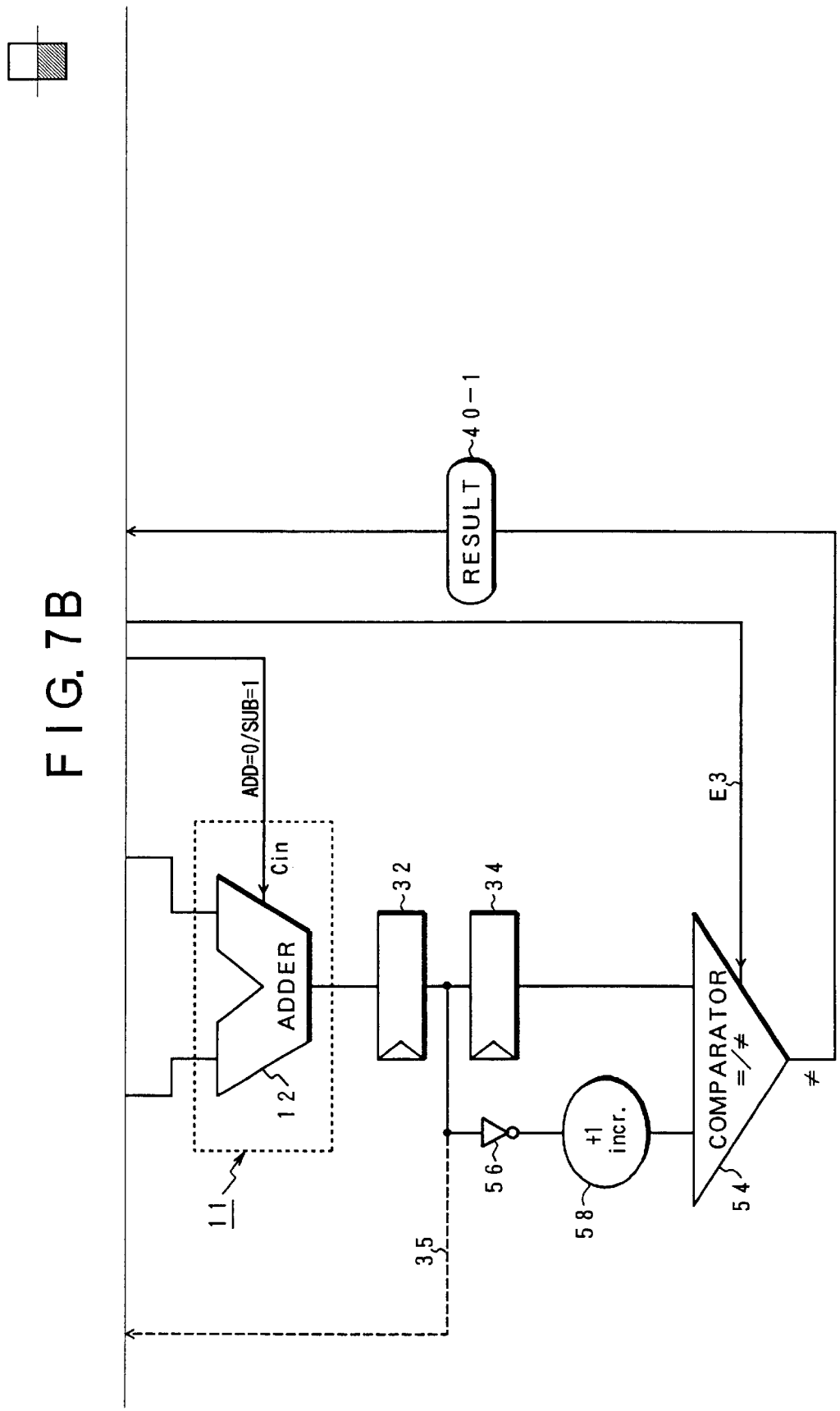

FIGS. 7A and 7B are circuit block diagrams showing a processor including a self-diagnostic function according to a second embodiment of the present invention. The processor requires no comparison of an operation result with an expected value. This second embodiment has the following constituent features. More specifically, the following subtractions of Z=X−Y and Z'=Y−X are carried out with respect to two input test data X and Y, and thereafter, the first time operation result Z and two's (2's) complement Z'2's of the second time operation result Z' are compared. Further, based on the comparative result, a self-diagnostic test requiring no comparison of the operation result with the expected values of input data X and Y is carried out. The configuration from the general register file 14 on the arithmetic circuit 10-1 side to the destination register 34 is the same as the above first embodiment in FIGS. 5A and 5B. Thus, in the case of carrying out the self-diagnostic test, two test data X and Y are read from the general register file 14, and then, is held in the first source register 24 and the second source register 26, respectively. Thereafter, in the first cycle, a subtraction of Z=X−Y=X+Y2's=(X+Y1's+1) is made, and then, the first cycle processing held in the destination register 32 is carried out. In the next second cycle, a subtraction replacing the input data X and Y with each other, that is, Z'=(Y−X)=(Y+X2's)=(Y+X1's+1) is carried out. Further, the first cycle operation result is held in the destination register 34 because it is obtained after one clock elapsed, and the second cycle operation result is held in the destination register 32. Following these destination registers 32 and 34, in this second embodiment, a comparator 54 is provided. The first time subtraction result Z held in the destination register 34 is inputted to one input of the comparator 54. Moreover, the other input of the comparator 54 is provided with an inverter 56 and a +1 increment circuit 58. Thus, the second time subtraction result Z' held in the destination register 32 is inverted by the inverter 56, and then, becomes one's (1's) complement Z1's. Subsequently, "1" is added (incremented) by the +1 increment circuit 58, and thereby, the second time subtraction result Z' is converted into two's (2's) complement of Z', that is, Z'2's=Z'1's+1, and thereafter, is inputted to the comparator 54. Therefore, the comparator 54 makes a comparison of a first operand Z used as the value of the destination register 34 with a second operand Z'2's converted by the inverter 56 and the +1 increment circuit 58, and then, outputs a comparative result 40-1. On the other hand, the self-diagnostic processing unit 10-2 side is provided with a TAP controller 42 and a self-diagnostic controller 44-1. The self-diagnostic controller 44-1 is provided with an error detector 60. The error detector 60 inputs the comparative result 40-1 from the comparator 54 of the arithmetic circuit unit 10-1, and makes a judgment such that the adder-subtracter 12 of being the test object 11 is normal, if the first operand Z and the second operand Z'2's in the comparator 54 are correspondent each other. On the other hand, if the comparative result is not correspondent, the error detector 60 detects an error, and then, outputs an error signal E4 indicative of a failure of the adder-subtracter 12 to the external unit. In this case, a formation of the correspondent relation of the first operand Z and the second operand Z'2's in the comparator 54 is certified in the following manner. First, the final operation result is as follows.

$$Z'2's=Y2's-X2's=X+Y2's=Z \quad (6)$$

The above formation is certified in the following manner. In this case, $$Z=X-Y=X+Y1's+1=X+Y2's \quad (7)$$

$$Z=Y-X=Y+X1's+1=Y+X2's \quad (8)$$

So, from the above equation (7), $$Y2's=-Y \quad (9)$$

From the above equation (8), $$X2's=-X \quad (10)$$

Accordingly, when the above equations (9) and (10) are substituted for the above equation (6) and is transformed, the following equation is obtained.

$$Z'2's = X + Y2's$$
$$= -Y - (-X)$$
$$= -Y + X$$
$$= X - Y$$

Then, when substituting the above equation (7) for the second term "−Y" of the right side, $$Z'2's = X + Y2's$$
$$= Z$$

Therefore, the relation Z'2's=Z shown in the above equation (5) is formed. Moreover, in the case where the operation of the adder-subtracter 12 is correct, the first operand Z' and the second operand Z'2's are correspondent. Therefore, the comparator 54 takes an EXOR logic of every bit with respect to each of the first operand Z' and the second operand Z'2's, and thereafter, may take an OR logic of the EXOR output of every bit. As a result, it is possible to constitute the comparator 54 by using a simple logic data.

Third Embodiment

Figure 8A:
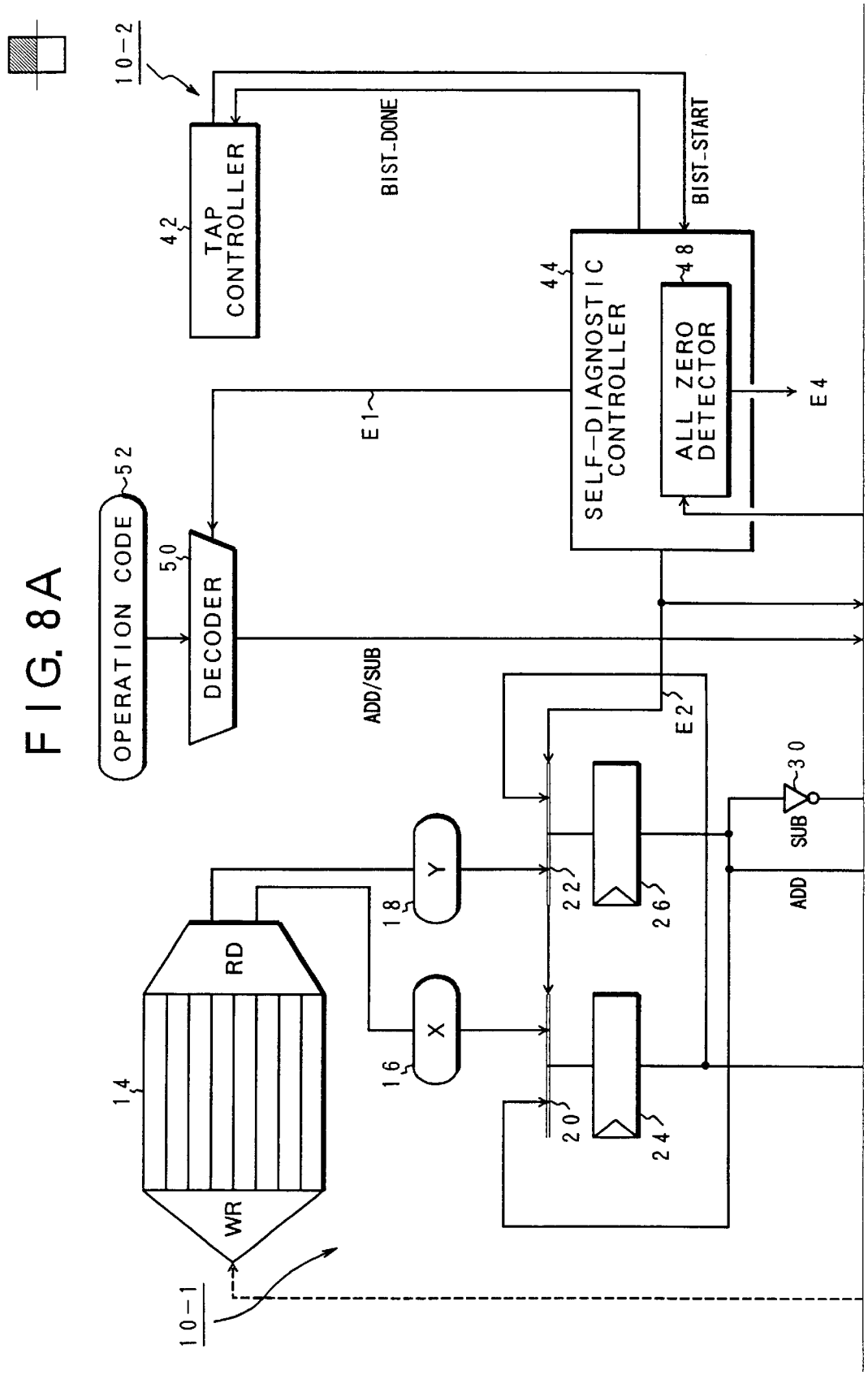
FIGS. 8A and 8B are circuit block diagrams showing a processor according to a third embodiment of the present invention.
Figure 8B:
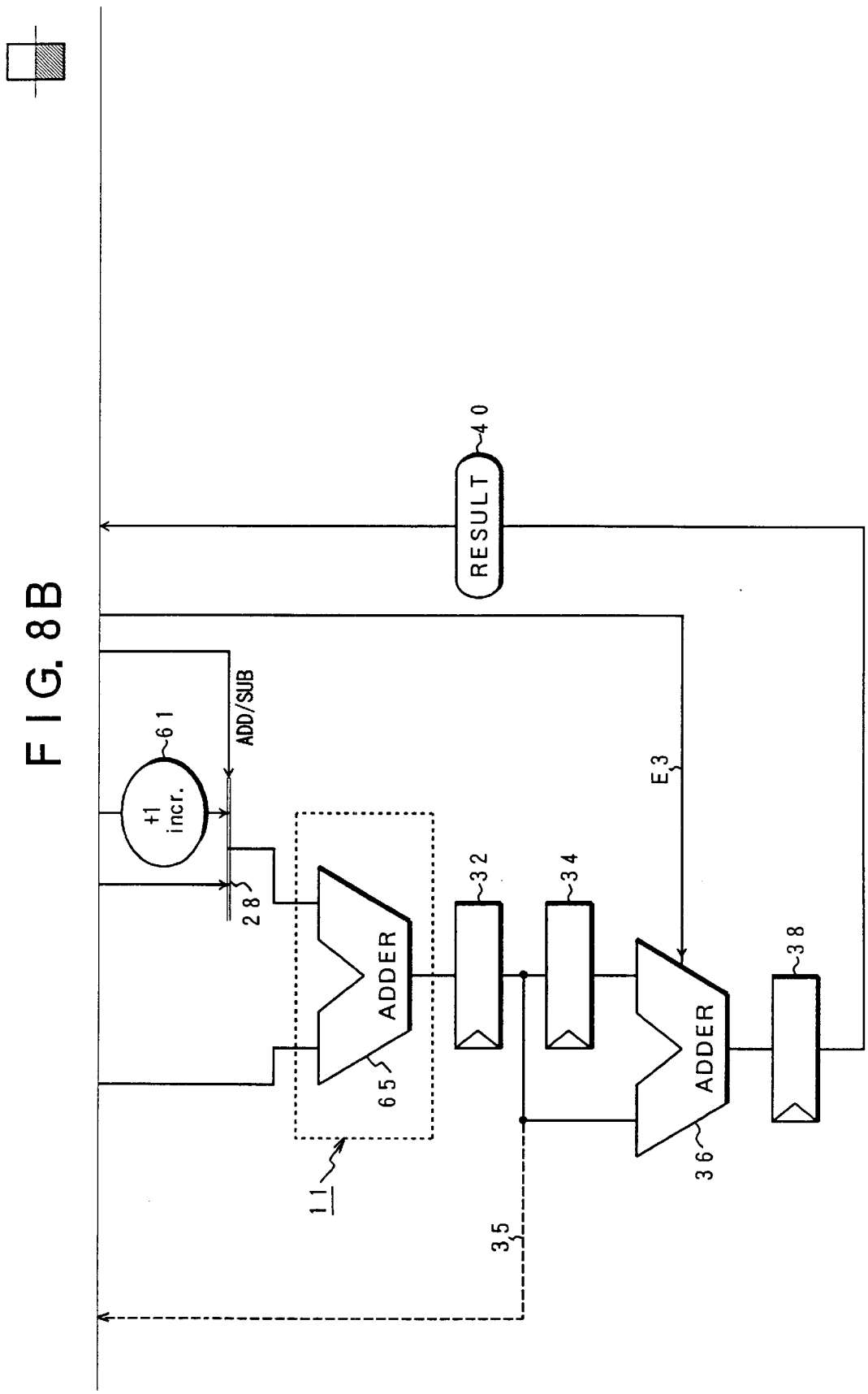

FIGS. 8A and 8B are circuit block diagrams showing a processor including a self-diagnostic function according to a third embodiment of the present invention. This third embodiment has the following constituent features; more specifically, the processor is provided with a two-input adder-subtracter having no carry input, as a test object. The self-diagnostic processing unit 10-2 is composed of a TAP controller 42 and a self-diagnostic controller 44, like the above first embodiment shown in FIGS. 5A and 5B, and the self-diagnostic controller 44 is provided with an all-zero detector 48. An arithmetic circuit 10-1 includes a two-input adder-subtracter 65 having no carry input, as a test object. This third embodiment is the same as the first embodiment of FIGS. 5A and 5B in that the input side of the adder-subtracter 65 is provided with a register file 14, multiplexers 20 and 22, a first source register 24, a second source register 26, an inverter 30 and a multiplexer 28. However, the adder-subtracter 65 has no carry input, and therefore, a +1 increment circuit 61 is provided following the inverter 30. By using the inverter 30 and the +1 increment circuit 61, the second operand B of the second source register 26 is inverted by the inverter 30, and then, is converted into one's (1's) complement B1's. Thereafter, the +1 increment circuit 61 adds (increments) "1", and thereby, the second operand B is converted into two's (2's) complement B2's, and then, outputs it to the adder-subtracter 65. Thus, the adder-subtracter 65 inputs the first operand A because the second operand B2's of the multiplexer 28 is selected and outputted according to the subtraction instruction SUB from the decoder 50, and therefore, executes a subtraction of C=A+B2's=A−B. An output stage of the adder-subtracter 65 is provided with destination registers 32 and 34, a two-input adder-subtracter 36 and a destination register 38, and therefore, this configuration is the same as the first embodiment of FIGS. 5A and 5B.

Next, the following is a description on an operation of self-diagnostic test according to the third embodiment shown in FIGS. 8A and 8B. When the TAP controller 42 asserts a BIST START signal, the self-diagnostic controller 44 is operated, and then, starts a self-diagnostic test. First, the self-diagnostic controller 44 reads operands X and Y as test data from the general register file 14, and then, holds these operands in the first and second source registers 24 and 26 via the multiplexers 20 and 22. At that time, the subtraction instruction SUB is outputted by the control of the decoder 50, and therefore, the multiplexer 28 selects an output of the +1 increment circuit 61. Thus, the first operand X and the second operand B2's are inputted to the adder-subtracter 65 as a test object, and then, the following operation is made.

$$Z=X+Y2\text{'s}=X+Y1\text{'s}+1=X-Y$$

Thereafter, the subtraction result is held in the destination register 32. In the next second cycle, according to a control signal E2 of the self-diagnostic controller 44, the multiplexer 20 selects and outputs a test data X of the second source register 26, and simultaneously, the multiplexer 22 selects and outputs a test data X of the first source register 24. By doing so, the values of the source registers 24 and 26 are replaced with each other. At that time, the multiplexer 28 continuously receives the subtraction instruction SUB from the decoder. Thus, the first operand Y and the second operand the second operand X2's converted by the inverter 30 and the +1 increment circuit 61 are inputted to the adder-subtracter 65, and then, the adder-subtracter 65 executes the following operation.

$$Z'=Y+X2\text{'s}=Y+X1\text{'s}+1=Y-X$$

The second time subtraction result is held in the destination register 32 because one clock elapsed, and the previous subtraction result Z is held in the destination register 34. Therefore, the first operand Z' and the second operand Z are inputted to the adder-subtracter 36, and then, the adder-subtracter 36 executes an operation of Z"=Z+Z', and thereafter, the operation result is held in the destination register 38. The operation result Z" of the adder-subtracter 36 is as follows if the adder-subtracter 65 is normal.

$$\begin{aligned}Z'' &= Z + Z' = (X - Y) + (Y - X)\\ &= X + Y2's + Y2's + Y + X2's\\ &= (X + X2's) + (Y + Y2's)\\ &= 0 + 0\\ &= 0\end{aligned}$$

The addition result 40 of the adder-subtracter 36 is given to the all-zero detector 48 of the self-diagnostic controller 44. If every bit of the addition result is all zero, the all-zero detector 48 makes a judgment such that the adder-subtracter 65 is normal. On the other hand, if every bit of the addition result is not all zero, the all-zero detector 48 make a judgment such that the adder-subtracter 65 has a failure, and then, outputs an error signal E4 to the external unit. This third embodiment of FIGS. 8A and 8B is applicable to the self-diagnostic test of the case where the adder-subtracter having no carry input is used as the adder-subtracter of being a test object, and not the two-input adder-subtracter 12 with a carry input used in the first embodiment in FIGS. 5A and 5B.

Fourth Embodiment

Figure 9A:
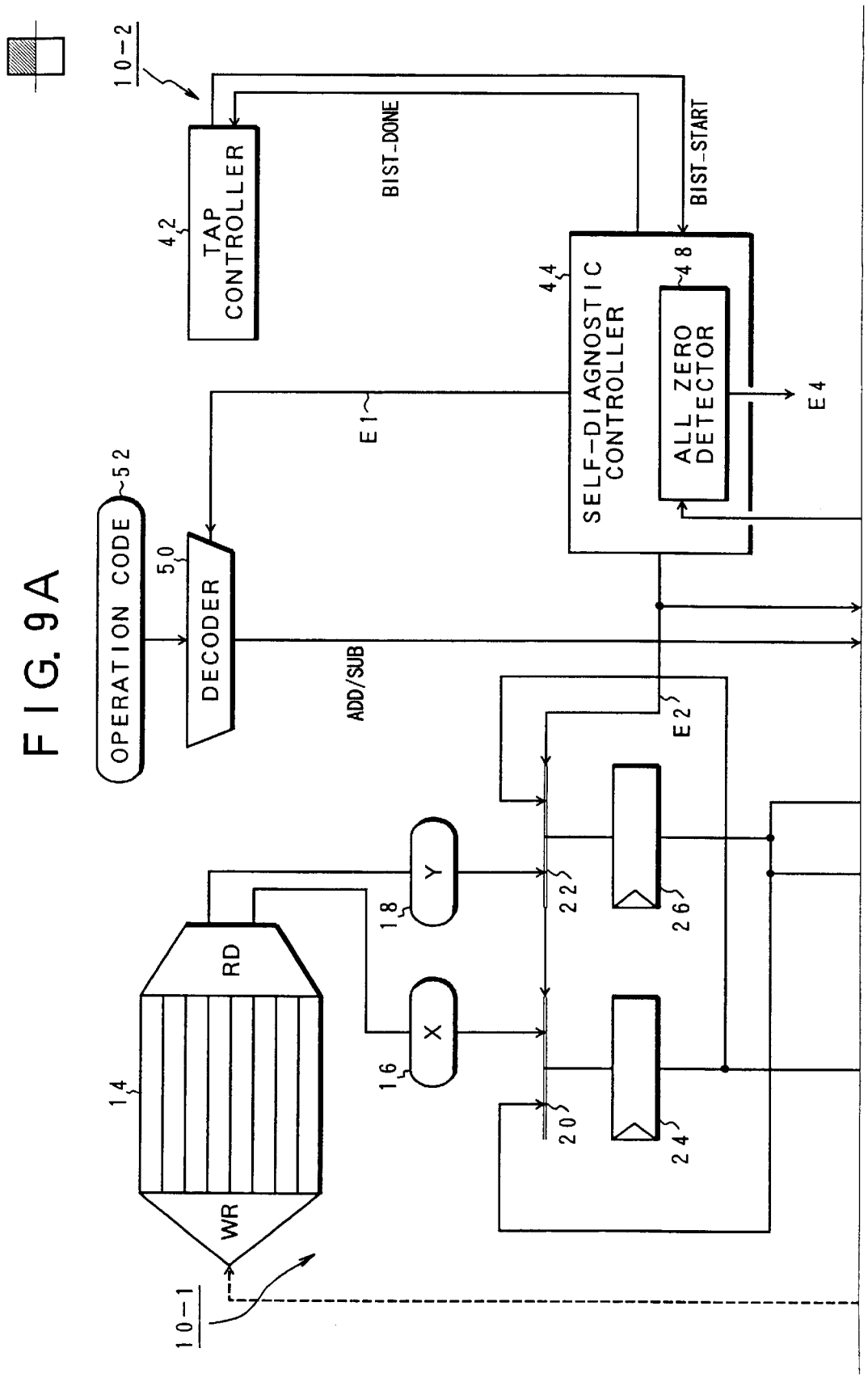
FIGS. 9A and 9B are circuit block diagrams showing a processor according to a fourth embodiment of the present invention.
Figure 9B:
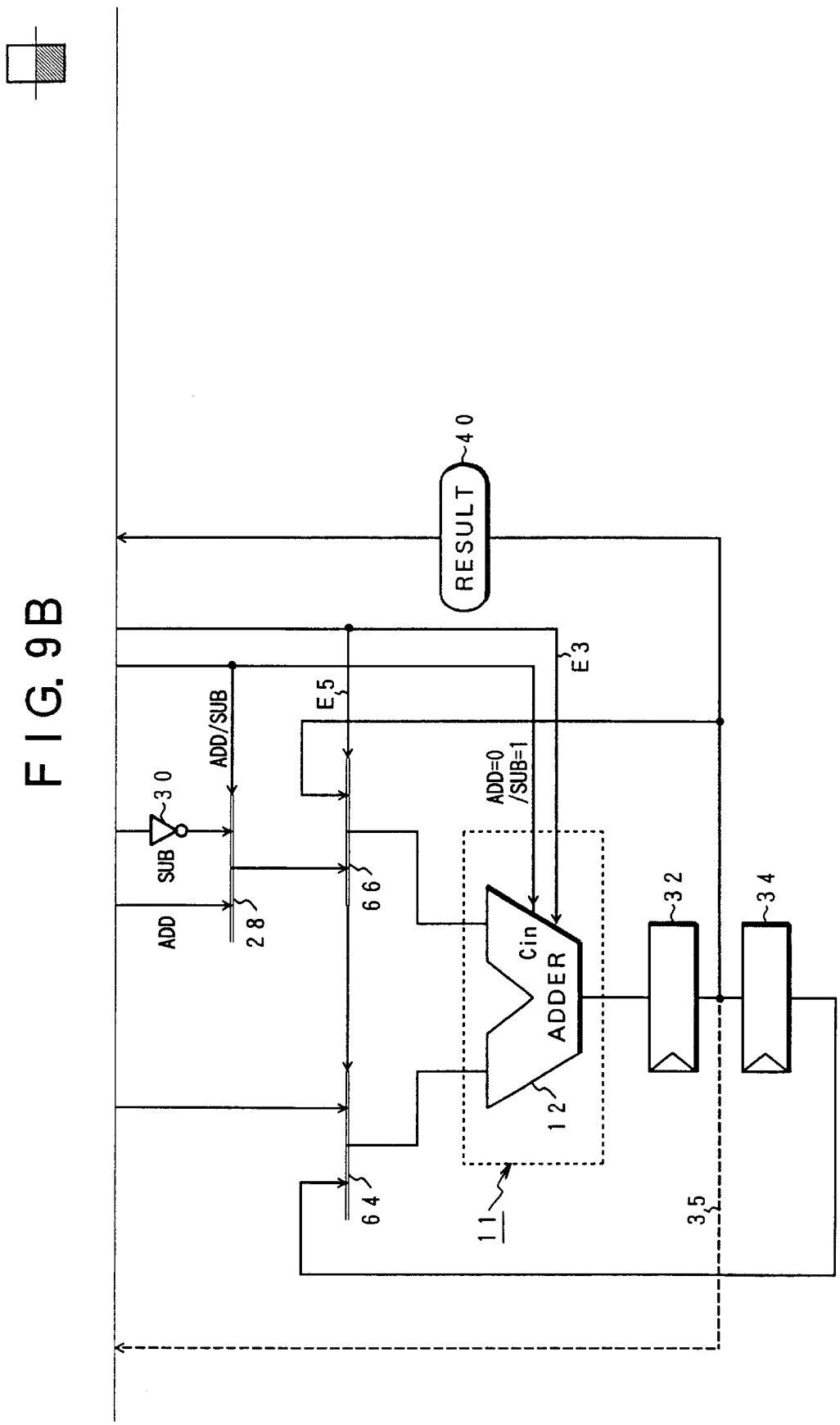

FIGS. 9A and 9B are circuit block diagrams showing a processor including a self-diagnostic function according to a fourth embodiment of the present invention. This fourth embodiment has the following features; more specifically, the adder-subtracter 36 provided on the output stage in the first embodiment of FIGS. 5A and 5B is eliminated, and the two-input adder-subtracter 12 with a carry input provided as a test object executes the second time operation made by the adder-subtracter 36. As described above, there is no need of providing a dedicated adder-subtracter for the second time operation; therefore, it is possible to simplify a configuration of arithmetic circuit. An input side of the two-input adder-subtracter 12 with carry input provided as a test object 11 is provided with a general register file 14, multiplexers 20 and 22, a first source register 24, a second source register 26, an inverter 30 and a multiplexer 28, and further, following these elements, multiplexers 64 and 66 are newly provided. These multiplexers 64 and 66 select the output of the first source register 24 and the multiplexer 28 in the first cycle according to a control signal E5 from the self-diagnostic controller 44, and in the second cycle, select and output the value of the destination registers 34 and 32 on an output side of the adder-subtracter 12. Moreover, in addition to a carry input Cin, a control signal E3 which controls the first time and second time operations is inputted to the adder-subtracter 12.

Next, the following is a description on an operation of a self-diagnostic test according to the fourth embodiment shown in FIGS. 9A and 9B. The TAP controller 42 asserts a BIST START signal, and thereby, when the self-diagnostic controller 44 is operated, first, arbitrary test data X and Y are read from the general register file 14. Subsequently, a first operand X and a second operand Y are simultaneously held in the first source register 24 and the second source register 26 via the multiplexers 20 and 22, respectively. At that time, the multiplexer 28 selects an output of the inverter 30, and the multiplexers 64 and 66 select an output of the first source register 24 and an output of the multiplexer 28, respectively. Of course, the decoder 50 outputs the subtraction instruction SUB. Thus, the first operand X, the second operand Y2's and the carry input C=1 are inputted to the adder-subtracter 12 as a test object 10, and then, the following subtraction is carried out.

$$Z=X+Y2\text{'s}=X+Y1\text{'s}+1=X-Y$$

Thereafter, the subtraction result Z is held in the destination register 32. In the next second cycle, the self-diagnostic controller 44 controls the multiplexers 20 and 22 while maintaining the subtraction instruction SUB of the decoder 50, and then, replaces the operands X and Y of the first and second source registers 24 and 26, and thereafter, holds these operands. The control of the multiplexer 28 and the multiplexers 64 and 66 is the same as the first cycle; therefore, the first operand Y, the second operand Y2's and the carry input Cin=1 are inputted to the adder-subtracter 12 as a test object 11, and then, the following subtraction is carried out.

$$Z'=Y+X2\text{'s}=Y+X1\text{'s}+1=Y-X$$

The second time subtraction result is held in the destination register 32, and the first time subtraction result Z is held in the next destination register 34 because one clock elapsed. In the next third cycle, the self-diagnostic controller 44 controls the decoder 50 so that the decoder 50 outputs the addition instruction ADD, and further, controls the multiplexers 64 and 66 by a control signal E5 so that these multiplexers select the output side of the adder-subtracter 12. Therefore, the first operand Z held in the destination register 34, the second operand Z' held in the destination register 32 and the carry input Cin=0 are inputted to the adder-subtracter 12. Thereafter, the adder-subtracter executes an addition of Z"=Z+Z'. The addition result Z" of the third cycle is held in the destination register 32, and then, is outputted as an operation result 40 to the all-zero detector 48 of the self-diagnostic controller 44. The finally obtained operation result Z" is as follows if the adder-subtracter 12 is normal.

$$Z'' = Z + Z' = (X - Y) + (Y - X)$$
$$= X + Y2's + Y + X2's$$
$$= (X + X2's) + (Y + Y2's)$$
$$= 0 + 0$$
$$= 0$$

Thus, the all-zero detector 48 of the self-diagnostic controller 44 makes a judgment such that the adder-subtracter 65 is normal if the addition result 40 is all zero. On the other hand, if the addition result 40 is not all zero, the all-zero detector 48 make a judgment such that the adder-subtracter 65 has a failure, and then, outputs an error signal E4 to the external unit. According to this fourth embodiment of FIGS. 9A and 9B, there is no need of providing another adder-subtracter on the output stage of the adder-subtracter 12; therefore, it is possible to simplify a circuit configuration of the arithmetic circuit unit 10-1 as compared with the first embodiment of FIGS. 5A and 5B. On the other hand, in the first embodiment of FIGS. 5A and 5B, the adder-subtracter 36 is provided; the circuit configuration is complicate. However, the self-diagnostic operation is completed at two cycles; therefore, the self-diagnostic operation can be carried out at a high speed. On the contrary, in the fourth embodiment shown in FIGS. 9A and 9B, the self-diagnostic operation is completed at thee cycles; for this reason, time takes to complete the self-diagnostic operation. Accordingly, the first embodiment of FIGS. 5A and 5B and the fourth embodiment of FIGS. 9A and 9B may be applied in accordance with either requirement of the simplification of circuit configuration or high-speed self-diagnostic operation.

Fifth Embodiment

Figure 10A:
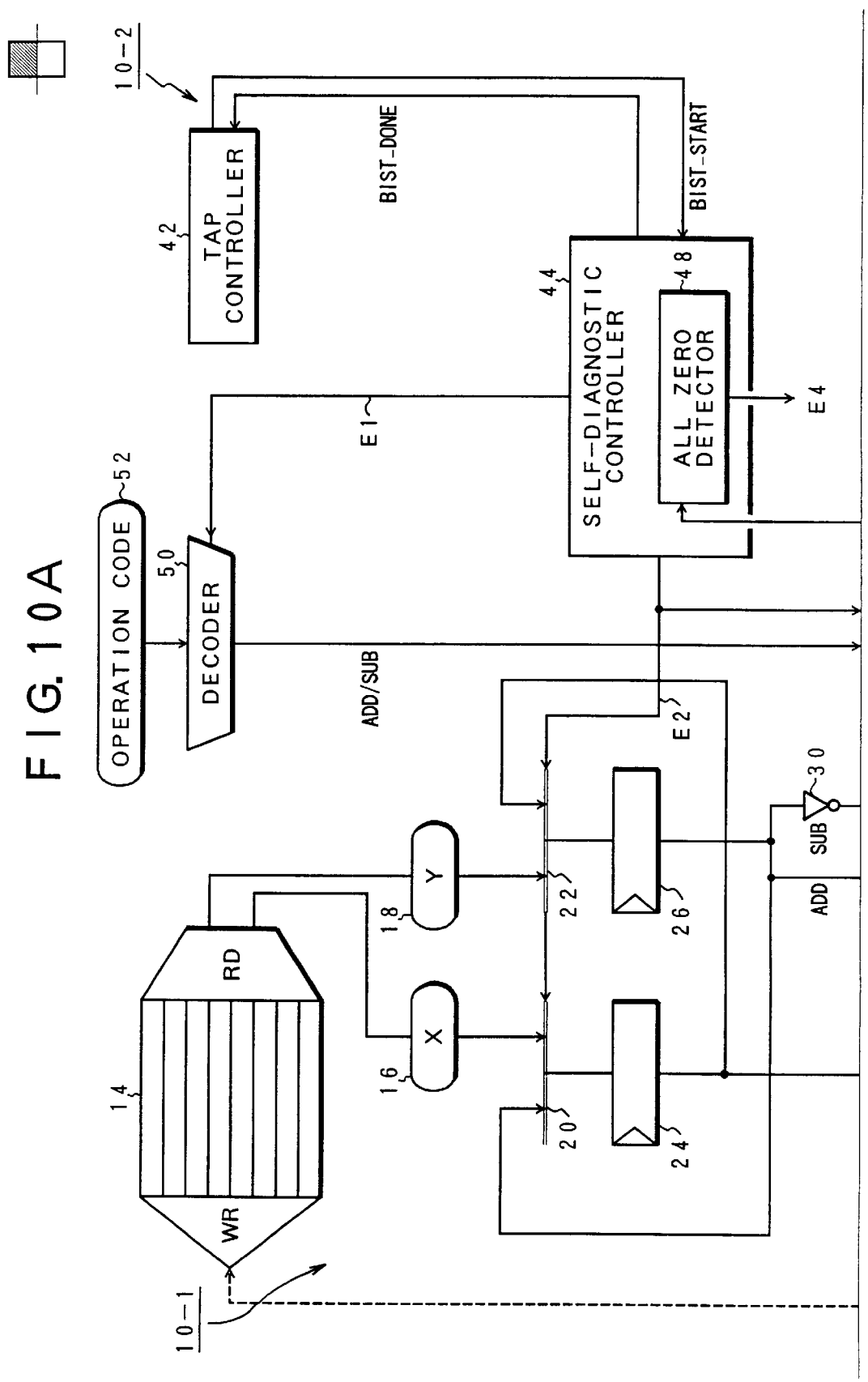
FIGS. 10A and 10B are circuit block diagrams showing a processor according to a fifth embodiment of the present invention.
Figure 10B:
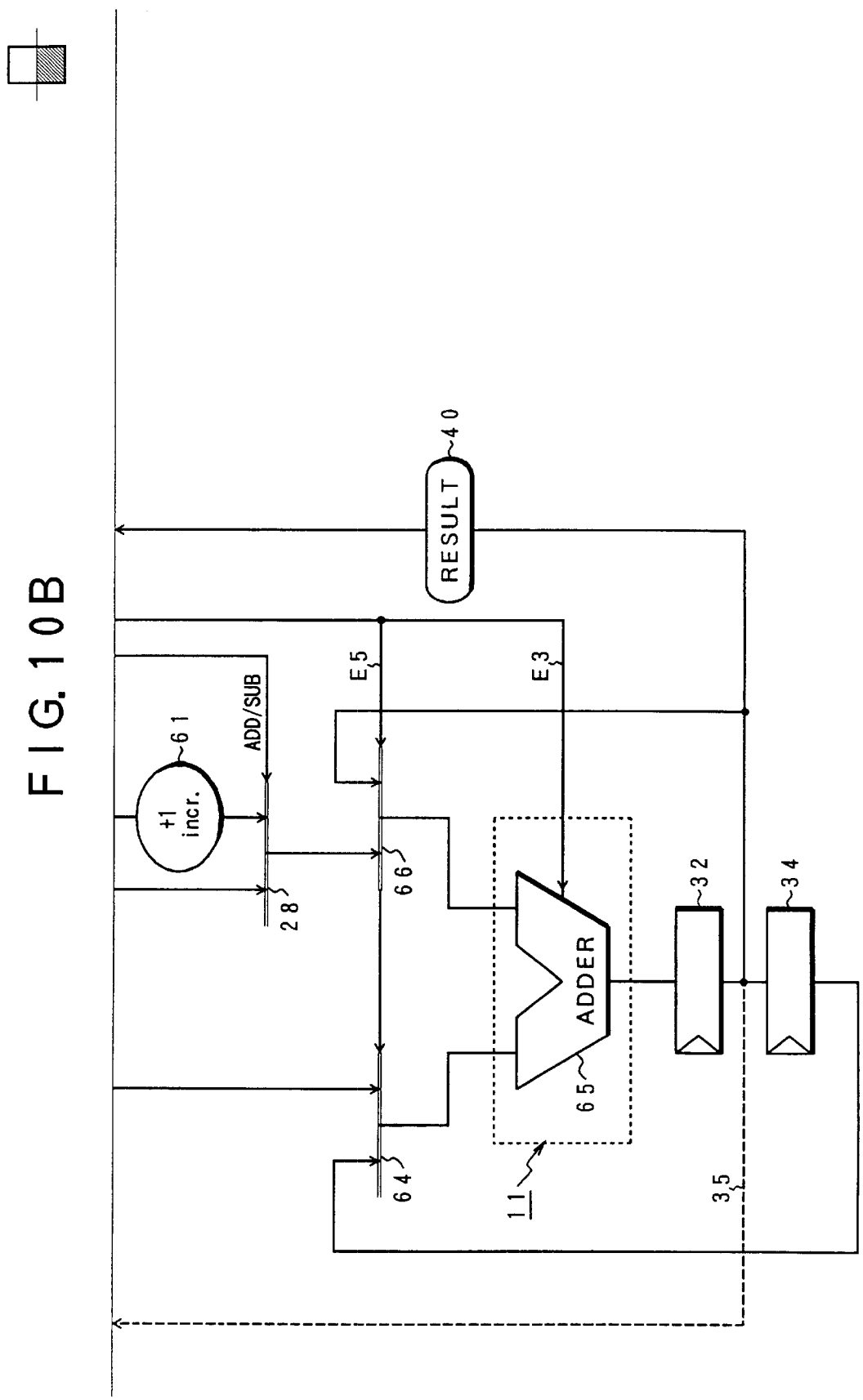

FIGS. 10A and 10B are circuit block diagrams showing a processor including a self-diagnostic function according to a fifth embodiment of the present invention. This fifth embodiment has the following features; more specifically, the adder-subtracter 36 provided on the output stage in the fist embodiment shown in FIGS. 5A and 5B is eliminated, and the second time addition is carried out using the adder-subtracter 36 provided as a test object 11, like the fourth embodiment shown in FIGS. 9A and 9B. An arithmetic circuit unit 10-1 is the same as the third embodiment shown in FIG. 6 in the following point. More specifically, an input side of the two-input adder-subtracter 65 with carry input provided as a test object is provided with a general register file 14, multiplexers 20 and 22, a first source register 24, a second source register 26, an inverter 30 and a +1 increment circuit 61, and a multiplexer 28. Further, in addition to these elements, following these elements, the input side of the adder-subtracter 65 is newly provided with multiplexers 64 and 66, like the fourth embodiment shown in FIGS. 9A and 9B. These multiplexers 64 and 66 select and output a first operand of the first source register 24 and a second operand of the multiplexer 28 in the subtraction of the first and second cycles. However, in the addition of the third cycle, these multiplexers 64 and 66 are controlled so as to select an output side of the adder-subtracter 65. Moreover, the self-diagnostic processing unit 10-2 side is composed of a TAP controller 42 and a self-diagnostic controller 44 including an all-zero detector 48, like the third embodiment shown in FIGS. 8A and 8B.

Next, the following is a description on an operation of a self-diagnostic test according to the fifth embodiment shown in FIGS. 10A and 10B. The TAP controller 42 asserts a BIST START signal, and thereby, when the self-diagnostic controller 44 starts a self-diagnostic operation, first, arbitrary test data X and Y are read from the general register file 14. Subsequently, these test data X and Y are selected by the multiplexers 20 and 22, and thereafter, are simultaneously held in the first source register 24 and the second source register 26, respectively. At that time, the decoder 50 outputs the subtraction instruction SUB according to the control by the self-diagnostic controller 44. The multiplexer 28 selects an output such that the test data Y held in the second source register 26 is inverted by the inverter 30 so as to be converted into one' (1's) complement Y1's, and thereafter, is converted into two's (2's) complement Y2's by adding "1" using the +1 increment circuit 61. Moreover, the multiplexers 64 and 66 select an output of the first source register 24 and an output of the multiplexer 28, respectively. Thus, in the first cycle, the first operand X, the second operand Y2's are inputted to the adder-subtracter 65 as a test object 11, and then, the following operation is carried out.

$$Z=X+Y2's=X+Y1's+1=X-Y$$

Thereafter, the operation result Z is held in the destination register 32. In the next second cycle, according to a control signal E2 of the self-diagnostic controller 44, the multiplexers 20 selects and outputs the value Y of the second source register 26 while the multiplexer 22 selects and outputs the value X of the first source register 24, and thereby, the input data X and Y are replaced with each other. Moreover, the multiplexer 28 and the multiplexers 64 and 66 have the selection. Therefore, the first operand Y and the second operand X2's are inputted to the adder-subtracter 12 as a test object 11, and then, the following subtraction is carried out.

$$Z''=Y+X2's=Y+X1's+1=Y-X$$

The second time subtraction result Z" is held in the destination register 32, and the first time subtraction result Z is held in the next destination register 34 because one clock elapsed. In the next third cycle, the self-diagnostic controller 44 controls the decoder 50 so that the decoder 50 outputs the addition instruction ADD. Further, according to a control signal E5, the multiplexer 64 selects and outputs the value Z held in the destination register 34 while the multiplexer 66 selects and outputs the value Z' held in the destination register 32. Thus, in the third cycle, the adder-subtracter 65 inputs the first operand Z and the second operand Z', and then, carries out an operation of Z"=Z+Z', and thereafter, the operation result Z" is held in the destination register 32. The above operation result 40 of the third cycle is given to the all-zero detector 48 of the self-diagnostic controller 44, and then, the all-zero detector makes a check whether or not the operation is all zero. The final operation result Z" result by the self-diagnosis is as follows if the adder-subtracter 65 is normal.

$$Z'' = Z + Z' = (X - Y) + (Y - X)$$
$$= X + Y2's + Y + X2's$$
$$= (X + X2's) + (Y + Y2's)$$
$$= 0 + 0$$
$$= 0$$

Thus, when making a detection such that every bit is all zero from the above operation result 40, the all-zero detector 48 makes a judgment such that the adder-subtracter 65 is normal. On the other hand, if the operation result 40 is not all zero, the all-zero detector 48 make a judgment such that the adder-subtracter 65 has a failure, and then, outputs an error signal E4 to the external unit.

In contrast with the third embodiment shown in FIGS. 8A and 8B, according to the third embodiment, the self-diagnostic test operation is completed at two cycles. On the contrary, according to the fifth embodiment shown in FIGS. 10A and 10B, three cycles are required to complete the self-diagnostic test operation; for this reason, the self-diagnostic test operation becomes late. However, in the fifth embodiment shown in FIGS. 10A and 10B, there is no need of providing another adder-subtracter on the output stage of the adder-subtracter 65, which is a test object 11. Therefore, it is possible to simplify a circuit configuration of the arithmetic circuit 10-1.

Sixth Embodiment

Figure 11A:
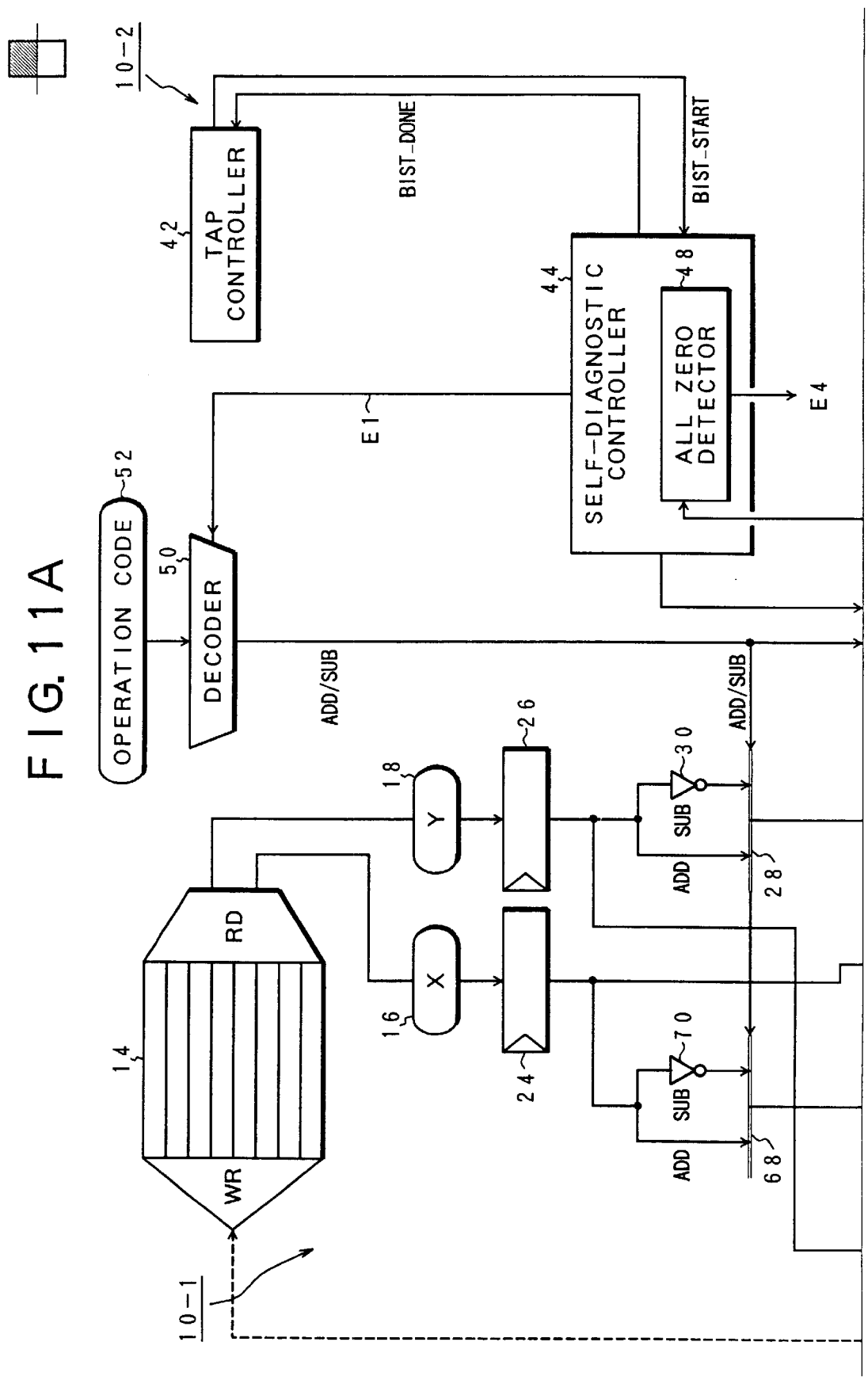

FIGS. 11A and 11B are circuit block diagrams showing a processor including a self-diagnostic function according to a sixth embodiment of the present invention. This sixth embodiment has the following features; more specifically, in one cycle of self-diagnostic test, a subtraction of two test data, that is, Z=X−Y and a subtraction replacing the test data, that is, Z'=Y−X are simultaneously carried out, and then, an addition of the above two subtraction results, that is, Z"=Z+Z' is carried out. In this sixth embodiment, an input side of the two-input adder-subtracter 12 with carry input provided as a test object is provided with a general register file 14, and following the register file 14, is directly provided with a first source register 24 and a second source register 26. The multiplexers 20 and 22 used in the first embodiment shown in FIG.5 are eliminated. A value of the first source register 24 is inputted as a first operand of the adder-subtracter 12 of being a test object 11, and the multiplexer 28 selects either of a value of the first source register 26 or a value inverted by the inverter 30 as a second operand of the same. An output side of the adder-subtracter 12 is provided with a destination register 32, and the value of the destination register 32 is inputted to the next adder-subtracter 36. A subtraction Z=X−Y is carried out by a system comprising the first and second source registers 24 and 26, the inverter 30, the multiplexer 28, the adder-subtracter 12 and the destination register 32. On the other hand, an inverter 70, a multiplexer 68, an adder-subtracter 72 and a destination register 74 are provided in parallel with the operation system for the subtraction Z. The multiplexer 68 selects either of a value of the first source register 24 or a value inverted by the inverter 70, and outputs the selected value. The adder-subtracter 72 receives the value of the second source register 26 as a first operand, the value selected by the multiplexer 68 as a second operand, and further, an input by carry input Cin, and then, executes a subtraction of Z'=Y−X, and thereafter, stores the subtraction result in the destination register 74. The adder-subtracter 36 inputs the operation results Z and Z' stored by a parallel operation in each of the destination registers 32 and 74 as an operand, and executes an addition of Z"=Z+Z', and thereafter, stores the addition result in the destination register 38. On the other hand, the self-diagnostic processing unit 10-2 side is composed of a TAP controller 42 and a self-diagnostic controller 44 including an all-zero detector 48.

Next, the following is a description on an operation of a self-diagnostic test according to the sixth embodiment shown in FIGS. 11A and 11B. When the TAP controller 42 asserts a BIST START signal, the self-diagnostic controller 44 is operated, and then, starts a self-diagnostic test. First, arbitrary test data X and Y stored in the general register file 14 are read from a read port, and subsequently, are simultaneously held in the first source register 24 and the second source register 26, respectively. At that time, the decoder 50 outputs the subtraction instruction SUB according to a control signal E1 of the self-diagnostic controller 44. Thus, the multiplexers 68 and 28 select the outputs of the inverters 70 and 30. Moreover, the carry input Cin to the adder-subtracters 12 and 72 is Cin=1. Therefore, the first operand X, the second operand Y1's and the carry input Cin=1 are inputted to the adder-subtracter 12, and the adder-subtracter 12 executes an operation of Z=X+Y1's, and thereafter, holds the operation result in the destination register 72. As a result, the adder-subtracter 36 executes an addition Z"=Z'+Z using the value Z' of the destination register 74 as a first operand and using the value Z of the destination register 32 as a second operand, and then, holds the addition result Z" in the destination register 38. In this manner, the operation result 40 obtained in the first cycle of self-diagnostic processing is given to the all-zero detector 48 of the self-diagnostic controller 44. In this case, the operation result 40Z" from the adder-subtracter 36 is as follows if the adder-subtracter 12 of being a test object 11 is normal.

$$Z'' = Z + Z'$$
$$= (X - Y) + (Y - X)$$
$$= X + Y2's + Y + X2's$$
$$= (X + X2's) + (Y + Y2's)$$
$$= 0 + 0$$
$$= 0$$

Thus, the all-zero detector 48 of the self-diagnostic controller 44 makes a judgment such that the adder-subtracter 12 of being a test object is normal if every bit of the addition result 40 is all zero. On the other hand, if every bit of the addition result 40 is not all zero, the all-zero detector 48 make a judgment such that the adder-subtracter 12 has a failure, and then, outputs an error signal E4 to the external unit. According to this sixth embodiment shown in FIGS. 11A and 11B, the subtraction of two test data X and Y and the subtraction replacing these two test data with each other are simultaneously carried out, and then, the subtraction result is added, and thereby, the self-diagnostic operation is completed at one cycle. Therefore, it is possible to perform self-diagnostic processing at a higher speed.

Seventh Embodiment

Figure 12A:
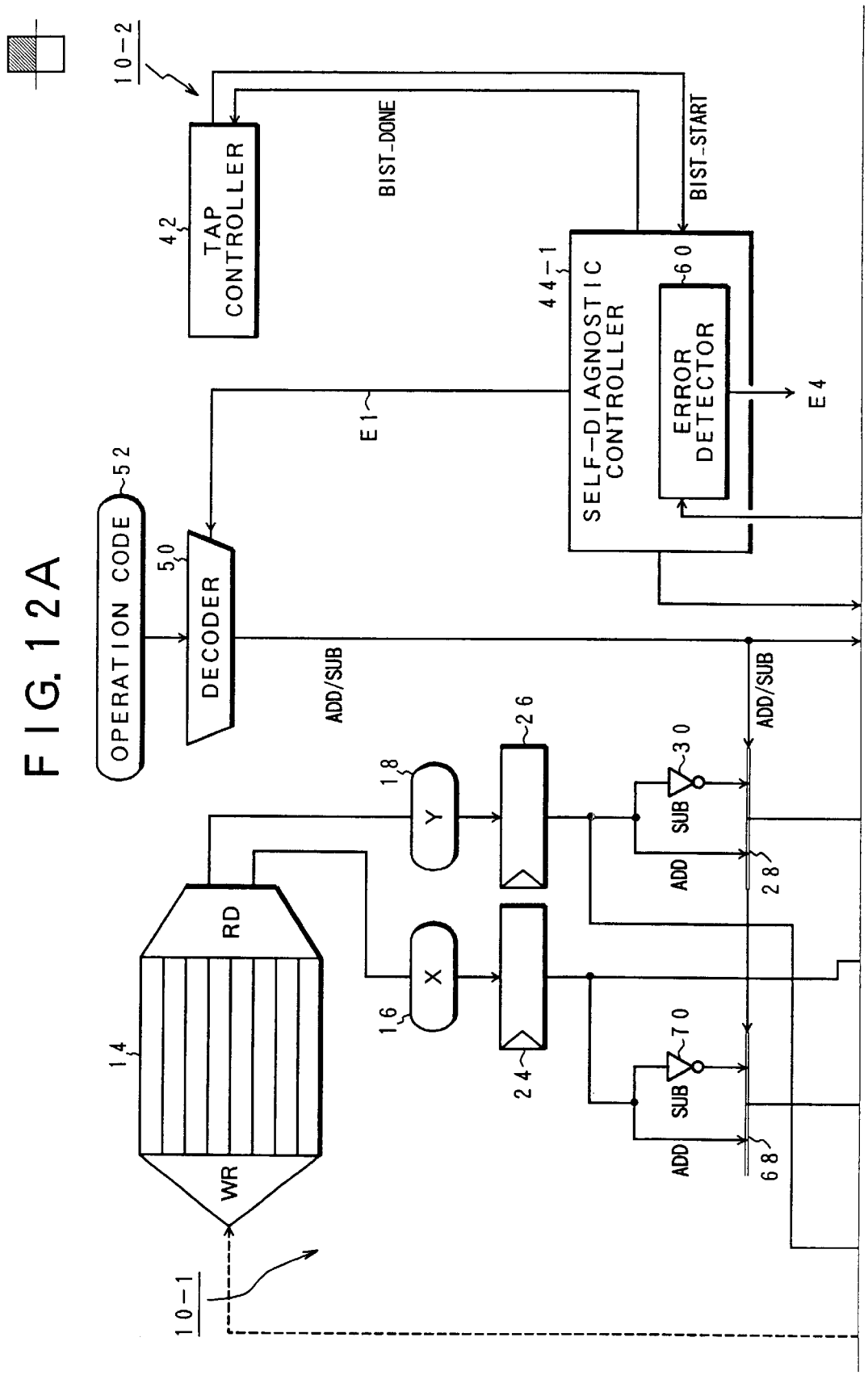
FIGS. 12A and 12B are circuit block diagrams showing a processor according to a seventh embodiment of the present invention.
Figure 12B:
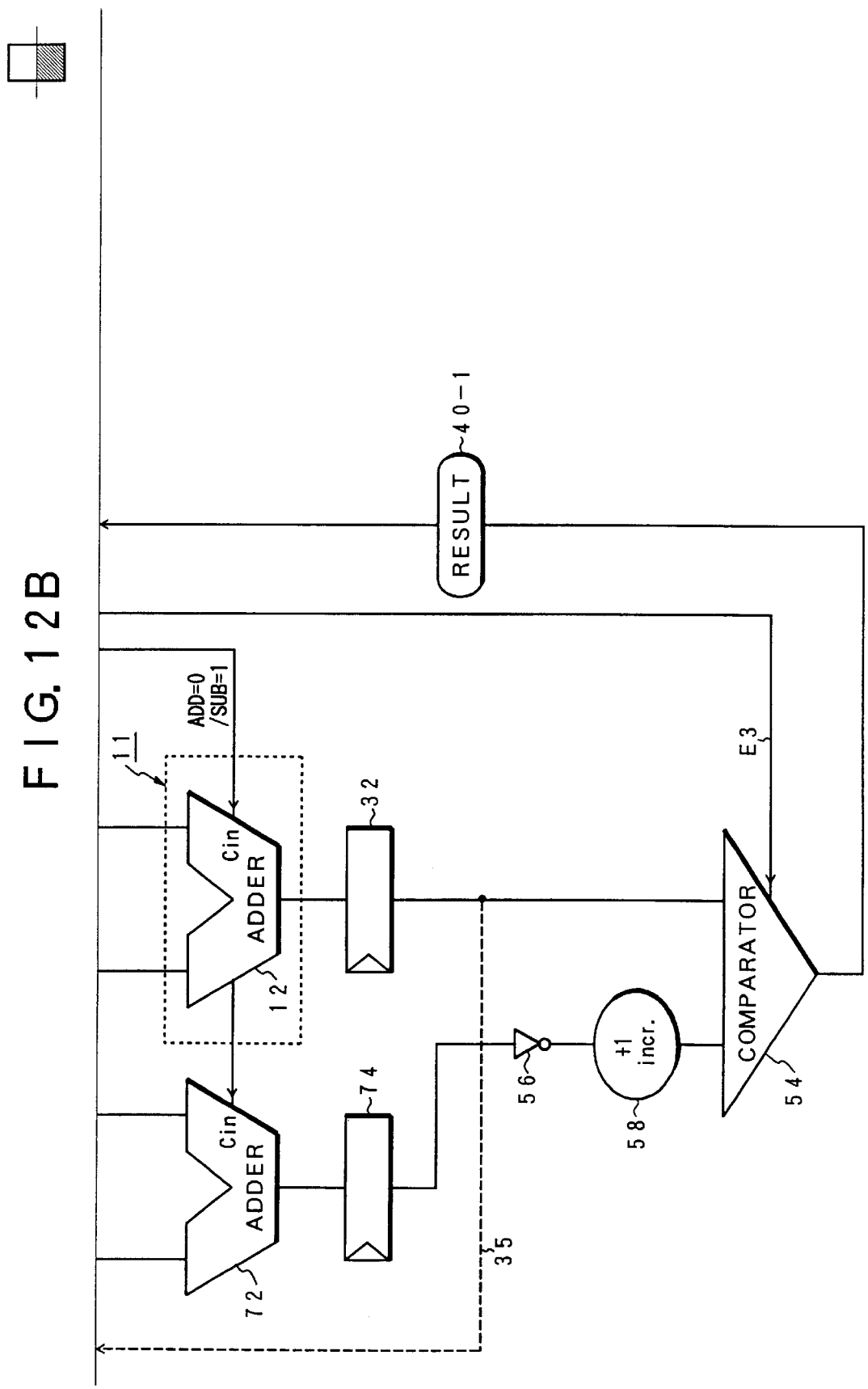

FIGS. 12A and 12B are circuit block diagrams showing a processor including a self-diagnostic function according to a seventh embodiment of the present invention. This seventh embodiment has the following features; more specifically, in order to achieve high-speed processing, the self-diagnostic test processing performed at two cycles in the second embodiment shown in FIGS. 7A and 7B is completed at one cycle. According to this seventh embodiment, the arithmetic circuit 10-1 is directly provided with a first source register 24 and a second source register 26, following the general register file 14, and the multiplexers 20 and 22 used in the first embodiment shown in FIG.5 are eliminated. An operating system of Z=X−Y is composed of first and second source registers 24 and 26, an inverter 30, a multiplexer 28, a adder-subtracter 12 with carry input of being a test object, and a destination register 32. On the other hand, an operating system of Z'=Y−X replacing test data X and Y is composed of the first and second source registers 24 and 26, an inverter 70, a multiplexer 68, the adder-subtracter 12 with carry input Cin, and the destination register 72. The above configuration is the same as the sixth embodiment of FIGS. 11A and 11B. In this seventh embodiment, in order to correspond to the second embodiment shown in FIGS. 7A and 7B, a comparator 54 is provided following two-system operation results of subtraction results Z and Z. The subtraction result Z of the destination register 32 is inputted to one of the comparator 54. Moreover, the subtraction result Z' held in the destination register 74 is inputted to the other of the comparator 54. The subtraction result Z' is inputted in the following manner; more specifically, the subtraction result Z' is inverted by an inverter 56 so as to find one's (1's) complement Z'1's, and next, is converted into two's (2's) complement Z'2's by adding (incrementing) "1" by a +1 increment circuit 58. Thus, the comparator 54 compares the subtraction result Z with two's (2's) complement Z'2's of the subtraction result Z', and then, outputs the comparative result 40-1 to an error detector 60 of a self-diagnostic controller 44-1. If the subtraction result Z and the two's (2's) complement Z'2's of the subtraction result Z' are correspondent in the comparator 54, the adder-subtracter 12 of being a test object is normal. If not correspondent, the adder-subtracter 12 has a failure, and in this case, the error detector 60 detects the failure, and then, outputs an error signal E4 indicative of the failure of the adder-subtracter 12 to the external unit. Moreover, the self-diagnostic processing unit 10-2 includes a TAP controller 42 and a self-diagnostic controller 44-1. This seventh embodiment is different from the second embodiment shown in FIGS. 7A and 7B in that there is no control signal with respect to the multiplexers 20 and 22 on the first and second source registers 24 and 26 side.

Next, the following is a description on an operation of a self-diagnostic test according to the seventh embodiment of FIGS. 12A and 12B. When the TAP controller 42 asserts a BIST START signal, the self-diagnostic controller 44-1 is operated, and then, starts a self-diagnostic test of the arithmetic circuit 10-1. First, arbitrary test data X and Y stored in the general register file 14 are read from a read port, and subsequently, are simultaneously held in the first source register 24 and the second source register 26, respectively. At that time, the adder-subtracter 12 of being a test object inputs the first operand X, the second operand Y2's and the carry input Cin=1, and then, executes an operation of Z=X+Y1's+1, and thereafter, holds the operation result in the destination register 32. Simultaneously, the adder-subtracter 72 inputs the first operand Y, the second operand X1's and the carry input Cin=1, and then, executes an operation of Z'=Y+X1's+1, and thereafter, holds the operation result in the destination register 74. Further, the comparator 54 inputs the operation result Z held in the destination register 32, and further, inverts the operation result Z' held in the destination register 34 by using the inverter 56 so as to convert it into one's (1's) complement Z'1s. Thereafter, the operation result Z' is converted into two's (2's) complement Z'2's by adding "1" by the +1 increment circuit 58, and thus, the comparator compares the operation results Z and Z'. At that time, if the adder-subtracter 12 of being a test object is normal, the operation results Z and Z' inputted to the comparator 54 are correspondent, and then, the error detector 60 of the self-diagnostic controller 44-1 detects the correspondence of the comparative result, and thereby, recognizes that the adder-subtracter 12 is normal. On the other hand, in the case where the comparative result of Z and Z' by the comparator 54 is not correspondent, the error detector 60 makes a judgment such that the adder-subtracter 12 of being a test object has a failure, and then, outputs an error signal E4 to the external unit. In comparison with the second embodiment of FIGS. 7A and 7B, in this seventh embodiment of FIGS. 12A and 12B, the subtraction of Z=X−Y and two's (2's) complement Z'2's of the subtraction of Z'=Y−X required for comparative processing are operated in one cycle of self-diagnostic test, and then, the comparative result is obtained. Therefore, it is possible to perform a self-diagnostic operation at a high speed.

Eighth Embodiment

FIGS. 13A and 13B are circuit block diagrams showing a processor including a self-diagnostic function according to an eighth embodiment of the present invention. This eighth embodiment has the following features. More specifically, like the sixth embodiment shown in FIGS. 11A and 11B, a subtraction of test data X and Y and a subtraction replacing these data each other are concurrently carried out with respect to the adder-subtracter 65 having no carry input Cin of being a test object in the third embodiment, and then, the self-diagnostic operation is completed in one cycle. In this eighth embodiment, an arithmetic circuit unit 10-1 is directly provided with a first source register 24 and a second source register 26, following the general register file 14. An operating system of the subtraction Z=x−Y is composed of the first and second source registers 24 and 26, an inverter 30, a +1 increment circuit 61, a multiplexer 28, an adder-subtracter 65 of being a test object and a destination register 32. Moreover, an operating system of the subtraction Z'=Y−X replacing test data X and Y is composed of the first and second source registers 24 and 26, an inverter 76, a +1 increment circuit 78, a multiplexer 68, an adder-subtracter 72 of being a test object and a destination register 74. Then, the concurrently made subtraction results Z and Z' are held in the destination registers 32 and 74, respectively, and thereafter, are inputted to the adder-subtracter 36. An addition of Z"=Z+Z' is carried out, and then, the addition result, is held in the destination register 38, and thereafter, is outputted as the operation result 40 to the all-zero detector 48 of the self-diagnostic controller 44. Of course, the self-diagnostic processing unit 10-2 side is provided with a TAP controller 42 and the self-diagnostic controller 44.

Next, the following is a description on an operation of a self-diagnostic test according to the eighth embodiment shown in FIGS. 13A and 13B. When the TAP controller 42 asserts a BIST START signal, first, arbitrary test data X and Y stored in the general register file 14 are read from a read port, and subsequently, are simultaneously held in the first source register 24 and the second source register 26, respectively. At that time, the decoder 50 outputs the subtraction instruction SUB according to a control signal E1 of the self-diagnostic controller 44. Thus, the multiplexers 68 and 28 select the outputs of the +1 increment circuits 78 and 61. In the adder-subtracter 12 side, a first operand X of the first source register 24 and a second operand Y are inputted to the adder-subtracter 12. The second operand Y is obtained in the following manner. More specifically, the test data Y of the second source register 26 is inverted by the inverter 30 so as to convert it into one's (1's) complement Y1's, and thereafter, is converted into two's (2's) complement Y2's by adding "1" using the +1 increment circuit 61. Thus, the adder-subtracter 12 executes the operation of Z=X+Y2's=Z+Y1's+1=X−Y, and then, holds the operation result Z in the destination register 32. Simultaneously, in the adder-subtracter 72 side, a first operand Y of the first source register 26 and a second operand Y are inputted to the adder-subtracter 72. The second operand Y is obtained in the following manner. More specifically, the input data Y of the second source register 24 is inverted by the inverter 76 so as to convert it into one's (1's) complement Y1's, and thereafter, is converted into two's (2's) complement X2's by adding "1" using the +1 increment circuit 78. Thus, the adder-subtracter 72 executes the operation of Z'=Y+X2's= Y+X1's+1=Y−X, and then, holds the operation result Z' in the destination register 74. Therefore, the adder-subtracter 36 inputs the first operand Z' of the destination register 74 and the second operand Z of the destination register 32, and then, executes an addition of Z"=Z'+Z. Thereafter, the adder-subtracter 38 holds the operation result Z" in the destination register 38, and then, outputs it to the all-zero detector 48 of the self0dianostic controller 44 as the operation result 40. In this case, the operation result 40, that is, Z" is as shown in the following operation (11) if the adder-subtracter 12 of being a test object 11 is normal.

$$Z'' = Z + Z' = (X - Y) + (Y - X) \qquad (11)$$
$$= X + Y2's + Y + X2's$$
$$= (X + X2's) + (Y + Y2's)$$
$$= 0 + 0$$
$$= 0$$

Thus, the all-zero detector 48 of the self-diagnostic controller 44 makes a judgment such that the adder-subtracter 12 of being a test object is normal if the operation result 40, that is, Z" is all zero. On the other hand, if the addition result is not all zero, the all-zero detector 48 make a judgment such that the adder-subtracter 12 has a failure, and then, outputs an error signal E4 to the external unit.

Ninth Embodiment

Figure 14B:
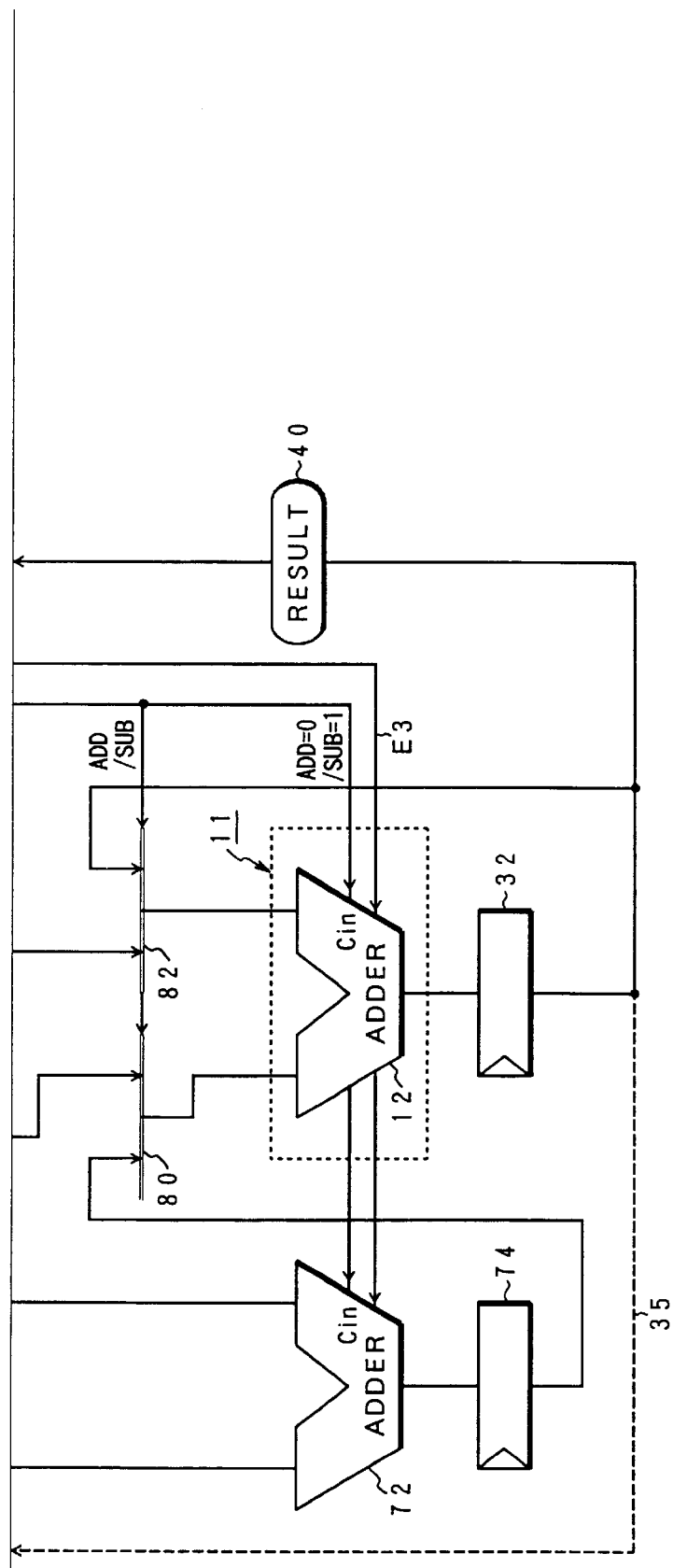

FIGS. 14A and 14B are circuit block diagrams showing a processor including a self-diagnostic function according to a ninth embodiment of the present invention. This ninth embodiment has the following features. More specifically, the adder-subtracter 36 of the sixth embodiment shown in FIGS. 11A and 11B is omitted; the adder-subtracter 12 executes the addition executed by the adder-subtracter 36. Namely, in the sixth embodiment, all operations have completed in one cycle; however, in this ninth embodiment of FIGS. 14A and 14B, two cycles are required. For this reason, the adder-subtracter 36 of the sixth embodiment is eliminated so as to achieve a simplification of circuit configuration. In the arithmetic circuit 10-1, a subtraction of Z=X−Y relative to arbitrary two test data X and Y read from the general register file 14 is carried out by the following operating system. The operating system is composed of the first and second source registers 24 and 26, an inverter 30, a multiplexer 28, an adder-subtracter 12 of being a test object, and a destination register 32. In this operating system, multiplexers 80 and 82 are newly provided on an input stage of the adder-subtracter 12. Moreover, a subtraction of Z'=Y−X replacing arbitrary two test data X and Y read from the general register file 14 is carried out by the following operating system. The operating system is composed of the first and second source registers 24 and 26, an inverter 70, a multiplexer 68, an adder-subtracter 72 of being a test object, and a destination register 34. In this case, these multiplexers 80 and 82 is changed over according to the addition instruction ADD and the subtraction instruction SUB from the decoder 50. When the subtraction instruction SUB is outputted, the outputs of the multiplexers 68 and 28 are selected, on the other hand, when the addition instruction ADD is outputted, the values of the destination registers 74 and 32 are selected and outputted. Of course, the self-diagnostic processing unit 10-2 side is provided with a TAP controller 42 and the self-diagnostic controller 44 including an all-zero detector 48.

Next, the following is a description on an operation of a self-diagnostic test according to the ninth embodiment shown in FIGS. 14A and 14B. When the TAP controller 42 asserts a BIST START signal, the self-diagnostic controller 44 starts a self-diagnostic test. First, arbitrary test data X and Y stored in the general register file 14 are read from a read port, and subsequently, are simultaneously held in the first source register 24 and the second source register 26, respectively. At that time, the decoder 50 decodes an operation code 52, and then, outputs the subtraction instruction SUB according to a control signal E1 of the self-diagnostic controller 44. Thus, the multiplexers 68 and 28 select the outputs of the inverters 70 and 30, respectively. Moreover, the multiplexers 80 and 82 select the outputs of the first and second source registers 24 and 26, respectively. Thus, a first operand X, a second operand, that is, one's (1's) complement Y1's inverting the test data Y by the inverter 30, and carry input Cin=1 are inputted to the adder-subtracter 12 of being a test object. Therefore, the adder-subtracter 12 executes an operation of Z=X+Y1's+1, and then, holds the operation result Z in the destination register 32. Simultaneously, the adder-subtracter 72 side inputs a first operand X, one's (1's) complement X1's obtained by inverting the test data x of the first source register 24 by the inverter 70, and carry input Cin=1. Thus, the adder-subtracter 72 executes Z'=Y+X1's+ 1, and then, holds the operation result Z' in the destination register 74. In the next second cycle, the self-diagnostic controller 44 controls the decoder 50 by a control signal E1 so that the decoder 50 outputs the addition instruction ADD, and then, instructs an addition operation to the adder-subtracter 12 by a control signal E3. According to the addition instruction ADD from the decoder 50, the multiplexer 80 selects an output of the destination register 34; on the other hand, the multiplexer 82 selects an output of the destination register 32. Therefore, the adder-subtracter 12 inputs the first operand Z', the second operand Z, the carry input Cin=0, and then, executes an operation of Z"=Z'+Z, and thereafter, holds the operation result in the destination register 32. The value Z" of the destination register 32 is given as an operation result 40 to the all-zero detector 48 of the self-diagnostic controller 44. In this case, the operation result 40, that is, Z" is as shown in the following operation (11) if the adder-subtracter 12 of being a test object 11 is normal.

$$Z'' = Z + Z' = (X - Y) + (Y - X) \qquad (11)$$
$$= X + Y2's + Y + X2's$$
$$= (X + X2's) + (Y + Y2's)$$
$$= 0 + 0$$
$$= 0$$

Thus, the all-zero detector 48 of the self-diagnostic controller 44 makes a judgment such that the adder-subtracter 12 of being a test object is normal if every bit of the operation result 40 is all zero. On the other hand, if the addition result is not all zero, the all-zero detector 48 make a judgment such that the adder-subtracter 12 has a failure, and then, outputs an error signal E4 to the external unit.

Tenth Embodiment

Figure 15A:
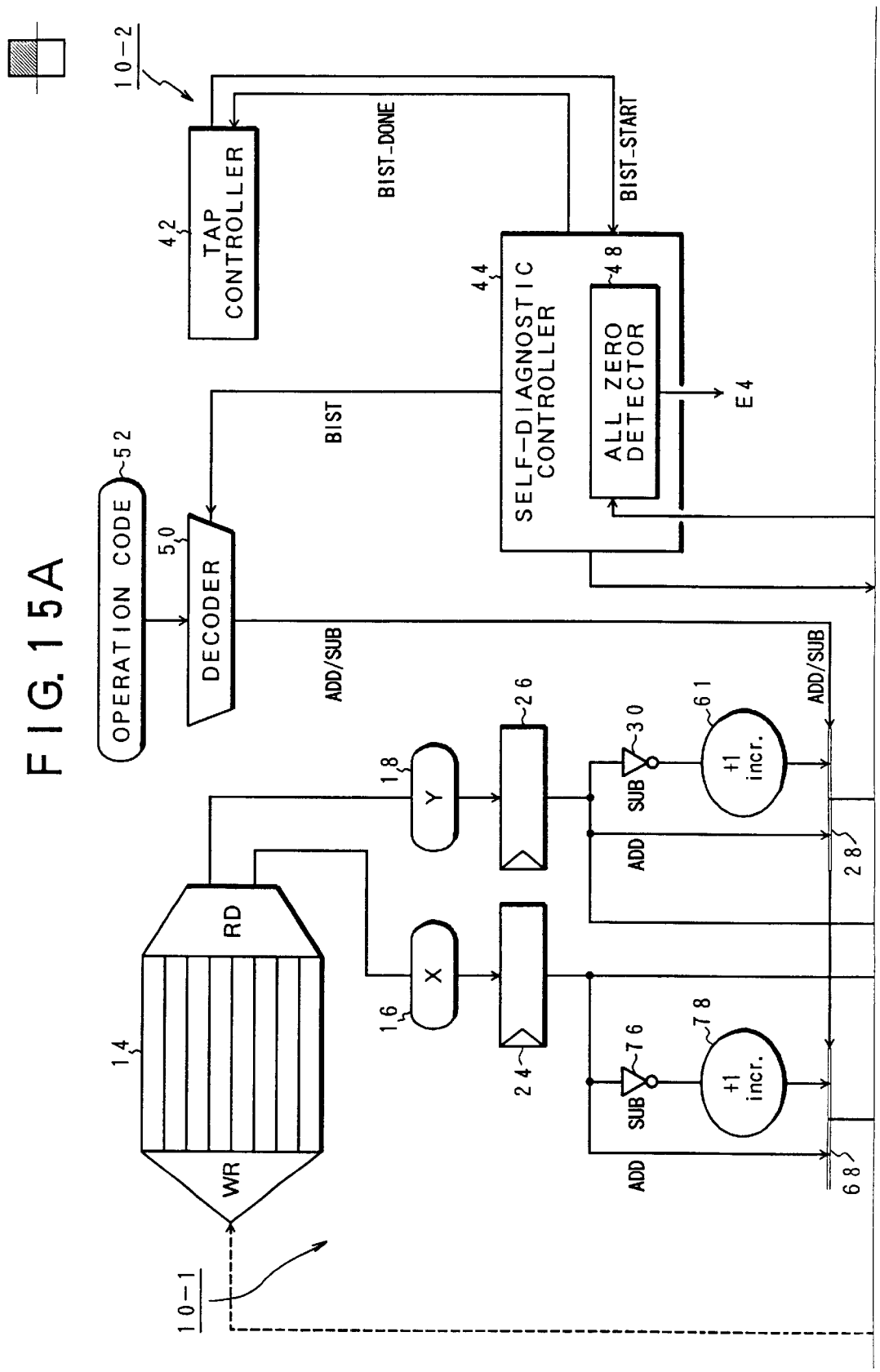

FIGS. 15A and 15B are circuit block diagrams showing a processor including a self-diagnostic function according to a tenth embodiment of the present invention. This tenth embodiment has the following features. More specifically, the adder-subtracter 38 provided on the output stage in the sixth embodiment shown in FIGS. 11A and 11B is omitted, and the adder-subtracter 12 executes addition processing. Therefore, no adder-subtracter 36 of FIGS. 11A and 11B is provided, and thereby, it is possible to simplify a circuit configuration. According to this tenth embodiment, in an arithmetic circuit unit 10-1, the multiplexers 80 and 82 are newly provided onto the pre-stage of the adder-subtracter 12 of being a test object in the eighth embodiment shown in FIGS. 13A and 13B. These multiplexers 80 and 82 select the outputs of the destination registers 74 and 38, and input them to the adder-subtracter 12. Other configuration is the same as the embodiment shown in FIGS. 10A and 10B.

Next, the following is a description on an operation of a self-diagnostic test according to the tenth embodiment of FIGS. 15A and 15B. When the TAP controller 42 asserts a BIST START signal, the self-diagnostic controller 44 is operated, and then, a self-diagnostic test is started. First, arbitrary test data X and Y stored in the general register file 14 are read from a read port, and subsequently, are simultaneously held in the first source register 24 and the second source register 26, respectively. At that time, the decoder 50 outputs the subtraction instruction SUB, and the multiplexers 68 and 28 select the outputs of the +1 increment circuits 78 and 61. Moreover, the multiplexers 80 and 82 select the outputs the first source register 24 and the multiplexer 28, respectively. Thus, a first operand X and a second operand Y are inputted to the adder-subtracter 12. The second operand Y is obtained in the following manner. More specifically, the test data Y of the second source register 26 is inverted by the inverter 30 so as to convert it into one's (1's) complement Y1's, and thereafter, is converted into two's (2's) complement Y2's by adding "1" using the +1 increment circuit 61. Thus, the adder-subtracter 12 executes the operation of Z=X+Y2's, and then, holds the operation result Z in the destination register 38. Simultaneously, a first operand Y and a second operand are inputted to the adder-subtracter 72. The second operand Y is obtained in the following manner. More specifically, the input data Y of the second source register 24 is inverted by the inverter 76 so as to convert it into one's (1's) complement Y1's, and thereafter, is converted into two's (2's) complement X2's by adding "1" using the +1 increment circuit 78. Thus, the adder-subtracter 72 executes the operation of Z'=Y+X2's, and then, holds the operation result Z' in the destination register 74. In the next second cycle, the self-diagnostic controller 44 controls the decoder 50 so that the decoder 50 outputs the addition instruction ADD, and further, makes a selective changeover from the multiplexers 80 and 82 to the destination register 38 and 74. Therefore, the adder-subtracter 12 inputs the first operand Z' from the multiplexer 80 while inputting the second operand Z from the multiplexer 82, and thereby, executes the subtraction of Z"=Z'+Z. Thereafter, the adder-subtracter 12 holds the operation result Z" in the destination register 38, and then, outputs it to the all-zero detector 48 of the self-diagnostic controller 44 as the operation result 40. In this case, the operation result 40, that is, Z" is as shown in the following operation (11) if the adder-subtracter 12 of being a test object 11 is normal.

$$Z'' = Z + Z' = (X - Y) + (Y - X) \quad (11)$$
$$= X + Y2's + Y + X2's$$
$$= (X + X2's) + (Y + Y2's)$$
$$= 0 + 0$$
$$= 0$$

Thus, the all-zero detector 48 of the self-diagnostic controller 44 makes a judgment such that the adder-subtracter 12 of being a test object is normal if the operation result 40, that is, Z" is all zero. On the other hand, if the addition result is not all zero, the all-zero detector 48 make a judgment such that the adder-subtracter 12 has a failure, and then, outputs an error signal E4 to the external unit.

Eleventh Embodiment

Figure 16A:
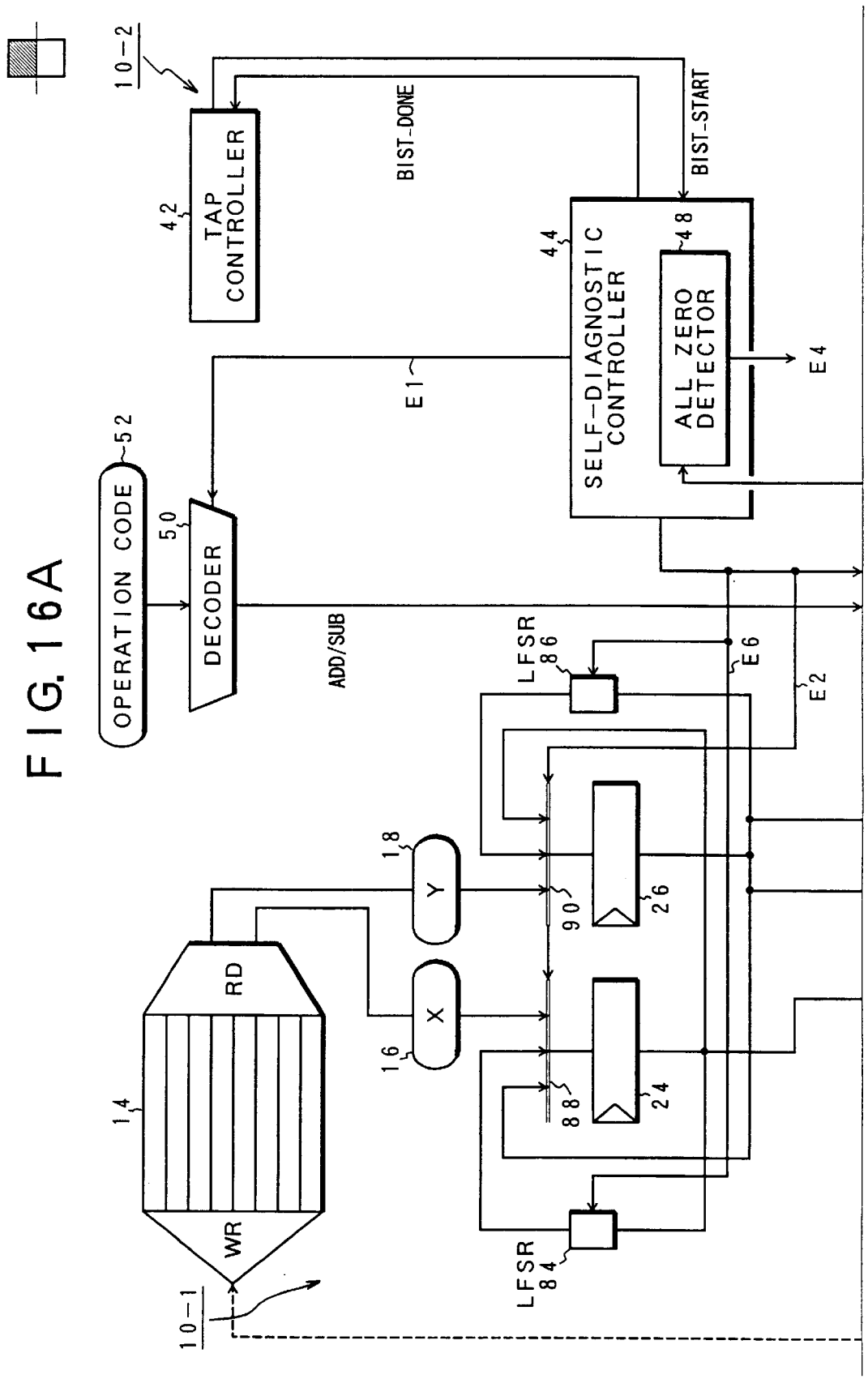

FIGS. 16A and 16B are circuit block diagrams showing a processor including a self-diagnostic function according to an eleventh embodiment of the present invention. This eleventh embodiment has the following constituent features; more specifically, a pseudo-random number is generated as a test data for self-diagnostic test by using a linear feedback shift register (LFSR) In this eleventh embodiment, linear feedback shift registers 84 and 86 which generat a pseudo-random number are added to the configuration of the first embodiment shown in FIGS. 5A and 5B. With the linear feedback shift registers 84 and 86, three-input multiplexers 88 and 90 are individually provided onto each input stage of the first source register 24 and the second source register 26. By doing so, it is possible to select either of the general register file 14, the first and second source registers 24 and 26 or the linear feedback shift registers 84 and 86. Except the above configuration, the arithmetic circuit unit 10-1 and the self-diagnostic processing unit 10-2 have the same configuration as the above first embodiment shown in FIGS. 5A and 5B.

Figure 17:
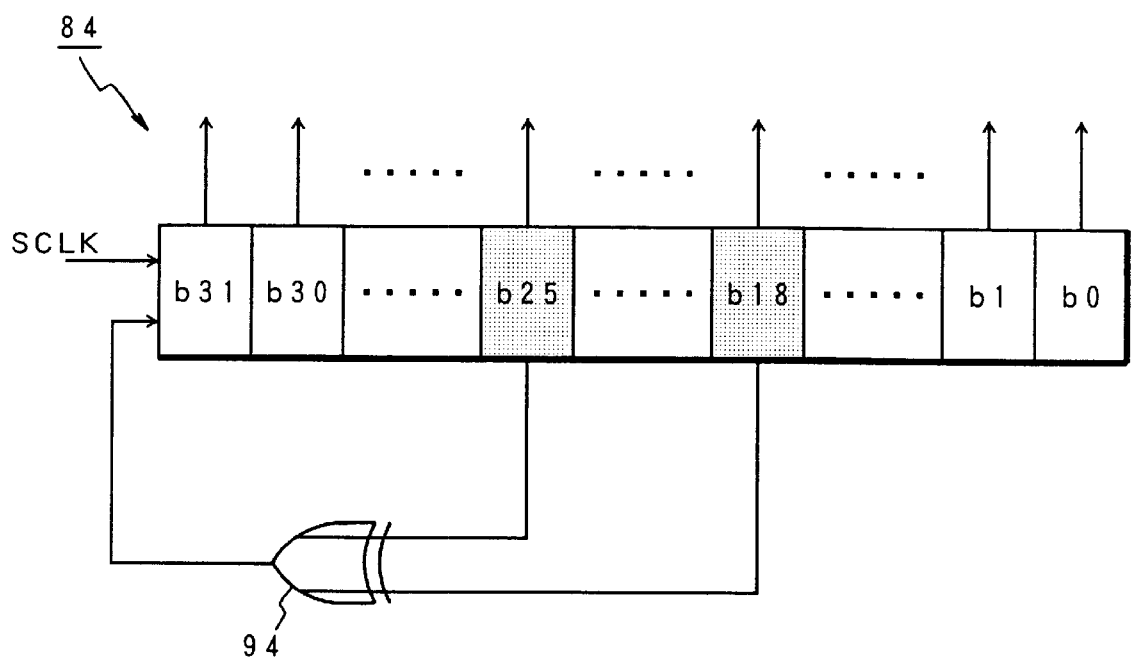
FIG. 17 is a circuit diagram showing a linear feedback shift register generating a pseudo-random number shown in FIGS. 16A and 16B.

FIG. 17 is a view showing a circuit configuration of the linear feedback shift register which generates a pseudo-random number. For example, the linear feedback shift register 84 is composed of a 32-bit string shift register 92 and an EX-OR circuit 94. The EX-OR circuit 94 is constructed in the following manner. More specifically, arbitrary two bits of 32 bits from b0 to b31 in the shift register 92, e.g., 19-th bit b18 and 26-th bit b25 are inputted, and an exclusive OR is taken, and thereafter, their bits are inputted to the most significant bit b31 (or may be inputted to the least significant bit b0). In FIGS. 15A and 15B, an arbitrary test data X read from the general register file 14 is loaded as the initial value to the shift register 92. After load, the shift register 92 supplies a shift clock, and output the test data of 32-bit shift data as a pseudo-random number data while shift-inputting the output of the EX-OR 94, and thus, carries out a self-diagnostic test.

Next, the following is a description on an operation of a self-diagnostic test according to the eleventh embodiment. When the TAP controller 42 asserts a BIST START signal, the self-diagnostic controller 44 is operated, and then, starts a self-diagnostic test operation of the arithmetic circuit unit 10-1. First, arbitrary test data X and Y stored in the general register file 14 are read from the general register file 14, and then, are selected by the multiplexers 88 and 90. Thereafter, these test data X and Y are set as the initial data to the linear feedback shift registers 84 and 86 via the first source register 24 and the second source register 26, respectively. In the above manner, when a preparation for setting the initial data is completed with respect to the linear feedback shift registers 84 and 86, the self-diagnostic controller 44 controls the multiplexers 88 and 90 by a control signal E2 so that these multiplexers 88 and 90 select the outputs of the linear feedback shift registers 84 and 86. Subsequently, the self-diagnostic controller 44 starts a self-diagnostic test using a pseudo-random number test data outputted in synchronous with a shift lock from the linear feedback shift registers 84 and 86. In this case, the self-diagnostic test is the same as the first embodiment shown in FIGS. 5A and 5B.

Twelfth Embodiment

Figure 18B:
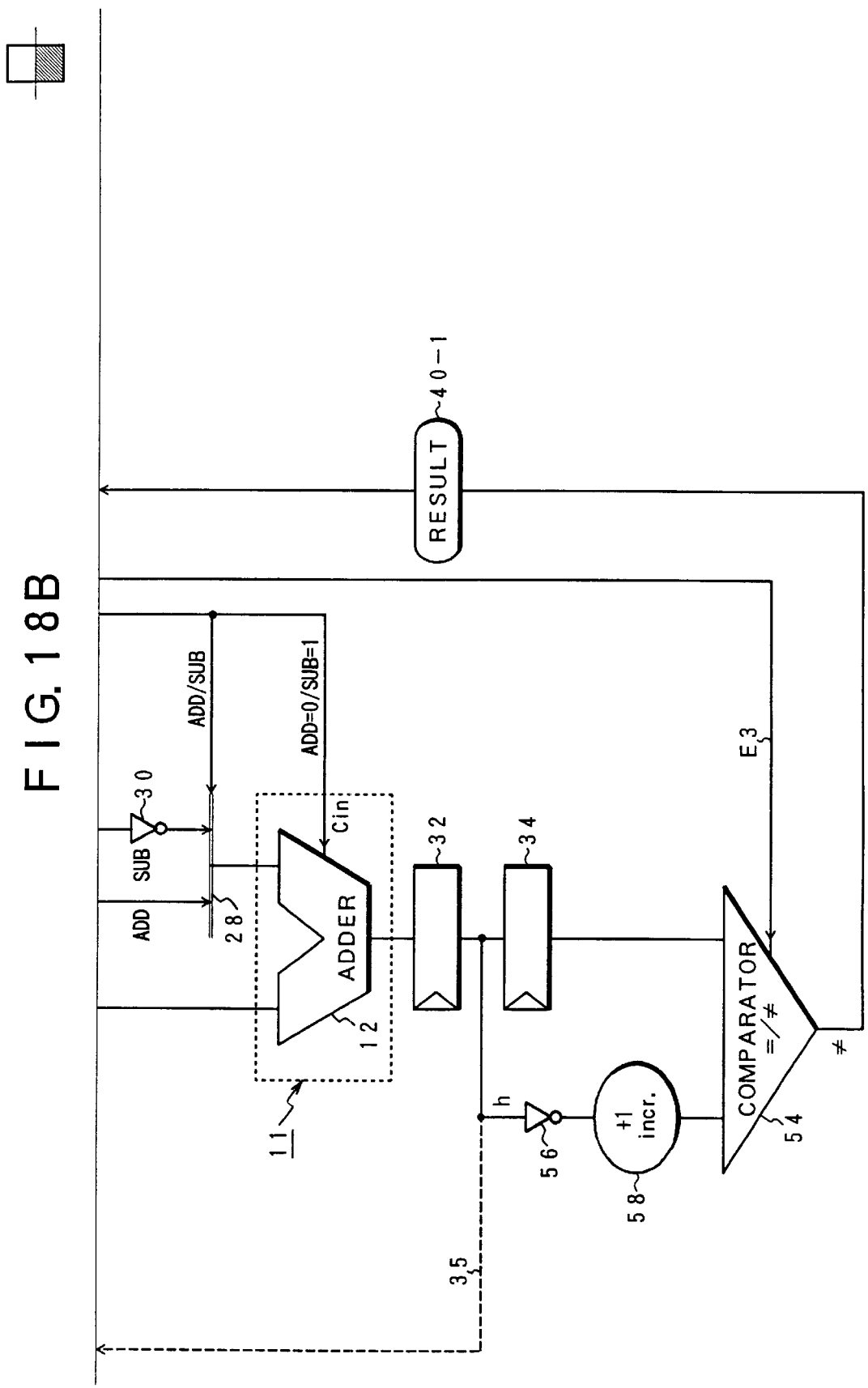

FIGS. 18A and 18B are circuit block diagrams showing a processor including a self-diagnostic function according to a twelfth embodiment of the present invention. This twelfth embodiment has the following constituent features. More specifically, in addition to the configuration of the second embodiment of FIGS. 7A and 7B comparing two subtraction results, the linear feedback shift registers 84 and 86 which generates a pseudo-random number are provided like the eleventh embodiment of FIG. 17, and then, a self-diagnostic test is repeatedly carried out while generating a pseudo-random number by the multiplexers 88 and 90. Other configuration of this twelfth embodiment is the same as the second embodiment shown in FIGS. 7A and 7B.

Thirteenth Embodiment

FIGS. 19A and 19B are circuit block diagrams showing a processor including a self-diagnostic function according to a thirteenth embodiment of the present invention. This thirteenth embodiment has the following constituent features. More specifically, in addition to the configuration of the fourth embodiment of FIGS. 9A and 9B, the linear feedback shift registers 84 and 86 which generate a pseudo-random number, and the multiplexers 84 and 86 which select the outputs of these shift registers are provided. Other configuration of this twelfth embodiment is the same as the fourth embodiment shown in FIGS. 9A and 9B.

Fourteenth Embodiment

Figure 20A:
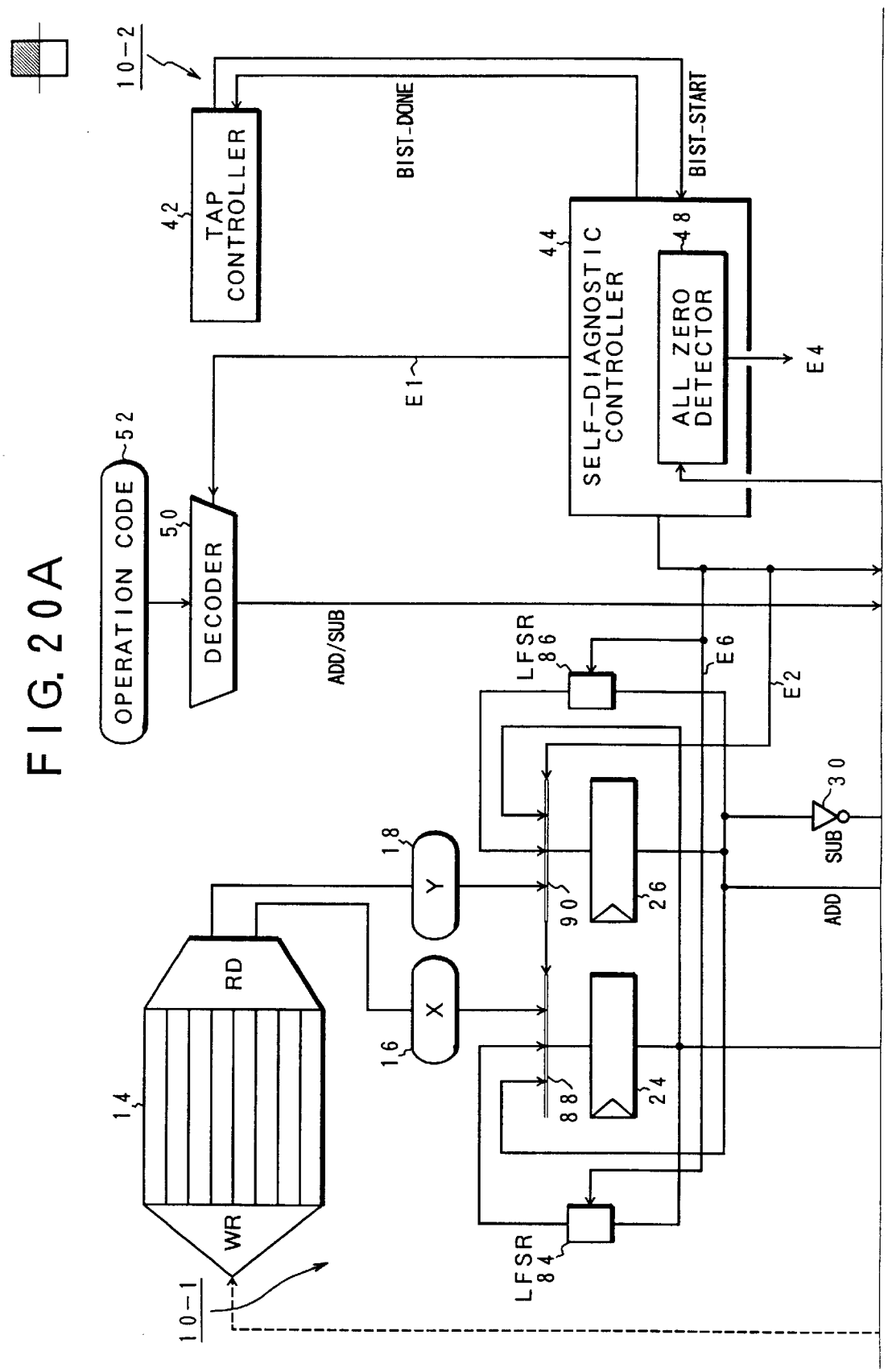

FIGS. 20A and 20B are circuit block diagrams showing a processor including a self-diagnostic function according to a fourteenth embodiment of the present invention. This fourteenth embodiment has the following constituent features. More specifically, in addition to the configuration of the sixth embodiment of FIG. 11A and 11B, the linear feedback shift registers 84 and 86 which generate a pseudo-random number, and the multiplexers 84 and 86 which select the outputs of these shift registers are provided. Other configuration of this twelfth embodiment is the same as the fourth embodiment shown in FIGS. 11A and 11B.

Fifteenth Embodiment

Figure 21A:
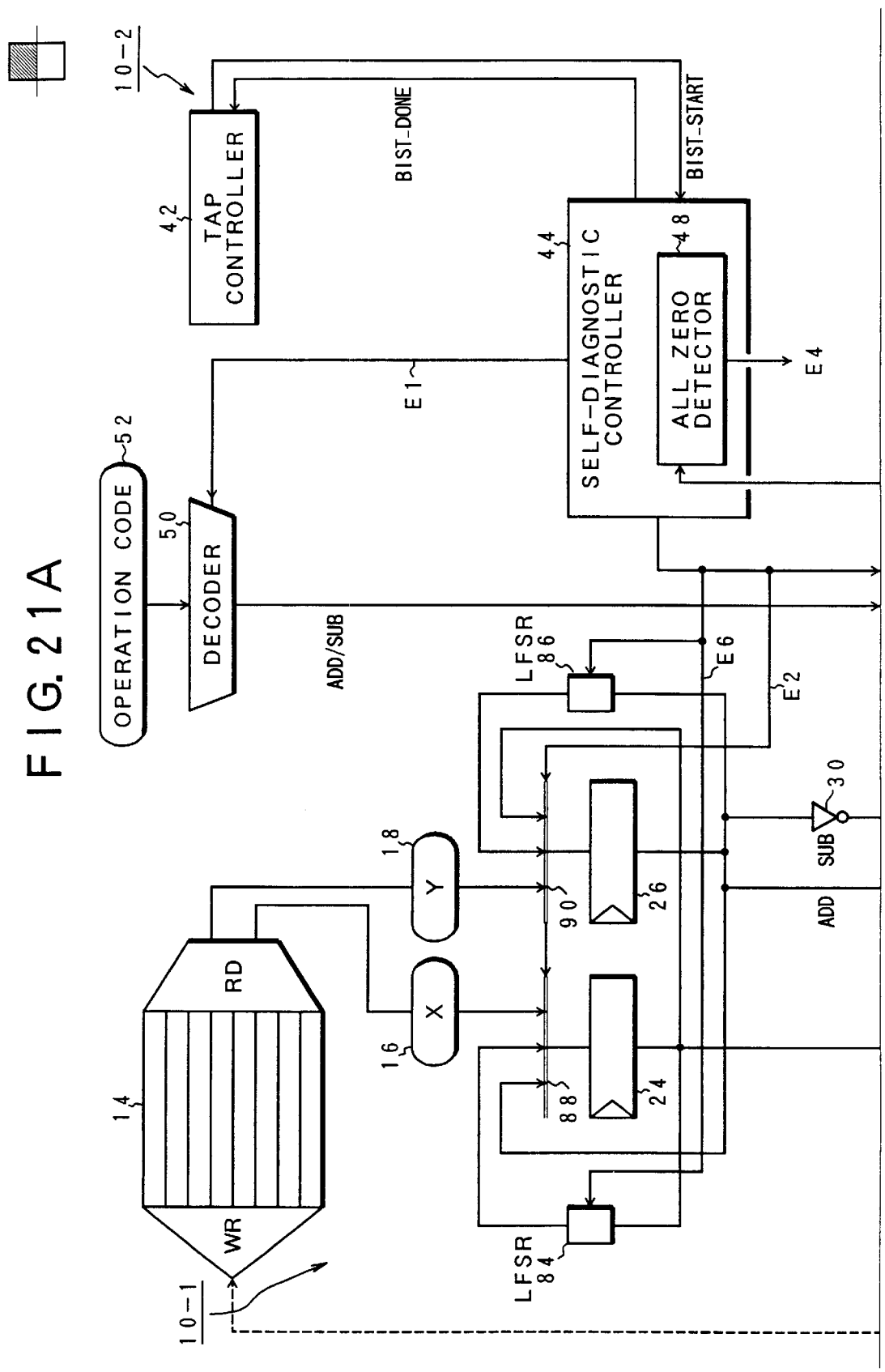
FIGS. 21A and 21B are a circuit block diagrams showing a processor according to a fifteenth embodiment of the present invention using a pseudo-random number generation.
Figure 21B:
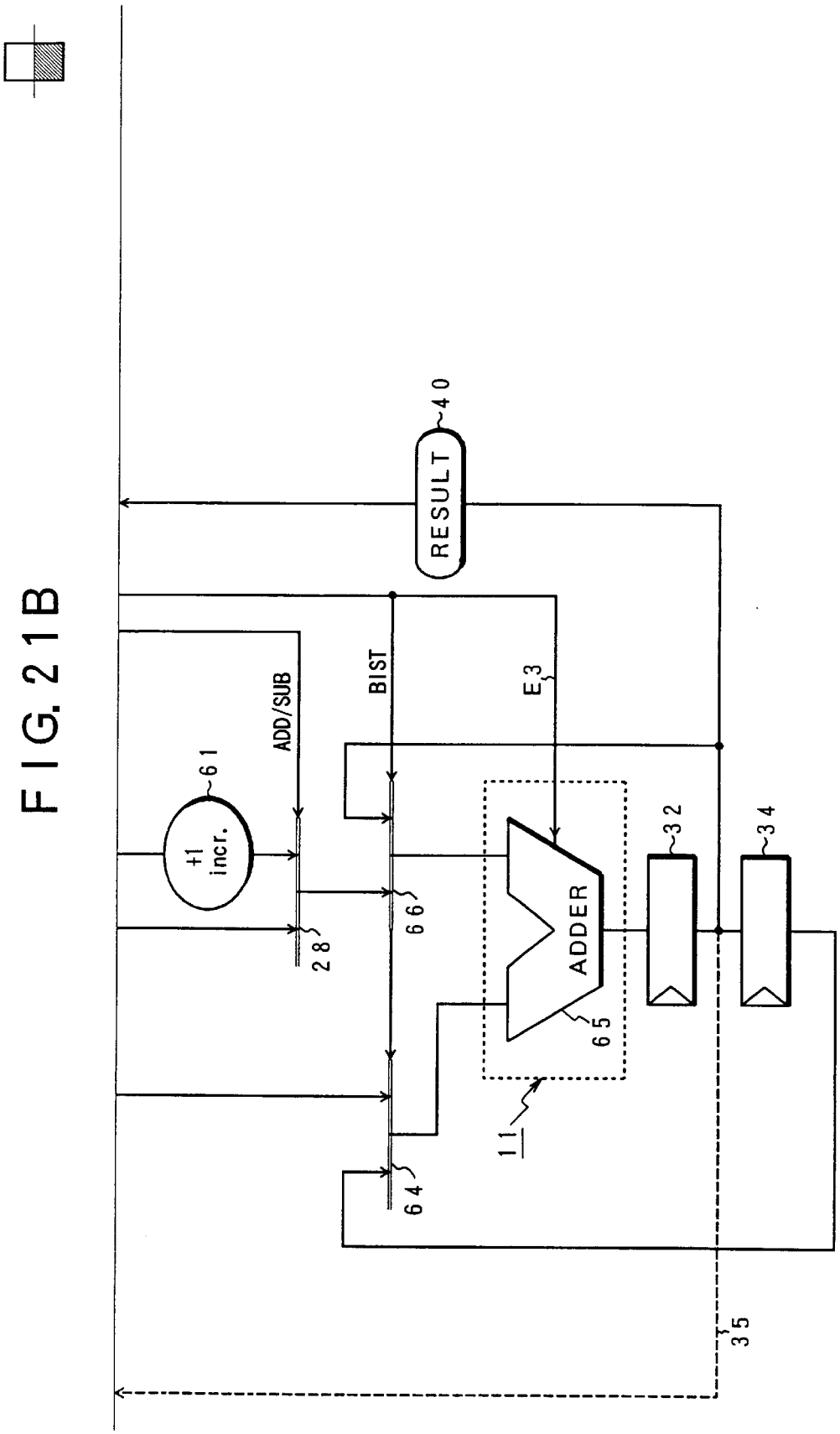

FIGS. 21A and 21B are circuit block diagrams showing a processor including a self-diagnostic function according to a fifteenth embodiment of the present invention. This fifteenth embodiment has the following constituent features. More specifically, in addition to the configuration of the fifth embodiment shown in FIGS. 10A and 10B, the linear feedback shift registers 84 and 86 which generate a pseudo-random number, and the multiplexers 84 and 86 which select the outputs of these shift registers are provided. Other configuration of this twelfth embodiment is the same as the fifth embodiment shown in FIGS. 10A and 10B.

Sixteenth Embodiment

Figure 22:
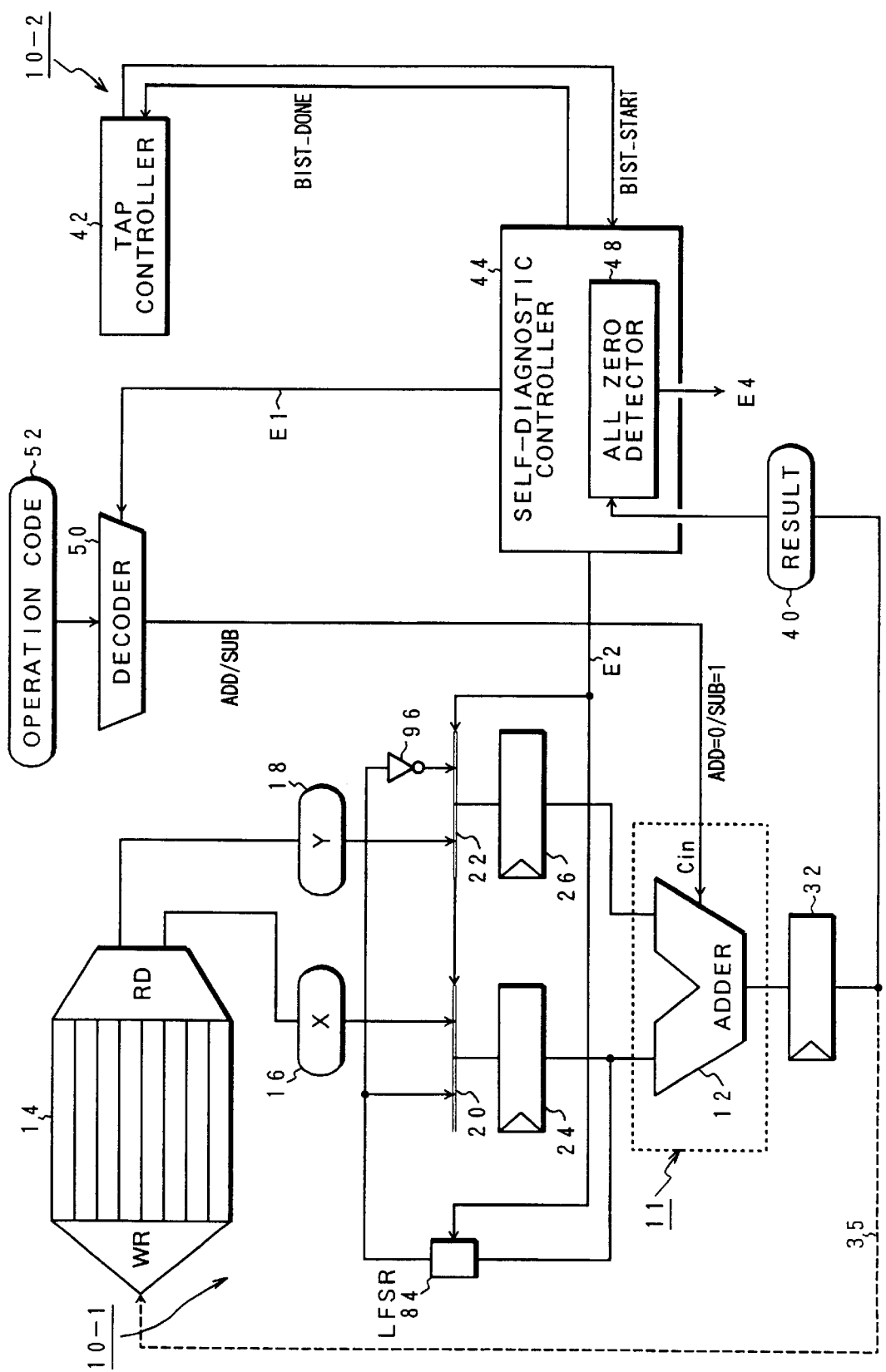
FIG. 22 is a circuit block diagram showing a processor according to a sixteenth embodiment of the present invention using a pseudo-random number generation.

FIG. 22 is circuit block diagram showing a processor including a self-diagnostic function according to a sixteenth embodiment of the present invention. According to this sixteenth embodiment, a test data X is generated as a pseudo-random number from a single linear feedback shift register, and then, one test data X is inverted so as to obtain one's (1's) complement X1's, and thereafter, an operation of subtraction Z=X−Y is carried out. Further, the complement X2's is generated, and if the subtraction result Z is all zero, the adder-subtracter 12 of being a test object is normal. On the other hand, if the subtraction result Z is not all zero, a judgment is made such that the adder-subtracter 12 has a failure. First, the following is a description on an arithmetic circuit 10-1. Following the general register file 14, the multiplexers 20 and 22 and the first and second source registers 24 and 26 are provided, and further, a linear feedback shift register 84 which generates a pseudo-random number is provided. The multiplexer 20 selects and outputs either of a source data 16 used as a first operand from the general register file 14 or a test data from the linear feedback shift register 84. On the other hand, the multiplexer 22 selects and outputs either of a source data 18 used as a second operand from the general register file 14 or an output obtained by inverting the test data from the linear feedback shift register 84 so that the test data is converted into one's complement by an inverter 96. In this case, when the test data outputted from the linear feedback shift register 84 is set as X, in the self-diagnostic test, the test data X is held in the first source register 24, and simultaneously, a value converted into one's (1's) complement X1's inverted by the inverter 96 is held in the second source register 26. Following the first and second source registers 24 and 26, a two-input adder-subtracter 12 with carry input Cin is provided as a test object. The adder-subtracter 12 inputs a first operand A, a second operand B and further, a carry input Cin. Then, the adder-subtracter 12 executes an operation of C=A+B+0=A+B in the case where the decoder 50 outputs the addition instruction ADD, while executing an operation of C'A+B+1=A+B1's in the case where the subtraction instruction SUB is outputted. At that time, in the case where one's (1's) complement B1's is inputted as a second operand from the second source register 26, the adder-subtracter 12 executes an operation of C'=A+B1's+1=A+B2's=A−B.

Next, the following is a description on an operation of a self-diagnostic test according to the sixteenth embodiment shown in FIG. 22. When the TAP controller 42 asserts a BIST START signal, the self-diagnostic controller 44 is operated, and then, arbitrary test data X and Y are read from the general register file 14. Of these test data X and Y, the input data X used as a first source data 16 is set as the initial value to the linear feedback shift register 84 via the multiplexer 20 and the first source register 24. After that, every processing cycle, the input data x is generated as a pseudo-random number test data, and then, is selected by the multiplexers 20 and 22, and thereafter, is held as a first operand X in the first source register 24. On the other hand, the input data X is held as a second operand X1's inverted by the inverter 96 in the second source register 26. The adder-subtracter 12 inputs the first operand X, the second operand X1's and the carry input Cin=1 because the decoder 50 outputs the subtraction instruction SUB according to the control by the self-diagnostic controller 44, and then, executes the following operation.

$$Z=X+X1's+1=X+X2's=X-X$$

Subsequently, the adder-subtracter holds the operation result Z in the destination register 32. The value held in the destination register 32 is outputted as the operation result 40 to the all-zero detector 48 of the self-diagnostic controller 44. If every bit of the operation result 40 is all zero, the all-zero detector 48 makes a judgment such that the adder-subtracter 12 is normally operated. On the other hand, if every bit of the operation result 40 is not all zero, the all-zero detector 48 make a judgment such that the adder-subtracter 12 has a failure, and then, outputs an error signal E4 to the external unit. According to this sixteenth embodiment, in the case where the adder-subtracter 12 of being a test object is normally operation in the fist time subtraction, the operation result of all zero is obtained. Therefore, as compared with the above embodiments of FIGS. 5A and 5B to FIGS. 21A and 21B, it is possible to greatly simplify a circuit configuration of the arithmetic circuit 10-1. Moreover, in addition to the simplification of configuration of the arithmetic circuit 10-1, the operation processing cycle is short; therefore, high-speed processing can be achieved. In this sixteenth embodiment of FIG. 22, in one time self-diagnostic test, the operation of the adder-subtracter 12 of being a test object is carried out only one time. Thus, as compared with the case where the operation of the adder-subtracter 12 of being a test object is carried out tow times in the above embodiments shown in FIGS. 5A and 5B to FIGS. 21A and 211B, there is a problem that reliability becomes low in evaluation of the self-diagnostic test. In order to solve the above problem, an operation iterative number for self-diagnosis is made twice, and thereby, it is possible to obtain the same evaluation result of the self-diagnostic test as the above embodiments of FIGS. 5A and 5B to FIGS. 21A and 21B.

Seventeenth Embodiment

FIG. 22 is circuit block diagram showing a processor including a self-diagnostic function according to a seventeenth embodiment of the present invention. In this seventeenth embodiment, basically, the same arithmetic circuit 10-1 as the sixteenth embodiment of FIG. 22 is simplified, and an adder-subtracter 65 having no carry input is used as a test object 11. The adder-subtracter 65 having no carry input is used as a test object 11. By doing so, a +1 increment circuit 98 is further provided onto an output line of the linear feedback shift register 84 with respect to the multiplexer 22 on the second source register 26 side, following an inverter 96 which generates one's (1's) complement X1's inverting a test data X. Therefore, the +1 increment circuit 96 adds "1" to the one's complement X1's so that the test data X is converted into two's (2's) complement 2X's. Other configuration is the same as the sixth embodiment shown in FIGS. 11A and 11B.

Next, the following is a description on an operation of a self-diagnostic test according to the seventeenth embodiment of FIGS. 23A and 23B. When the TAP controller 42 asserts a BIST START signal, the self-diagnostic controller 44 is operated, and then, a first source data 16 read from the general register file 14 is set to the linear feedback shift register 84 via the multiplexer 20 and the first source register 24. After that, a pseudo-random number from the linear feedback shift register 84 is used as a test data, and then, a self-diagnostic operation is carried out. More specifically, in the self-diagnostic operation, according to a control signal E2, the multiplexers 20 and 22 select the output of the linear feedback shift register 84 side. At that time, when the linear feedback shift register 84 outputs a test data X, the test data is held as a first operand in the first source register 24. On the other hand, the following value is held in the second source register 26. The value is obtained by inverting the test data X by the inverter 96 so that it is converted into one's (1's) complement X1's, and thereafter, adding "1" thereto by the +1 increment circuit 98 so that it is converted into two's (2's) complement X2's. Thus, the adder-subtracter 65 of being a test object inputs the first operand X and the second operand Y2's, and then, executes the following operation.

$$Z = X + X2\text{'s} = X + X1\text{'s} + 1 = X - X$$

Subsequently, the adder-subtracter holds the operation result in the destination register 32. The value Z held in the destination register 32 is outputted as the operation result 40 to the all-zero detector 48 of the self-diagnostic controller 44. If every bit of the Z value of the operation result 40 is all zero, the all-zero detector 48 makes a judgment such that the adder-subtracter 12 of being a test object is normally operated. On the other hand, if every bit of the Z value of the operation result 40 is not all zero, the all-zero detector 48 make a judgment such that the adder-subtracter 12 has a failure, and then, outputs an error signal E4 to the external unit.

As described above, the embodiments of the present invention have been described. Likewise, the present invention discloses the invention described below.

A processor including a self-diagnostic function, comprising:
an arithmetic circuit, and
a self-diagnostic processing unit,
the arithmetic circuit unit including:
a first source register which stores a first operand A;
a second source register which stores a second operand B;
a pseudo-random number generator which carries out random number generation processing for each operation cycle after inputting either of the first or second operand as the initial value so as to generate a new operand, and which stores the newly generated operand in the first source register;
a complement circuit which inverts an operand B outputted by the random number generator and adding "1" the operand B so as to generate two's (2's) complement B2's, and which stores the complement in the second source register; and
a two-input adder-subtracter having no carry input, which adds the two's (2's) complement B2's generated by the complement circuit to the first operand A in the case of carrying out a subtraction (A−B), and is a diagnostic object,
the self-diagnostic processing unit inputting an arbitrary self-diagnostic data X having a predetermined bit length stored in the first and second source registers, and two's (2's) complement X2's of X generated by the complement circuit to the adder-subtracter from the random number generator, and carrying out a subtraction (Z=X−X) as Z=X+X2's), and further, making a judgment such that the adder-subtracter is normal in the case where every bit of the subtraction result Z is all zero "0", while making a judgment such that the adder-subtracter has a failure in the case where every bit of the subtraction result Z is not all zero "0".

As is evident from the above description, according to the present invention, the arithmetic circuit and the self-diagnostic processing unit are constructed in a manner that in order to easily make a check, every bit of the operation result is all zero "0" or all "1" with respect to an arbitrary self-diagnostic input data. By doing so, there is no need of providing an expected value required for a conventional self-diagnosis and a comparator circuit for the expected value. Therefore, it is possible to make small a circuit scale required for realizing a self-diagnosis; as a result, a die side processor can be made small. Further, it is possible to realize an integrated circuit such as a processor mounted with a self-diagnostic function contributing to an improvement of yield of processor and low power consumption.

Moreover, in the case of reading test data from the external unit, no expected value is required; therefore, it is possible to shorten a time for reading the external data. Further, in the case where a time spent for self-diagnosis per one processor varies by an integrated circuit product plan such as a processor or the like, no preparation of expected value is required; therefore, it is possible to flexibly and readily meet the processor product plan.

In the above embodiments, the arithmetic circuit and the self-diagnostic processing unit have been constructed in a manner that the operation result is all zero "0" in the self-diagnostic test. Likewise, in order to easily make a check of the operation result without using the expected value, the arithmetic circuit and the self-diagnostic processing unit may be constructed in a manner that the operation result is all "1".

The above construction which obtains all "1" of the operation result is the case of taking a negative logic construction in the above each embodiment. The present invention is not limited to the above embodiments, and includes proper modifications without diverging from the objects and advantages of the invention. Further, the present invention is not limited to numerical values shown in the above embodiments.

What is claimed is:

1. A processor comprising:
    an arithmetic circuit including an adder-subtracter, which is a diagnostic object;
    a data store unit which stores a self-diagnostic data; and
    a self-diagnostic processing unit which inputs the self-diagnostic data, and carrying out diagnostic processing so that every bit of operation result become all zero "0" or all "1" by the arithmetic circuit.

2. The processor according to claim 1, wherein the arithmetic circuit includes:
    a first source register which stores a first operand A;
    a second source register which stores a second operand B;
    a complement circuit which inverts the second operand B so as to output one's (1's) complement B1's;
    a first adder-subtracter with carry input of being as a diagnostic object, which inputs the first operand A as a minuend and inputting the output value B1's of the complement circuit as a subtrahend together with carry input, and adds "1" to one's (1's) complement B1's so as to generate two's (2's) complement B2's, and further, adds the generated complement B2's to the first operand A so as to carry out a subtraction C=(A−B); and
    a second adder-subtracter provided on the next stage of the first adder-subtracter,
    the self-diagnostic processing unit uses arbitrary self-diagnostic data X and Y having a predetermined bit length stored in the first and second source registers,
    carries out a subtraction Z=(X=Y) as Z=(X+Y2's)=(X+Y1's+1) using the complement circuit and the first adder-subtracter in a first cycle,
    replaces the minuend X with the subtrahend Y each other, and carries out a subtraction Z'=(Y−X) as Z'=(Y+X2's)=(Y+X1's+1) using the complement circuit and the first adder-subtracter in a second cycle,
    carries out an addition Z" of the subtraction results Z and Z' in the first and second cycles, that is, Z"=(Z+Z')=(X+X1's +1+Y+Y1's+1) using the second adder-subtracter in a third cycle, and makes a judgment such that the first adder-subtracter is normal in the case where every bit of the addition result is all zero "0" while making a judgment such that the first adder-subtracter has a failure in the case where every bit of the addition result is other than zero "0".

3. The processor according to claim 1, wherein the arithmetic circuit includes:
    a first source register which stores a first operand A;
    a second source register which stores a second operand B;
    a first complement circuit which inverts the second operand B so as to output one's (1's) complement B1's;
    an adder-subtracter with carry input of being as a diagnostic object, which inputs the first operand A as a minuend and inputting the output value B1's of the complement circuit as a subtrahend together with carry input, and adds "1" to one's (1's) complement B1's so as to generate two's (2's) complement B2's, and further, adds the generated complement B2's to the first operand so as to carry out a subtraction C=(A−B); and
    a second complement circuit which inverts the subtraction value C of the adder-subtracter and adding "1" thereto so as to output two's (2's) complement C2's;
    a second adder-subtracter provided on the next stage of the first adder-subtracter; and
    a comparator which compares an output of the adder-subtracter with an output of the second complement circuit, and further,
    the arithmetic circuit uses arbitrary self-diagnostic data X and Y having a predetermined bit length stored in the first and second source registers,
    carries out a subtraction Z=(X−Y) as Z=(X+Y2's)=(X+Y1's+1) using the first complement circuit and the adder-subtracter in a first cycle,
    replaces the minuend X with the subtrahend Y each other, and carries out a subtraction Z'=(Y−X) as Z=(Y+X2's)=(Y+X1's+1) using the first complement circuit and the adder-subtracter in a second cycle, outputs a complement Z'2s=(Z1's+1) of the subtraction result Z' from the second complement circuit so as to compare it with the subtraction result Z of the first cycle, and makes a judgment such that the first adder-subtracter is normal in the case where the subtraction results Z' and Z are correspondent (Z'2's=Y2's−X2's=X+Y2's=Z) while making a judgment such that the first adder-subtracter has a failure in the case where the subtraction results Z' and Z are not correspondent.

4. The processor according to claim 1, wherein the arithmetic circuit includes:
    a first source register which stores a first operand A;
    a second source register which stores a second operand B;
    a complement circuit which inverts the second operand B and adding "1" so as to output two's (2's) complement B2's;
    a first adder-subtracter of being as a diagnostic object, which inputs the first operand A as an augend and inputting the output value B2's of the complement circuit as an addend so as to carry out a subtraction C=(A−B); and
    a second adder-subtracter provided on the next stage of the first adder-subtracter,
    the self-diagnostic processing unit uses arbitrary self-diagnostic data X and Y having a predetermined bit length stored in the first and second source registers, carries out a subtraction Z=(X=Y) as Z=(X+Y2's)=(X+Y1's+1) using the complement circuit and the first adder-subtracter in a first cycle, replaces the minuend X with the subtrahend Y each other, and carries out a subtraction Z'=Y−X as Z'=(Y+X2's)=(Y+X1's+1) using the complement circuit and the first adder-subtracter in a second cycle, carries out an addition Z" of the subtraction results Z and Z' in the first and second cycles, that is, Z"=(Z+Z')=(X+X1's +1+Y+Y1's+1) using the second adder-subtracter in a third cycle, and makes a judgment such that the first adder-subtracter is normal in the case where every bit of the addition result is all zero "0" while making a judgment such that the first adder-subtracter has a failure in the case where every bit of the addition result is other than zero "0".

5. The processor according to claim 1, wherein the arithmetic circuit includes:

a first source register which stores a first operand A;

a second source register which stores a second operand B;

a complement circuit which inverts the second operand B so as to output one's (1's) complement B1's; and a adder-subtracter with carry input of being as a diagnostic object, which inputs the first operand A as a minuend and inputting the output value B1's of the complement circuit as a subtrahend together with carry input, and adds "1" to one's (1's) complement B1's so as to generate two's (2's) complement B2's, and further, adds the generated complement B2's to the first operand so as to carry out a subtraction C=(A−B);

the self-diagnostic processing unit uses arbitrary self-diagnostic data X and Y having a predetermined bit length stored in the first and second source registers, carries out a subtraction Z=(X=Y) as Z=(X+Y2's)=(X+Y1's+1) using the complement circuit and the adder-subtracter in a first cycle, replaces the minuend X with the subtrahend Y each other, and carries out a subtraction Z'=(Y−X) as Z'=(Y+X2's)=(Y+X1's+1) using the complement circuit and the first adder-subtracter in a second cycle, carries out an addition Z" of the subtraction results Z and Z' in the first and second cycles, that is, Z"=(Z+Z')=(X+X1's+1+Y+Y1's+1) using the adder-subtracter in a third cycle, and makes a judgment such that the first adder-subtracter is normal in the case where every bit of the addition result is all zero "0" while making a judgment such that the first adder-subtracter has a failure in the case where every bit of the addition result is other than zero "0".

6. The processor according to claim 1, wherein the arithmetic circuit includes:

a first source register which stores a first operand A;

a second source register which stores a second operand B;

a complement circuit which inverts the second operand B and adding "1" so as to output two's (2's) complement B2's; and a adder-subtracter of being as a diagnostic object, which inputs the first operand A as an augend and inputting the output value B2's of the complement circuit as an addend so as to carry out a subtraction C=(A−B);

the self-diagnostic processing unit uses arbitrary self-diagnostic data X and Y having a predetermined bit length stored in the first and second source registers, carries out a subtraction Z=(X=Y) as Z=(X+Y2's)=(X+Y1's+1) using the complement circuit and the adder-subtracter in a first cycle, replaces the minuend X with the subtrahend Y each other, and carries out a subtraction Z'=Y−X as Z'=(Y+X2's)=(Y+X1's+1) using the complement circuit and the adder-subtracter in a second cycle, carries out an addition Z" of the subtraction results Z and Z' in the first and second cycles, that is, Z"=(Z+Z')=(X+X1's+1+Y+Y1's+1) using the adder-subtracter in a third cycle, and makes a judgment such that the first adder-subtracter is normal in the case where every bit of the addition result is all zero "0" while making a judgment such that the first adder-subtracter has a failure in the case where every bit of the addition result is other than zero "0".

7. The processor according to claim 1, wherein the arithmetic circuit includes:

a first source register which stores a first operand A;

a second source register which stores a second operand B;

a first complement circuit which inverts the second operand B so as to output one's (1's) complement B1's;

a second complement circuit which inverts the first operand A so as to output one's (1's) complement A1's;

a first adder-subtracter with carry input of being as a diagnostic object, which inputs the first operand A as a minuend and inputting the output value B1's of the second complement circuit as a subtrahend together with carry input, and adds "1" to one's (1's) complement B1's so as to generate two's (2's) complement B2's, and further, adds the generated complement B2's to the first operand A so as to carry out a subtraction C=(A−B);

a second adder-subtracter with carry input, which inputs the second operand B as a minuend and inputting the output value A1's of the first complement circuit as a subtrahend together with carry input, and adds "1" to one's (1's) complement A1's so as to generate two's (2's) complement A2's, and further, adds the generated complement B2's to the second operand B so as to carry out a subtraction C'=B−A); and a third adder-subtracter which adds an output of the first adder-subtracter and an output of the second adder-subtracter, the self-diagnostic processing unit uses arbitrary self-diagnostic data X and Y having a predetermined bit length stored in the first and second source registers, carries out a subtraction Z=(X=Y) as Z=(X+Y2's)=(X+Y1's+1) using the first complement circuit and the first adder-subtracter in a first cycle, while concurrently carrying out a subtraction Z'=(Y−X) as Z=(Y+X2's)=(Y+X1's+1) using the second complement circuit and the second adder-subtracter in a first cycle, carries out an addition Z" of the subtraction results Z and Z' of the first and second adder-subtracters, that is, Z'=(Z+Z')=(X+X1's+1+Y+Y1's+1) using the third adder-subtracter in a second cycle, and makes a judgment such that the first adder-subtracter is normal in the case where every bit of the addition result is all zero "0" while making a judgment such that the first adder-subtracter has a failure in the case where every bit of the addition result is other than zero "0".

8. The processor according to claim 1, wherein the arithmetic circuit includes:

a first source register which stores a first operand A;

a second source register which stores a second operand B;

a first complement circuit which inverts the second operand B so as to output one's (1's) complement B1's;

a second complement circuit which inverts the first operand A so as to output one's (1's) complement A1's;

a first adder-subtracter with carry input of being as a diagnostic object, which inputs the first operand A as a minuend and inputting the output value B1's of the second complement circuit as a subtrahend together with carry input, and adds "1" to one's (1's) complement B1's so as to generate two's (2's) complement B2's, and further, adds the generated complement B2's to the first operand A so as to carry out a subtraction C=(A−B);

a second adder-subtracter with carry input of being as a diagnostic object, which inputs the second operand B as a minuend and inputting the output value A1's of the first complement circuit as a subtrahend together with carry input, and adds "1" to one's (1's) complement A1's so as to generate two's (2's) complement A2's, and further, adds the generated complement B2's to the second operand B so as to carry out a subtraction C'=(B−A);

a third complement circuit which inverts the subtraction value C' of the second adder-subtracter and adding "1" thereto so as to output two's (2's) complement C'2's; and a comparator which compares an output of the adder-subtracter with an output of the third complement circuit, the self-diagnostic processing unit uses arbitrary self-diagnostic data X and Y having a predetermined bit length stored in the first and second source registers, carries out a subtraction Z=(X=Y) as Z=(X+Y2's)=(X+Y1's+1) using the first complement circuit and the first adder-subtracter in a first cycle, while concurrently carrying out a subtraction Z'=(Y−X) as Z=(Y+X2's)=(Y+X1's+1) using the second complement circuit and the second adder-subtracter in a first cycle, outputs a complement Z'2s=(Z1's+1) of the subtraction result Z' of the second adder-subtracter from the third complement circuit so as to compare it with the subtraction result Z of the first adder-subtracter in a second cycle, and makes a judgment such that the first adder-subtracter is normal in the case where the subtraction results Z' and Z are correspondent (Z'2's=Y2's−X2's=X+Y2's=Z) while making a judgment such that the first adder-subtracter has a failure in the case where the subtraction results Z' and Z are not correspondent.

9. The processor according to claim 1, wherein the arithmetic circuit includes:

a first source register which stores a first operand A;

a second source register which stores a second operand B;

a first complement circuit which inverts the second operand B and adding "1" thereto so as to output two's (2's) complement B2's;

a second complement circuit which inverts the first operand A and adding "1" thereto so as to output two's (2's) complement A2's;

a first adder-subtracter of being as a diagnostic object, which inputs the first operand A as a minuend and inputting the output value B2's of the first complement circuit as a subtrahend so as to carry out a subtraction C=(A−B);

a second adder-subtracter, which inputs the second operand B as a minuend and inputting the output value A2's of the second complement circuit as a subtrahend so as to carry out a subtraction C'=(B−A); and a third adder-subtracter which adds an output of the first adder-subtracter and an output of the second adder-subtracter, the self-diagnostic processing unit uses arbitrary self-diagnostic data X and Y having a predetermined bit length stored in the first and second source registers, carries out a subtraction Z=(X=Y) as Z=(X+Y2's)=(X+Y1's+1) using the first complement circuit and the first adder-subtracter in a first cycle, while concurrently carrying out a subtraction Z'=(Y−X) as Z=(Y+X2's)=(Y+X1's+1) using the second complement circuit and the second adder-subtracter in a first cycle, carries out an addition Z" of the subtraction results Z and Z' of the first and second adder-subtracters, that is, Z"=(Z+Z')=(X+X1's+1+Y+Y1's+1) using the third adder-subtracter in a second cycle, and makes a judgment such that the first adder-subtracter is normal in the case where every bit of the addition result is all zero "0" while making a judgment such that the first adder-subtracter has a failure in the case where every bit of the addition result is other than zero "0".

10. The processor according to claim 1, wherein the arithmetic circuit includes:

a first source register which stores a first operand A;

a second source register which stores a second operand B;

a first complement circuit which inverts the second operand B so as to output one's (1's) complement B1's;

a second complement circuit which inverts the first operand A so as to output one's (1's) complement A1's;

a first adder-subtracter with carry input of being as a diagnostic object, which inputs the first operand A as a minuend and inputting the output value B1's of the second complement circuit as a subtrahend together with carry input, and adds "1" to one's (1's) complement B1's so as to generate two's (2's) complement B2's, and further, adds the generated complement B2's to the first operand A so as to carry out a subtraction C=(A−B); and a second adder-subtracter with carry input, which inputs the second operand B as a minuend and inputting the output value A1's of the first complement circuit as a subtrahend together with carry input, and adds "1" to one's (1's) complement A1's so as to generate two's (2's) complement A2's, and further, adds the generated complement B2's to the second operand B so as to carry out a subtraction C'=(B−A), the self-diagnostic processing unit uses arbitrary self-diagnostic data X and Y having a predetermined bit length stored in the first and second source registers, carries out a subtraction Z=(X−Y) as Z=(X+Y2's)=(X+Y1's+1) using the first complement circuit and the first adder-subtracter in a first cycle, while concurrently carrying out a subtraction Z'=(Y−X) as Z=(Y+X2's)=(Y+X1's+1) using the second complement circuit and the second adder-subtracter in a first cycle, carries out an addition Z" of the subtraction results Z and Z' of the first and second adder-subtracters in the second cycle, that is, Z'=(Z+Z')=X+X1's+1+Y+Y1's+1) using the first adder-subtracter in a second cycle, and makes a judgment such that the first adder-subtracter is normal in the case where every bit of the addition result is all zero "0" while making a judgment such that the first adder-subtracter has a failure in the case where every bit of the addition result is other than zero "0".

11. The processor according to claim 1, wherein the arithmetic circuit includes:
- a first source register which stores a first operand A;
- a second source register which stores a second operand B;
- a first complement circuit which inverts the second operand B and adding "1" thereto so as to output two's (2's) complement B2's;
- a second complement circuit which inverts the first operand A and adding "1" thereto so as to output two's (2's) complement A2's;
- a first adder-subtracter of being as a diagnostic object, which inputs the first operand A as a minuend and inputting the output value B2's of the first complement circuit as a subtrahend so as to carry out a subtraction $C=(A-B)$; and
- a second adder-subtracter, which inputs the second operand B as a minuend and inputting the output value A2's of the second complement circuit as a subtrahend so as to carry out a subtraction $C'=(B-A)$,
- the self-diagnostic processing unit uses arbitrary self-diagnostic data X and Y having a predetermined bit length stored in the first and second source registers,
- carries out a subtraction $Z=(X=Y)$ as $Z=(X+Y2's)=(X+Y1's+1)$ using the first complement circuit and the first adder-subtracter in a first cycle, while concurrently carrying out a subtraction $Z'=(Y-X)$ as $Z=(Y+X2's)=(Y+X1's+1)$ using the second complement circuit and the second adder-subtracter in a first cycle,
- carries out an addition Z" of the subtraction results Z and Z' of the first and second adder-subtracters in the first cycle, that is, $Z''=(Z+Z')=(X+X1's+1+Y+Y1's+1)$ using the first adder-subtracter in a second cycle, and makes a judgment such that the first adder-subtracter is normal in the case where every bit of the addition result is all zero "0" while making a judgment such that the first adder-subtracter has a failure in the case, where every bit of the addition result is other than zero "0".

12. The processor according to any of claims 2 to 10, wherein the arithmetic circuit further includes:
- a first pseudo-random number generator which carries out random number generation processing for each operation cycle after inputting the first operand A stored in the first source register as the initial value so as to generate a newly first operand, and which stores the newly generated operand in the first source register; and
- a second pseudo-random number generator which carries out random number generation processing for each operation cycle after inputting the second operand B stored in the second source register as the initial value so as to generate a newly second operand, and which stores the newly generated operand in the second source register
- the self-diagnostic processing unit repeatedly carries out self-diagnostic processing in a manner that the first and second pseudo-random number generators generate new self-diagnostic data X and Y every when self-diagnostic processing using arbitrary self-diagnostic data X and Y having a predetermined bit length stored in the first and second source registers is normally completed.

13. The processor according to claim 1, wherein the arithmetic circuit including:
- a first source register which stores a first operand A;
- a second source register which stores a second operand B;
- a pseudo-random number generator which carries out random number generation processing for each operation cycle after inputting either of the first or second operand as the initial value so as to generate a new operand, and which stores the newly generated operand in the first source register;
- a complement circuit which inverts an operand A outputted by the random number generator and which stores one's (1's) complement A1's in the second source register;
- a first adder-subtracter with carry input of being as a diagnostic object, which inputs the first operand B as a minuend and inputs the second operand A1's as a subtrahend together with carry input, and adds "1" thereto one's (1's) complement A1's so as to generate two's (2's) complement A2's, and further, adds the generated complement B2's to the first operand A so as to carry out a subtraction $C=(A-A)$
- the self-diagnostic processing unit inputs an arbitrary self-diagnostic data X and X1's having a predetermined bit length stored in the first and second source registers to the adder-subtracter together with the carry input, and carries out a subtraction $Z=(X-X)$ as $Z=(X+X2's)=(X+X1's+1)$, and further, makes a judgment such that the adder-subtracter is normal in the case where every bit of the subtraction result Z is all zero "0" while making a judgment such that the adder-subtracter has a failure in the case where every bit of the subtraction result Z is not all zero "0".

14. The processor according to claim 1, wherein the arithmetic circuit including:
- a first source register which stores a first operand A;
- a second source register which stores a second operand B;
- a pseudo-random number generator which carries out random number generation processing for each operation cycle after inputting either of the first or second operand as the initial value so as to generate a new operand, and which stores the newly generated operand in the first source register;
- a complement circuit which inverts an operand A outputted by the random number generator and adding "1" thereto so as to generate two's (2's) complement A2's, and which stores two's (2's) complement A2's in the second source register;
- a adder-subtracter of being as a diagnostic object, which inputs the first operand A as a minuend and inputs the second operand A2's as a subtrahend so as to carry out a subtraction $C=(A-A)$
- the self-diagnostic processing unit inputs an arbitrary self-diagnostic data X and X1's having a predetermined bit length stored in the first and second source registers to the adder-subtracter together with the carry input, and carries out a subtraction $Z=(X-X)$ as $Z=(X+X2's)=(X+X1's+1)$, and further, makes a judgment such that the adder-subtracter is normal in the case where every bit of the subtraction result Z is all zero "0" while making a judgment such that the adder-subtracter has a failure in the case where every bit of the subtraction result Z is not all zero "0".

\* \* \* \* \*